US006856696B1

(12) United States Patent
Ajioka

(10) Patent No.: US 6,856,696 B1
(45) Date of Patent: Feb. 15, 2005

(54) VISUAL DEVICE

(75) Inventor: Yoshiaki Ajioka, Gamagori (JP)

(73) Assignee: Ecchandes INC, Gamagori (JP)

( * ) Notice: Subject to any disclaimer, the term of this patent is extended or adjusted under 35 U.S.C. 154(b) by 0 days.

(21) Appl. No.: 09/786,820
(22) PCT Filed: Sep. 10, 1999
(86) PCT No.: PCT/JP99/04975
§ 371 (c)(1),
(2), (4) Date: Mar. 9, 2001
(87) PCT Pub. No.: WO00/16259
PCT Pub. Date: Mar. 23, 2000

(30) Foreign Application Priority Data

| Sep. 10, 1998 | (JP) | ............................................ | 10/257327 |
| May 25, 1999 | (JP) | ............................................ | 11/145638 |
| Jul. 23, 1999 | (JP) | ............................................ | 11/209738 |
| Sep. 6, 1999 | (JP) | ............................................ | 11/250986 |
| Sep. 6, 1999 | (JP) | ............................................ | 11/250990 |
| Sep. 7, 1999 | (JP) | ............................................ | 11/253634 |

(51) Int. Cl.$^7$ ................................................ G06K 9/34
(52) U.S. Cl. ........................ 382/173; 382/382; 382/103; 382/302
(58) Field of Search ................................ 382/173, 103, 382/104, 107, 109, 199, 207, 203, 206, 266, 276, 302, 277, 304–306, 308, 283, 282; 348/169, 699, 700, 578–579, 586, 596–597

(56) References Cited

U.S. PATENT DOCUMENTS

| 5,333,213 | A | * | 7/1994 | Koyama et al. | ............ | 382/283 |
| 5,519,793 | A | * | 5/1996 | Grannes | ...................... | 382/266 |
| 5,687,249 | A | * | 11/1997 | Kato | ......................... | 382/104 |
| 6,400,831 | B2 | * | 6/2002 | Lee et al. | .................... | 382/103 |

FOREIGN PATENT DOCUMENTS

| JP | 61-206079 | 9/1986 | ........... G06F/15/26 |
| JP | 5-324954 | 12/1993 | ............ G06M/7/00 |
| JP | 7-175934 | 7/1995 | ............. G06T/9/20 |

OTHER PUBLICATIONS

"Pattern Description with a Highly Parallel Information Processing System I". A. Tojo, Denkishikenjo Ihou, vol. 31, No. 8, pp. 18–34, 1967.

"Pattern Description with a Highly Parallel Information Unit (VI)—Construction and Simulation of the System", A. Tojo et al, Denkishikenjo Ihou, vol. 33, No. 5, pp. 1–27, 1969.

Recognition of Hand–Printed Japanese Characters Called HIRAGANA Using Local Parallel Operations, S. Ohyagi, et al, Technical Report of the Institute of Electronics and Communication Engineers, IE76–87, pp. 11–18, 1976.

"CLIP–4: A Large Scale Integrated Circuit Array Parallel Processor", MJB Duff, Proc. 34d IJCPR, pp. 728–733, 1976.

"MPP: A High–Speed Image Processor, Algorithmically Specialized Parallel Computers", Kenneth E. Batcher, pp. 59–68, 1985.

"A Data Flow Processor Array System Design and Analysis", N. Takahashi et al, Proc. 10th ISCA, 1983.

(List continued on next page.)

Primary Examiner—Leo Boudreau
Assistant Examiner—Ishrat Sherali
(74) Attorney, Agent, or Firm—Antonelli, Terry, Stout & Kraus, LLP

(57) ABSTRACT

A visual device searches for moving and still objects and counts the moving and still objects. The visual device includes a vibrator for vibrating a frame image by using an array calculating unit, an information unit for creating edge information on the moving and still objects from the frame image, a separator for separating the object region of the moving and still objects from the background of the frame image, a measuring unit for measuring the positions and sizes of the moving and still objects, a normalizer for normalizing the separation object regions segmented by the object regions, and a recognition unit for recognizing the normalized regions.

1 Claim, 32 Drawing Sheets

OTHER PUBLICATIONS

"A Method for Measuring the Center Position and the Total Intensity of an Output Distribution of Matrix Positioned Sensors", M. Ishikawa, Journal of the Society of Instrument and Control Engineers, vol. 19, No. 5, pp. 23–28, 1983.

"Two–Dimensional Coordinates Transform Circuit for Parallel Processing Vision", T. Mukai et al, IPSJ Technical Report, Computer Vision, 80–28, pp. 209–214, 1992.

"Vision Chip Architecture Using General–Purpose Processing Elements for 1ms Vision System", T. Komuro et al, Proc. 4th IEEE Int. Workshop on Computer Architecture for Machine Perception (CAMP'97), pp. 276–279, 1987.

"1 ms Target Tracking System Using Massively Parallel Processing Vision", Y. Nakabo et al, Journal of the Robot Society of Japan, vol. 15, No. 3, pp. 105–109, 1997.

"Design of Massively Parallel Vision Chip Using General–Purpose Processing Element", T. Komuro et al, Journal of the Institute of Electronics, Information and Communication Engineers, vol. J81–D–I, No. 2, pp. 70–76, 1998.

"A Neural Cocktail–Party Processor", C. von Malsburg et al, Biol. Cybern., vol. 54, pp. 29–40, 1986.

"Sensory Segmentation with Coupled Neural Oscillators", C. von Malsburg et al, Biol. Cybern, vol. 67, pp. 233–242, 1992.

"Binding by Temporal Structure in Multiple Feature Domains of an Oscillatory Neural Network", T. Schillen et al, Biol. Cybern., vol. 70, pp. 397–405, 1994.

"Global Competition and Local Cooperation in a Network of Neural Oscillators", D. Terman et al, Physica, D, 81, pp. 148–176, 1995.

"Artificial Retinas–Fast, Versatile Image Processing", K. Kyuma et al, Nature, 372, 6502, pp. 197–198, Nov. 1994.

"Vision Chip's Circuitry has its Eye Out for You", R. Johnson, Techweb News.

* cited by examiner

FIG.1
FIG.2
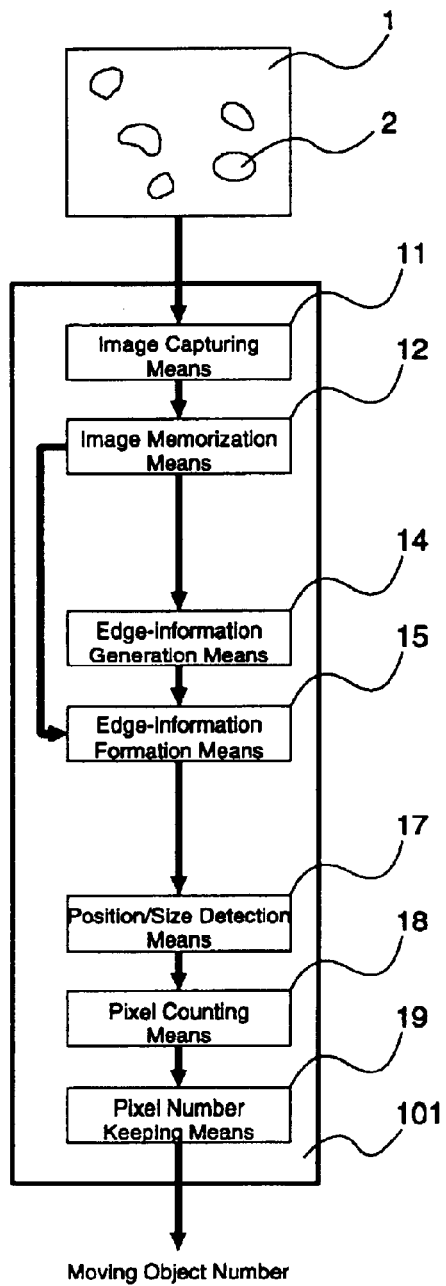
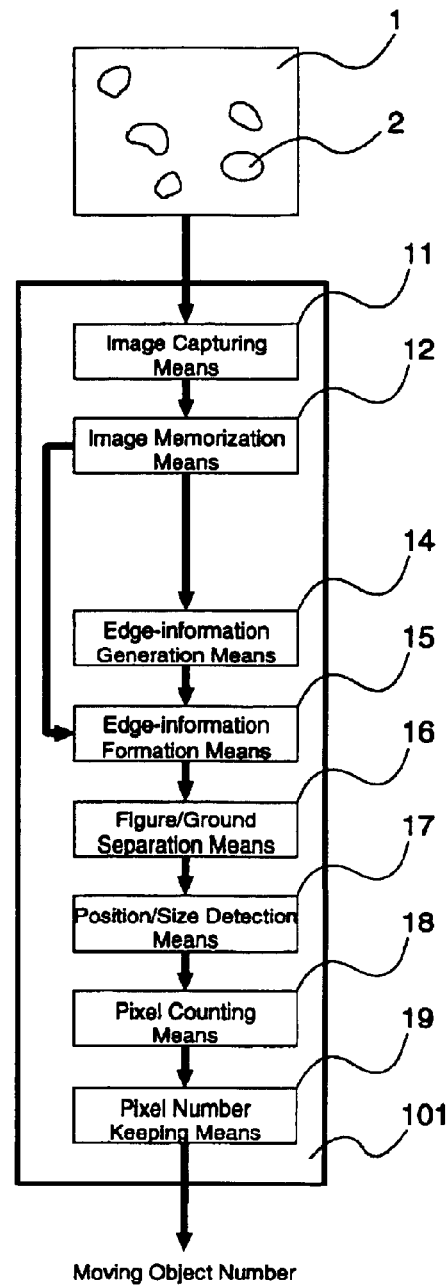

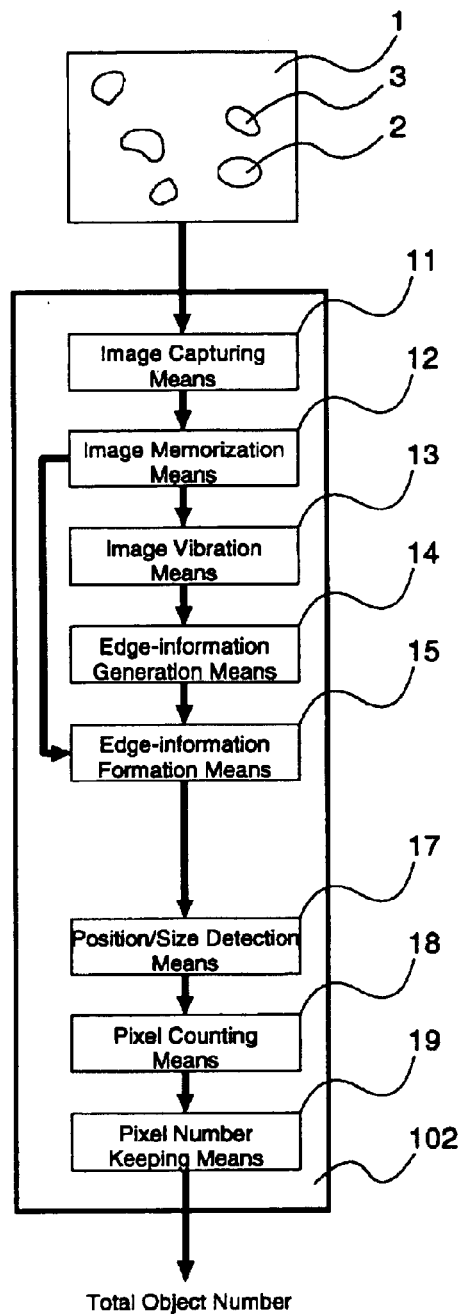
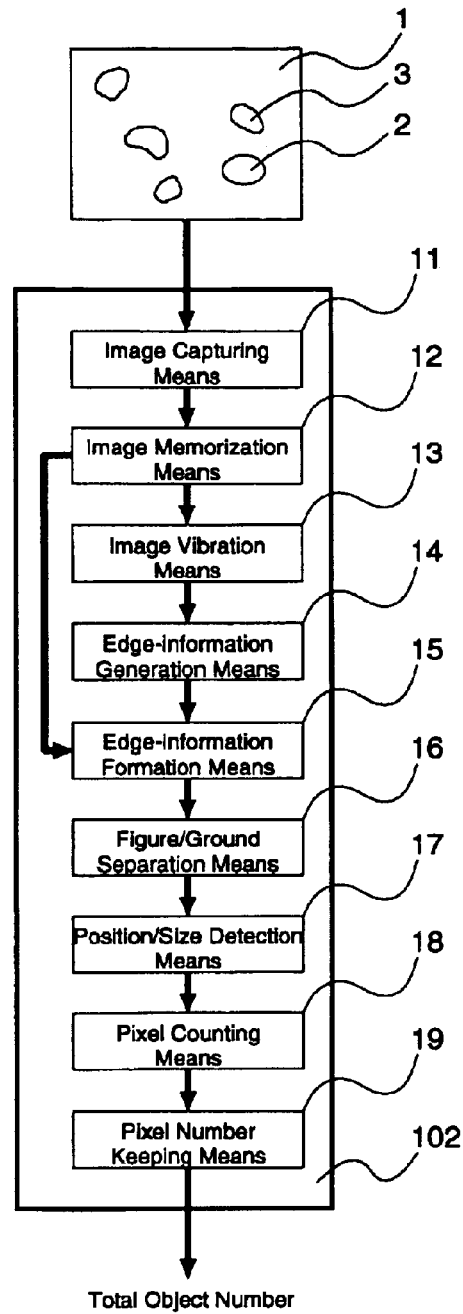

40

154   155  156

158 157   160 159 161

162   163 164  165

VISUAL DEVICE

FIELD OF THE INVENTION

The present invention relates to a visual device counting some objects in an image and its assemble means, which can count the number of moving and still objects in the image consisting of such any bands of wave lengths as three primary colors, visible colors, infrared rays, ultra-violet rays, and so on.

BACKGROUND OF THE INVENTION

Many digital devices using video cameras and digital cameras have been developed to count the number of objects in an image. These cameras, however, must take one image including the objects. An example is the device counting the number of cells in an image taken by a microscope. Since chromosome of the cells are dyed purple, the device can count the number of the cells, segmenting purple areas which are bigger than the regular size from the image and making them a lump. In any cases that some troubles happen in dying chromosome purple and chromosome can not be dyed purple, however, it is difficult for this device to count the number of the cells, because the cells are transparent in general and color information is no good for making the whole cell a lump. Even though the device can catch a core and some Mitochondrias of an expanding cell image, this way can not always be used, and many devices calcurate edge information in terms of contour of the cells appeared by refraction and reflection of light. Although the edge information should theoretically make the whole cell a lump, the devices complement the edge information by the form and size of the cell since the edge information is often incomplete in fact. The devices also must perform heavy image processing-like painting out in order to make the whole cell a lump, using the edge information, where the edge information must be continuous. In addition, since the devices must calcurate optical flow and so on, in order to select moving cells from all cells, the devices are too expensive to calcurate information exactly. Otherwise, the cheap devices lose much time.

Generally speaking, now, objects have certain colors except some objects like cells. For example, back of a tadpole is roughly dark brown, an apple is almost red, yellow and green, a horse is almost black, brown and gray, and a crow is almost black. However, even though the devices find peculiar color information of objects from an image in order to count the number of these objects, it is very difficult for the devices to count the number, because the color information depends on brightness of solor light and lighting, and performance of a camera. Another reason is the difficulty of classifying objects as targets or others when the objects are similar color in taking a image. A general way is to count the number of the objects after segmenting the targets from background by using information of their form and size, where color information is used to select the targets and to reduce computational complexity. If a visual device regards variance of color information as movement of a object, lighting and camera performance seldom comes to be a problem, but it becomes more difficult for the device to reproduce form of the object exactly. Moreover, painting out a domain surrounded for edge information makes a problem that the device must decide an object area. The visual device using variance of color information, then, has not been researched in details.

Considering these facts, a visual device comes to count the number of objects in spite of their feature and the environment taking an image, when it regards information like variance of color information as movement of the objects, generates edge information from the movement, selects the objects using the edge information, and makes some object areas a lump. In addition, we can expect that the visual device counts even the number of still objects if it can generate edge information from color information in such cases that the objects are vibrated, a camera is vibrated, or a taken image is vibrated.

Suppose now that there is the previous visual device possible to count the number of objects taken by a camera. If the objects are still, the visual device can always count their number. If they are moving, however, it can only count their number while they are taken by the camera there is no problem if all positions of still and moving objects are specified beforehand, as cells in a laboratory dish. In a case, however, that the visual device counts humans and animals walking in a room and along outdoors, it can be used for only limited targets if the camera is fixed, because the camera can not catch the whole room and the whole outdoor area, and an image of the humans and the animals becomes big or small, corresponding to distance from the camera. Moreover, heavy computational complexity is desired for the visual device to recognize the objects since it must distinguish the humans and the animals from interior objects of the room.

Considering these facts, the visual device comes not only to recognize such objects as the humans and the animals easily, but also to count the number of moving objects like them, whose position can not be specified beforehand, if a moving camera can find out the objects in the room and along the outdoors, and take only an image appearing them, and if the visual device can adjust the magnification of the camera as their size in the image is suitable for it. Of course, we can expect that the visual device can count the number of objects like the humans and the animals distinguished from other still objects even though they seldom move in sleeping.

In the present invention, the visual device counts the number of moving objects and all objects at high speed, based on edge information generated from either the moving objects or all of the objects, which are selected by it, in an animation image. The visual device also calcurate the rate of the moving objects and still objects in the image at hight speed, by counting the number of these objects. In addition, the visual device counts the number of the moving objects and the still objects at high speed, by finding out them possible to be taken by a moving camera.

SUMMARY OF THE INVENTION

The invention described in claim 1 is a visual device for moving objects in an animation image, comprising: means for capturing a frame image of the animation image; means for memorizing the frame image as a digital image one by one; means for generating a moving-object rough edge-information image from the digital image; means for generating a moving-object formed edge-information image from the moving-object rough edge-information image by using the digital image; means for detecting position and size of moving-object areas distinguished by the moving-object formed edge-information image; means for counting a moving-object area number; and means for keeping the moving-object area number. When the animation image consists of analog signals, the means for capturing the frame image makes the digital image by converting the frame image to digital signals. When the animation image consists of the digital signals, the means expands it if it has been compressed. Otherwise, the means only inputs it. Since the means selects any frame image in the animation image, the means make the digital image from the selected frame image 1. The means for memorizing the frame image as the digital image one by one memorizes all pixels in the frame image in a memory, remaining two-dimensional topological relationship. The means for generating the moving-object rough edge-information image from the digital image generates edge information of moving objects every one pixel in the digital image. The means for generating the moving-object formed edge-information image from the moving-object rough edge-information image by using the digital image forms the edge information of the moving objects into the exacter and clearer edge information, using the digital image. In the means for detecting the position and the size of the moving-object areas distinguished by the moving-object formed edge-information image, one pixel represents gravity center of the edge information at border of the moving-object areas and the number of the edge information at border of the moving-object areas. The means for counting the moving-object area number counts the number of the pixels representing the moving-object areas. The means for keeping the moving-object area number outputs the number of the pixels representing the moving-object areas in expression desired by an output place such as the complemental number of 2, floating point and so on. Each of the means can be carried out in parallel. In the means for generating the moving-object rough edge-information image, the means for generating the moving-object formed edge-information image and the means for detecting the position and the size of the moving-object areas, respectively, each pixel of their images can also be derived in parallel. Moreover, all these means are realized by local processing. The visual device, therefore, can count the moving-object area number fast, without depending on form and size of the moving objects. The visual device can use for many applications because the edge information is seldom influenced by lighting and so on, as compared to the case of detecting the moving-object areas by classification of color information, and the edge information, moreover, is generated by using refraction and reflection, without coloring the moving objects even though they are transparent. Therefore, many problems on counting the moving objects are solved very well.

The invention described in claim 2 is a visual device for moving objects in an animation image, comprising: means for capturing a frame image of the animation image; means for memorizing the frame image as a digital image one by one; means for generating a moving-object rough edge-information image from the digital image; means for generating a moving-object formed edge-information image from the moving-object rough edge-information image by using the digital image; means for segmenting moving-object areas from background by using the moving-object formed edge-information image; means for detecting position and size of the moving-object areas; means for counting a moving-object area number; and means for keeping the moving-object area number. The present invention is the invention described in claim 1 which is appended the means for separating the moving-object areas from the background by using the moving-object formed edge-information image. The means for separating the moving-object areas from the background by using the moving-object formed edge-information image can classify the pixels within the background and the pixels within the moving-object areas, which are distinguished by the edge information of the moving objects, into some different groups. In the means for detecting the position and the size of the moving-object areas, then, one pixel represents the gravity center of the moving-object areas and the number of the pixels within the moving-object areas. Each of the means can be carried out in parallel. In the means for generating the moving-object rough edge-information image, the means for generating the moving-object formed edge-information image, the means for separating the moving-object areas from the background and the means for detecting the position and the size of the moving-object areas, respectively, each pixel of their images can also be derived in parallel. Moreover, all these means are realized by local processing. The visual device, therefore, can count the moving-object area number fast, without depending on form and size of the moving objects. The visual device can use for many applications because the moving-object areas separated by the edge information from the background are seldom influenced by lighting and so on, as compared to the case of detecting the moving-object areas by classification of color information, and the edge information, moreover, is generated by using refraction and reflection, without coloring the moving objects even though they are transparent. Therefore, many problems on counting the moving objects are solved very well.

The invention described in claim 3 is a visual device according to claim 1 or claim 2, wherein an all-object area number is counted for all objects instead of the moving objects, by having means for vibrating the digital image. In a case of appending the means for vibrating the digital image to the visual device described in claim 1, the present invention is described as follows: When the animation image consists of analog signals, the means for capturing the frame image makes the digital image by converting the frame image to digital signals. When the animation image consists of the digital signals, the means expands it if it has been compressed. Otherwise, the means only inputs it. Since the means selects any frame image in the animation image, the means make the digital image from the selected frame image 1. The means for memorizing the frame image as the digital image one by one memorizes all pixels in the frame image in a memory, remaining two dimensional topological relationship. The means for generating the all-object area rough edge-information image from the vibrated image generates the vibrated image by vibrating the whole digital image vertically and horizontally or vibrating each pixel of the digital image vertically and horizontally, independently. All of the objects in the vibrated image, thus, are seen as if they were moving. The means for generating the all-object rough edge-information image from the vibrated image generates the edge information of all of the objects every pixel in the vibrated image. The means for generating the all-object formed edge-information image from the all-object rough edge-information image by using the digital image forms the edge information of all of the objects into the exacter and clearer edge information, by using the digital image. In the means for detecting the position and the size of the all-object areas distinguished by the all-object formed edge-information image, one pixel represents the gravity center of the edge information at border of the moving-object areas and the number of the edge information at border of the moving-object areas. The means for counting the all-object area number counts the number of the pixels representing the all-object areas. The means for keeping the all-object area number outputs the number of the pixels representing the all-object areas in expression desired by an output place such as the complemental number of 2, floating point and so on. Each of the means can be carried out in parallel. In the means for generating the all-object rough edge-information image, the means for generating the all-object formed edge-information image and the means for detecting the position and the size of the all-object areas, respectively, each pixel of their images can also be derived in parallel. Moreover, all these means are realized by local processing. The visual device, therefore, can count the all-object area number fast, without depending on form and size of all of the objects. The visual device can use for many applications because the edge information is seldom influenced by lighting and so on, as compared to the case of detecting the all-object areas by classification of color information, and the edge information, moreover, is generated by using refraction and reflection, without coloring all of the objects even though they are transparent. Therefore, many problems on counting all of the objects are solved very well.

On the other hand, in a case of appending the means for vibrating the digital image to the visual device described in claim 2, the present invention is described as follows: The means for separating the all-object areas from the background by using the all-object formed edge-information image can classify the pixels within the background and the pixels within the all-object areas, which are distinguished by the edge information of all of the objects, into some different groups. In the means for detecting the position and the size of the all-object areas, then, one pixel represents gravity center of the all-object areas and the number of the pixels within the all-object areas. Each of the means can be carried out in parallel. In the means for generating the all-object rough edge-information image, the means for generating the all-object formed edge-information image, the means for separating the all-object areas from the background and the means for detecting the position and the size of the all-object areas, respectively, each pixel of their images can also be derived in parallel. Moreover, all these means are realized by local processing. The visual device, therefore, can count the all-object area number fast, without depending on form and size of all of the objects. The visual device can use for many applications because the all-object areas separated by the edge information from the background are seldom influenced by lighting and so on, as compared to the case of detecting the all-object areas by classification of color information, and the edge information, moreover, is generated by using refraction and reflection, without coloring all of the objects even though they are transparent. Therefore, many problems on counting all of the objects are solved very well.

In a case of combining the visual device described in claim 1 with the visual device described in claim 3, wherein the means for vibrating the digital image is appended to the visual device described in claim 1, the present invention can share the means for generating the moving-object rough edge-information image from the digital image and the means for generating the all-object rough edge-information image from the vibrated image, the means for generating the moving-object formed edge-information image from the moving-object rough edge-information image by using the digital image and the means for generating the all-object formed edge-information image from the all-object rough edge-information image by using the digital image, the means for detecting the position and the size of the moving-object areas distinguished by the moving-object formed edge-information image and the means for detecting the position and the size of the all-object areas distinguished by the all-object formed edge-information image, the means for counting the moving-object area number and the means for counting the all-object area number, and moreover the means for keeping the moving-object area number and the means for keeping the all-object area number, between the visual device described in claim 1 and the visual device described in claim 3. These means may be shared whenever the amount of hardware is constrained. Of course, the less means the present invention shares, the less time the present invention takes to count the numbers. The visual device can use for many applications because the edge information is seldom influenced by lighting and so on, as compared to the case of detecting the moving-object areas and the all-object areas by classification of color information, and the edge information, moreover, is generated by using refraction and reflection, without coloring all of the objects even though they are transparent. Therefore, many problems on counting the moving objects and all of the objects are solved very well.

On the other hand, in a case of combining the visual device described in claim 2 with the visual device described in claim 3, wherein the means for vibrating the digital image is appended to the visual device described in claim 2, the present invention can share the means for generating the moving-object rough edge-information image from the digital image and the means for generating the all-object rough edge-information image from the vibrated image, the means for generating the moving-object formed edge-information image from the moving-object rough edge-information image by using the digital image and the means for generating the all-object formed edge-information image from the all-object rough edge-information image by using the digital image, the means for separating the moving-object areas from the background by using the moving-object formed edge-information image and the means for separating the all-object areas from the background by using the all-object formed edge-information image, the means for detecting the position and the size of the moving-object areas distinguished by the moving-object formed edge-information image and the means for detecting the position and the size of the all-object areas distinguished by the all-object formed edge-information image, the means for counting the moving-object area number and the means for counting the all-object area number, and moreover the means for keeping the moving-object area number and the means for keeping the all-object area number, between the visual device described in claim 2 and the visual device described in claim 3. These means may be shared whenever the amount of hardware is constrained. Of course, the less means the present invention shares, the less time the present invention takes to count the numbers. The visual device can use for many applications because the moving-object areas and the all-object areas separated by the edge information from the background is seldom influenced by lighting and so on, as compared to the case of detecting the moving-object areas and the all-object areas by classification of color information, and the edge information, moreover, is generated by using refraction and reflection, without coloring all of the objects even though they are transparent. Therefore, many problems on counting the moving objects and all of the objects are solved very well.

Moreover, either a visual device combining the visual device described in claim 1 with the visual device described in claim 3, wherein the means for vibrating the digital image is appended to the visual device described in claim 1, or a visual device combining the visual device described in claim 2 with the visual device described in claim 3, wherein the means for vibrating the digital image is appended to the visual device described in claim 2, can have a function for keeping the moving-object area number and a still-object area number derived by subtracting the moving-object area number from the all-object area number, or a function for keeping the rate of the moving objects and the rate of still objects derived by excluding the moving objects from all of the objects. In the former case, the present invention can be derived the still-object area number by subtracting the moving-object area number from the all-object area number in the means for keeping the all-object area number. The means for keeping the all-object area number, then, can output the still-object area number instead of the all-object area number if necessary. In the latter case, the present invention can be derived the rate of the moving objects by dividing the moving-object area number by the all-object area number in the means for keeping the moving-object area number. The means for keeping the moving-object area number, then, can output the rate of the moving-object areas instead of the rate of the all-object areas if necessary. In addition, since the still-object area number is derived by subtracting the moving-object area number from the all-object area number in the means for keeping the all-object area number, the present invention can be derived the rate of the still objects by dividing the still-object area number by the all-object area number. The means for keeping the all-object area number, then, can output the rate of the still-object areas instead of the rate of the all-object areas if necessary.

Note that the moving objects in the frame images are seen by the animation image taken by a video camera as if they were moving, because of continuing the frame images in the visual devices described in claim 1, claim 2 and claim 3. Therefore, the moving objects in the still images can be seen as if they were moving, by continuing the still images generated by a digital camera and a scanner at some diffrent times or at some diffrent places. By using the digital camera and the scanner instead of the video camera, the present invention can change interval of taking the still images easily, in counting the moving-object area number of the moving objects whose speed is low. In a case that the video camera is not always desired, for example, in a case of counting the number of all cells in a laboratory dish, the visual device with high accuracy can be realized cheaply since the present invention can use the digital camera whose resolution is high, instead of the video camera. Therefore, many problems on counting the moving objects and all of the objects are solved very well.

The invention described in claim 4 is a visual device for voluntary objects in an animation image taken by a moving camera, comprising: means for capturing a frame image of the animation image; means for memorizing the frame image as a digital image one by one; means for generating a voluntary-object rough edge-information image from the digital image; means for detecting position and size of voluntary-object areas distinguished by the voluntary-object rough edge-information image; means for converting direction and magnification of the moving camera to position in environmental coordinate; means for converting the position and the size of the voluntary-object areas to the position in the environmental coordinate; means for selecting one of positions in the environmental coordinate for the voluntary-object areas; means for inputting a control command from an external part; means for generating a vibration command vibrating the moving camera; means for controlling the position of the environmental coordinate where the moving camera must move; and means for generating a camera command controlling the moving camera. The visual device changes the direction and the magnification of the moving camera as the size of the voluntary objects is specific in the animation image taken by the moving camera. A whole sequence of processes which generate the edge information of the voluntary objects from the animation image, and degenerate the edge information is realized by local processing. The visual device, therefore, can take the animation image fast, in which the size of the voluntary objects is specific, without depending on form and size of the voluntary objects. The visual device can use for many applications because the edge information is seldom influenced by lighting and so on, as compared to the case of detecting areas of the voluntary objects by classification of color information. Therefore, many problems on counting the voluntary objects are solved very well.

The invention described in claim 5 is a visual device according to claim 4, comprising; means for generating the voluntary-object formed edge-information image from the voluntary-object rough edge-information image by using the digital image; means for segmenting the voluntary-object areas from background by using the voluntary-object formed edge-information image; means for normalizing the voluntary-object areas; means for keeping a voluntary-object normalized image; means for recognizing the voluntary-object normalized image; means for keeping a recognition result; means for generating an environmental map represented by the environmental coordinate; means for keeping the environmental map; means for inferring the position of the voluntary objects in the environmental map; means for counting a voluntary-object number; means for keeping the voluntary-object number; and means for carrying out geometrical analysis for the voluntary-object formed edge-information image. The feature of the present invention is described as follows: First, a whole sequence of processes which generate the edge information of the voluntary objects from the animation image, and normalize the voluntary-object areas separated from the background by using the edge information is realized by local processing. The visual device can use for many applications because the visual device can generate the voluntary-object normalized image fast, without depending on form and size of the voluntary objects. Therefore, many problems on extracting and normalizing the voluntary objects are solved very well. Second, a whole sequence of processes which generate the edge information of the voluntary objects from the animation image, and normalize the voluntary-object areas separated from the background by using the edge information is realized by local processing. The visual device can use for many applications because the visual device can generate the voluntary-object normalized image fast, without depending on form and size of the voluntary objects. The voluntary-object normalized image, moreover, does not include the background. The visual device can use for many applications because a method for recognizing the voluntary-object normalized image is seldom influenced by the background, and moreover the position and the size of the voluntary-object areas, as compared to the case of recognizing the voluntary-object areas surrounded by the background. Therefore, many problems on recognizing the voluntary objects are solved very well. Third, the visual device can make the environmental map which is a set of environmental data, each of which represents type of the voluntary objects and position in the environmental coordinate consists of a result of recognition of the voluntary-object normalized image and the direction and the magnification of the moving camera. The visual device can use for many applications by recording distribution and movemental situation every type of the voluntary objects, because the environmental map includes the environmental data for a specific period.

Therefore, many problems on recording the voluntary objects are solved very well. Fourth, the present invention can derive the position of some of the voluntary objects, which have not been recognized yet, in the environmental map. In addition, the present invention can inference real positions of the voluntary objects within a domain taken by the moving camera. The visual device, thus, can use for many applications. Therefore, many problems on finding out the voluntary objects are solved very well. Fifth, the visual device can use for many applications because the present invention can count the number of some of the voluntary objects, whose type represents some specific objects, by counting some of the environmental data within the environmental map, which represent the specific recognition results, after extracting them. Therefore, many problems on counting the voluntary objects are solved very well. Sixth, the means for recognizing the voluntary-object normalized image can recognize the voluntary-object normalized image faster and exacter, because the type of the voluntary objects in the voluntary-object normalized image can be inferenced by analyzing rough form represented by edge information generated from the voluntary objects. In addition, in a case that the voluntary objects in the voluntary-object normalized image are not targets of recognition, the environmental map can be generated before the means for recognizing the voluntary-object normalized image generate the recognition results. The visual device, thus, can use for many applications. Therefore, many problems on recognizing, finding out and counting the voluntary objects are solved very well.

The invention described in claim 6 is a visual device comprising array operation units arranged in the shape of a lattice in a data processing device that realizes means for vibrating a digital image, wherein each of the array operation units comprises: means for initializing the array operation unit; means for finishing processing if there is not the digital image to input any more; means for inputing each of band-pixel values in the digital image; means for vibrating each of the band-pixel values in the digital image virtically and horizontally; and means for outputing each of band-pixel values of a vibrated image. In short, this is the enforcement form of an algorithm for realizing a function vibrating the digital image, which is offered by the array operation units by using digital technology. After the array operation units were arranged in the shape of a lattic, followed by connecting the neighbor array operation units each to each, and by initializing each parameter in the array operation units, the present invention inputs the digital image every pixel if necessary, and carries out a sequence of processes from vibrating each band-pixel value in the digital image to outputing each band-pixel value in the vibrated image, one by one. The present invention repeats a sequence of these processes until the digital image comes not to be inputed. Since the present invention can use a general processor, the parameter can be corrected easily.

The invention described in claim 7 is a visual device comprising array operation units arranged in the shape of a lattice in a data processing device that realizes means for generating a rough edge-information image from a digital image, wherein each of the array operation units comprises: means for initializing the array operation unit; means for finishing processing if there is not the digital image to input any more; means for inputing each of band-pixel values in the digital image; means for generating each of band-pixel values in a smoothed image by smoothing each of the band-pixel values in the digital image; means for generating each of band-pixel values in a logarithmic-conversion image by converting each of the band-pixel values in the smoothed image to its logarithm; means for generating each of band-pixel values in an enhanced image by enhancing each of the band-pixel values in the logarithmic-conversion image; means for generating each of band-pixel values in a time-differential image by subtracting each of band-pixel values in a previous enhanced image from each of the band-pixel values in the enhanced image, respectively; means for superseding each of the band-pixel values in the previous enhanced image by each of the band-pixel values in the enhanced image, respectively; means for generating each of band-pixel values in a time-differential Laplacian image by calcurating each of the band-pixel values in the time-differential image in terms of a Laplacian operator; means for generating each of band-pixel values in a time-differential zero-point image by extracting a zero-point for each of the band-pixel values in the time-differential Laplacian image; means for generating a band-pixel value in a maximum-value time-differential zero-point image by detecting a maximum value among all of the band-pixel values in the time-differential zero-point image; means for generating each of band-pixel values in a Laplacian image by calcurating each of the band-pixel values in the enhanced image in terms of the Laplacian operator; means for generating each of band-pixel values in a zero-point image by extracting a zero-point for each of the band-pixel values in the Laplacian image; means for generating a band-pixel value in a maximum-value zero-point image by detecting a maximum value among all of the band-pixel values in the zero-point image; means for generating a band-pixel value in a mixed zero-point image by detecting a maximum value between the band-pixel value in the maximum-value zero-point image and the band-pixel value in the maximum-value time-differential zero-point image; means for generating a band-pixel value in a hole-deleted mixed zero-point image by deleting a hole of the mixed zero-point image; means for generating a band-pixel value in a noise-canceled mixed zero-point image by deleting an alone point and an alone hole of the hole-deleted mixed zero-point image; means for generating a band-pixel value in the rough edge-information image by inverting each of the band-pixel values in the noise-canceled mixed zero-point image; and means for outputing the band-pixel value in the rough edge-information image. In short, this is the enforcement form of an algorithm for realizing a function generating the rough edge-information image, which is offered by the array operation units by using digital technology. After the array operation units were arranged in the shape of a lattic, followed by connecting the neighbor array operation units each to each, and by initializing each parameter in the array operation units, the present invention inputs the digital image every pixel if necessary, and carries out a sequence of processes from smoothing the digital image to outputing each band-pixel value in the rough edge-information image, one by one. The present invention repeats a sequence of these processes until the digital image comes not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use their band-pixel values instead of the band-pixel values in each type of the images, which can not be received from the neighbor array operation units. Although a pixel in each type of the images generated by the array operation units may have a little noise in this case, each means in the present invention absorbes almost all of the noise. Border processing and time-out processing are realized simultaneously and easily by the means for superseding by their own band-pixel values.

The invention described in claim 8 is a visual device comprising array operation units arranged in the shape of a lattice in a data processing device that realizes means for generating a formed edge-information image from a rough edge-information image, wherein each of the array operation units comprises: means for initializing the array operation unit; means for finishing processing if there is not a digital image or the rough edge-information image to input any more; means for inputing each of band-pixel values in the digital image and a band-pixel value in the rough edge-information image; means for separating each of the band-pixel values in the digital image and the band-pixel value in the rough edge-information image; means for generating each of band-pixel values in a smoothed image by smoothing each of the band-pixel values in the digital image; means for generating each of band-pixel values in a logarithmic-conversion image by converting each of the band-pixel values in the smoothed image to its logarithm; means for generating each of band-pixel values in an enhanced image by enhancing each of the band-pixel values in the logarithmic-conversion image; means for generating each of band-pixel values in a Laplacian image by calcurating each of the band-pixel values in the enhanced image in terms of a Laplacian operator; means for generating each of band-pixel values in a zero-point image by extracting a zero-point for each of the band-pixel values in the Laplacian image; means for generating a band-pixel value in a maximum-value zero-point image by detecting a maximum value among all of the band-pixel values in the zero-point image; means for generating a band-pixel value in a based edge-information image by inverting the band-pixel value in the maximum-value zero-point image; means for operating orthopedically a band-pixel value in the rough edge-information image as approaching it to the band-pixel value in the based edge-information image; means for generating a band-pixel value in a formed edge-information image by complementing line width of the band-pixel value in the rough edge-information image; and means for outputing the band-pixel value in the formed edge-information image. In short, this is the enforcement form of an algorithm for realizing a function generating the formed edge-information image, which is offered by the array operation units by using digital technology. After the array operation units were arranged in the shape of a lattic, followed by connecting the neighbor array operation units each to each, and by initializing each parameter in the array operation units, the present invention inputs the digital image and the rough edge-information image every pixel if necessary, and carries out a sequence of processes from separating the digital image and the rough edge-information image to outputing each band-pixel value in the formed edge-information image, one by one. The present invention repeats a sequence of these processes until the digital image and the rough edge-information image come not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use their band-pixel values instead of the band-pixel values in each type of the images, which can not be received from the neighbor array operation units. Although a pixel in each type of the images generated by the array operation units may have a little noise in this case, each means in the present invention absorbes almost all of the noise. Border processing and time-out processing are realized simultaneously and easily by the means for superseding by their own band-pixel values.

The invention described in claim 9 is a visual device comprising array operation units arranged in the shape of a lattice in a data processing device that realizes means for detecting position and size of object areas, wherein each of the array operation units comprises: means for initializing the array operation unit; means for finishing processing if there is not a rough edge-information image to input any more; means for inputing a band-pixel value in the rough edge-information image; means for converting the band-pixel value in the rough edge-information image to a band-pixel value in a redundant-information image; means for converting a transfer value derived from the redundant-information image to a band-pixel value in a transfer-value image by operating imagery of position; means for transfering the band-pixel value in the redundant-information image to a transfer position directed by the band-pixel value in the transfer-value image; means for updating the band-pixel value in the redundant-information image by summation of the band-pixel values transfered from their original positions in the redundant-information image; and means for outputing the band-pixel value in the redundant-information image. In short, this is the enforcement form of an algorithm for realizing a function generating the redundant-information image representing the position and the size of the object areas directed by the rough edge-information image, which is offered by the array operation units, by using digital technology. After the array operation units were arranged in the shape of a lattic, followed by connecting the neighbor array operation units each to each, and by initializing each parameter in the array operation units, the present invention inputs the rough edge-information image every pixel if necessary, and carries out a sequence of processes from converting the rough edge-information image to the redundant-information image to outputing each band-pixel value in the redundant-information image, one by one. The present invention repeats a sequence of these processes until the rough edge-information image comes not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use a pixel value equivalent to zero instead of the band-pixel values in each type of the images, which can not be received from the neighbor array operation units. Although a pixel in each type of the images generated by the array operation units may have a little noise in this case, each means in the present invention absorbes almost all of the noise. Border processing and time-out processing are realized simultaneously and easily by the means for superseding by this band-pixel value equivalent to zero.

The present invention can input a formed edge-information image instead of the rough edge-information image. After the array operation units were arranged in the shape of a lattice, followed by connecting the neighbor array operation units each to each, and by initializing each parameter in the array operation units, the present invention inputs the formed edge-information image every pixel if necessary, and carries out a sequence of processes from converting the formed edge-information image to the redundant-information image to outputing each band-pixel value in the redundant-information image, one by one, in order to generate the redundant-information image representing the position and the size of the object areas directed by the formed edge-information image. The present invention repeats a sequence of these processes until the formed edge-information image comes not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use a pixel value equivalent to zero instead of the band-pixel values in each type of the images, which can not be received from the neighbor array operation units. Although a pixel in each type of the images generated by the array operation units may have a little noise in this case, each means in the present invention absorbs almost all of the noise. Border processing and time-out processing are realized simultaneously and easily by the means for superseding by this band-pixel value equivalent to zero.

In addition, the present invention can input the object-area image instead of the rough edge-information image. After the array operation units were arranged in the shape of a lattic, followed by connecting the neighbor array operation units each to each, and by initializing each parameter in the array operation units, the present invention inputs the object-area image every pixel if necessary, and carries out a sequence of processes from converting the object-area image to the redundant-information image to outputing each band-pixel value in the redundant-information image, one by one, in order to generate the redundant-information image representing the position and the size of the object areas directed by the object-area image. The present invention repeats a sequence of these processes until the object-area image comes not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use a pixel value equivalent to zero instead of the band-pixel values in each type of the images, which can not be received from the neighbor array operation units. Although a pixel in each type of the images generated by the array operation units may have a little noise in this case, each means in the present invention absorbs almost all of the noise. Border processing and time-out processing are realized simultaneously and easily by the means for superseding by this band-pixel value equivalent to zero.

The invention described in claim 10 is a visual device comprising array operation units arranged in the shape of a lattice in a data processing device that realizes means for normalizing object areas, wherein each of the array operation units comprises: means for initializing the array operation unit; means for finishing processing if there is not an object-area image or a digital image to input any more; means for inputing a band-pixel value in the object-area image and each of band-pixel values in the digital image; means for generating a band-pixel value in an updated object-area image and each of band-pixel values in an updated digital image by separating the band-pixel values in the object-area image and each of the band-pixel value in the digital image; means for converting a transfer value derived from the updated object-area image to a band-pixel value in a transfer-value image by operating imagery of position; means for generating a band-pixel value in a transferable image according to a redundant number at a transfer position directed by the pixel-band value in the transfer-value image; means for transfering the-band-pixel value in the updated object-area image to a transfer position according to judgement in the transferable image; means for transfering the band-pixel value in the updated digital image as the band-pixel value in the updated object-area image was transfered; means for complementing the band-pixel value in the updated object-area image not included in the object areas with the average of neighbor band-pixel values within the object-areas; means for complementing each of the band-pixel values in the updated digital image as the band-pixel value in the updated object-area image was complemented; and means for outputing each of band-pixel values in a normalized image generated after complementing the updated digital image. In short, this is the enforcement form of an algorithm for realizing a function generating the normalized image, which is offered by the array operation units, by using digital technology. After the array operation units were arranged in the shape of a lattic, followed by connecting the neighbor array operation units each to each, and by initializing each parameter in the array operation units, the present invention inputs the object-area image and the digital image every pixel if necessary, and carries out a sequence of processes from separating the object-area image and the digital image to outputing each band-pixel value in the normalized image, one by one. The present invention repeats a sequence of these processes until the object-area image and the digital image comes not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use a pixel value equivalent to zero instead of the band-pixel values in each type of the images, which can not be received from the neighbor array operation units. Although a pixel in each type of the images generated by the array operation units may have a little noise in this case, each means in the present invention absorbs almost all of the noise. Border processing and time-out processing are realized simultaneously and easily by the means for superseding by this band-pixel value equivalent to zero.

The invention described in claim 11 is a visual device comprising array operation units arranged in the shape of a lattice in a data processing device that realizes pattern matching in means for recognizing a normalized image, wherein each of the array operation units comprises: means for arranging the array operation units in the shape of a lattice; means for initializing the array operation unit; means for inputing a band-pixel value in a template image until the template image to input does not exist any more; means for finishing processing if there is not the normalized image to input any more; means for inputing band-pixel values in the normalized image; means for computing a matching result; means for updating a matching-result image; and means for outputing a band-pixel value in the matching-result image. In short, this is the enforcement form of an algorithm for realizing pattern matching offered by the array operation units by using digital technology. After the array operation units were arranged in the shape of a lattic, followed by connecting the neighbor array operation units each to each, and by initializing each parameter in the array operation units, the present invention inputs the template images and the normalized image every pixel if necessary, and carries out a sequence of processes from computing the matching result to outputting each band-pixel value in the matching-result image, one by one. The present invention repeats a sequence of these processes until the normalized image comes not to be inputed. Since the present invention can use a general processor, the parameter can be corrected easily. Note that the array operation units does not always have to carry out waiting for receiving some neighbor pixels in each type of the images exactly, which are sent from the neighbor array operation units. Because the array operation units waiting for receiving can use their band-pixel values instead of the band-pixel values in each type of the images, which can not be received from the neighbor array operation units. Although a pixel in each type of the images generated by the array operation units may have a little noise in this case, each means in the present invention absorbs almost all of the noise. Border processing and time-out processing are realized simultaneously and easily by the means for superseding by their own band-pixel values.

The invention described in claim 12 is a visual device comprising array operation units arranged in the shape of a lattice in a data processing device that realizes means for separating object areas by using a formed edge-information image, wherein each of the array operation units comprises: means for arranging the array operation units in the shape of a lattice; means for connecting a nonlinear oscillator in the array operation unit with nonlinear oscillators in its neighbors in terms of link values; means for initializing the array operation unit; means for finishing processing if there is not the formed edge-information image to input any more; means for inputing a band-pixel value in the formed edge-information image; means for computing an external noise; means for computing a neighbor input summation of the nonlinear oscillator; means for computing parameters in the nonlinear oscillator; means for computing an output of the nonlinear oscillator; means for computing a contour parameter; means for computing a border parameter; and means for outputting a band-pixel value in an object-area image including the object areas separated by the nonlinear oscillator. In short, this is the enforcement form of an algorithm for realizing a function generating the object-area image, which is offered by the array operation units by using digital technology. After the array operation units were arranged in the shape of a lattic, followed by connecting the neighbor array operation units each to each, and by initializing each parameter in the array operation units, the present invention inputs the formed edge-information images every pixel if necessary, and carries out a sequence of processes from computing the external noise to outputting each band-pixel value in the object-area image, one by one. The present invention repeats a sequence of these processes until the formed edge-information image comes not to be imputed. Since the present invention can use a general processor, the parameter can be corrected easily. Note that the array operation units does not always have to carry out waiting for receiving each of the parameters and some neighbor pixels in each type of the images exactly, which are sent from the neighbor array operation units. Because the array operation units waiting for receiving can use their parameters and band-pixel values instead of the parameters and the band-pixel values in each type of the images, which can not be received from the neighbor array operation units. Although each of the parameters and a pixel in each type of the images generated by the array operation units may have a little noise in this case, each means in the present invention absorbes almost all of the noise. Border processing and time-out processing are realized simultaneously and easily by the means for superseding by their own parameters and band-pixel values.

The invention described in claim 13 is a visual device including a plurality of array operation units, comprising: means for arranging the array operation units in the shape of a lattice; means for connecting the array operation unit with neighbor array operation units each to each, according to each position of the array operation units; means for communicating the data to the adjoining array operation units; and means for operating each of the array operation units independently; wherein each of the array operation units includes: means for inputing data; means for memorizing the data one by one; means for transmitting the data with other array operation units; means for computing by using the data; and means for outputting the data. Each of the array operation units has the same process step in the means for inputing the data, the means for memorizing the data one by one, the means for transmitting the data with other array operation units, the means for computing by using the data, and the means for outputting the data, in spite of its position arranged in the shape of a lattice. When the array operation unit, thus, is realized by a hardware, the same circuit implementing the array operation unit can be arranged on a plane regularly. Since these circuits have to be connected with only their adjoining circuits, the present invention needs a little wiring complexity, the present invention only has to increase and decrease the number of the circuits, corresponding to the size of images used by it, and moreover all of the circuits can carry out the means in parallel. In addition, when the array operation unit is realized by a software, a visual device, wherein the array operation units are arranged in the share of a lattice, can be run by a massive parallel program.

The invention described in claim 14 is a visual device including a plurality of array operation units, comprising: a processor having means for operating input data; a memory for memorizing a program and variables operating the data; and a controler for communicating with the adjoining array operation units; wherein the controler comprises: means for memorizing the input data in the memory; means for sending the variables in the memory to the adjoining array operation units; and means for memorizing the variables sent from the adjoining array operation units in the memory. In short, the present invention is a circuit for implementing the array operation unit by a hardware. The array operation unit can use a general processor for processing the input data and a general memory for memorizing a program and variables processing the data. The controler only has to send variables to only the adjoining array operation units when the array operation unit connects with less than or equal to four neighbors each by each. When the array operation unit must connect with more than or equal to eight neighbors each by each, however, the variables in the array operation unit which does not lie within the four neighbors are sent to the next array operation unit once. After that, the controler can receive the variables by making the next array operation unit to send them to the controler itself again. In addition, the controler can send its variables to the array operation units which does not lie within the four neighbors, by the means for sending each of the variables in the memory to the adjoining array operation units. The array operation unit can communicate the specific data with the array operation units which lie within more than or equal to eight neighbors, in spite of wiring with only the adjoining array operation units by a hardware. Moreover, many problems on implementing a hardware and real time processing of the above subjects are solved very well.

BRIEF DESCRIPTION OF THE DRAWINGS

FIG. 1 is a block diagram of a visual device calcurating moving object number from a frame image.

FIG. 2 is a block diagram of a visual device calcurating moving object number from a frame image, using a figure/ground separation means.

FIG. 3 is a block diagram of a visual device calcurating total object number from a frame image.

FIG. 4 is a block diagram of a visual device calcurating total object number from a frame image, using a figure/ground separation means.

FIG. 19 is an explanation view for forming low-resolution rough edge information generated from a low-resolution digital image into formed edge information from.

DETAILED DESCRIPTION

Figure 5:
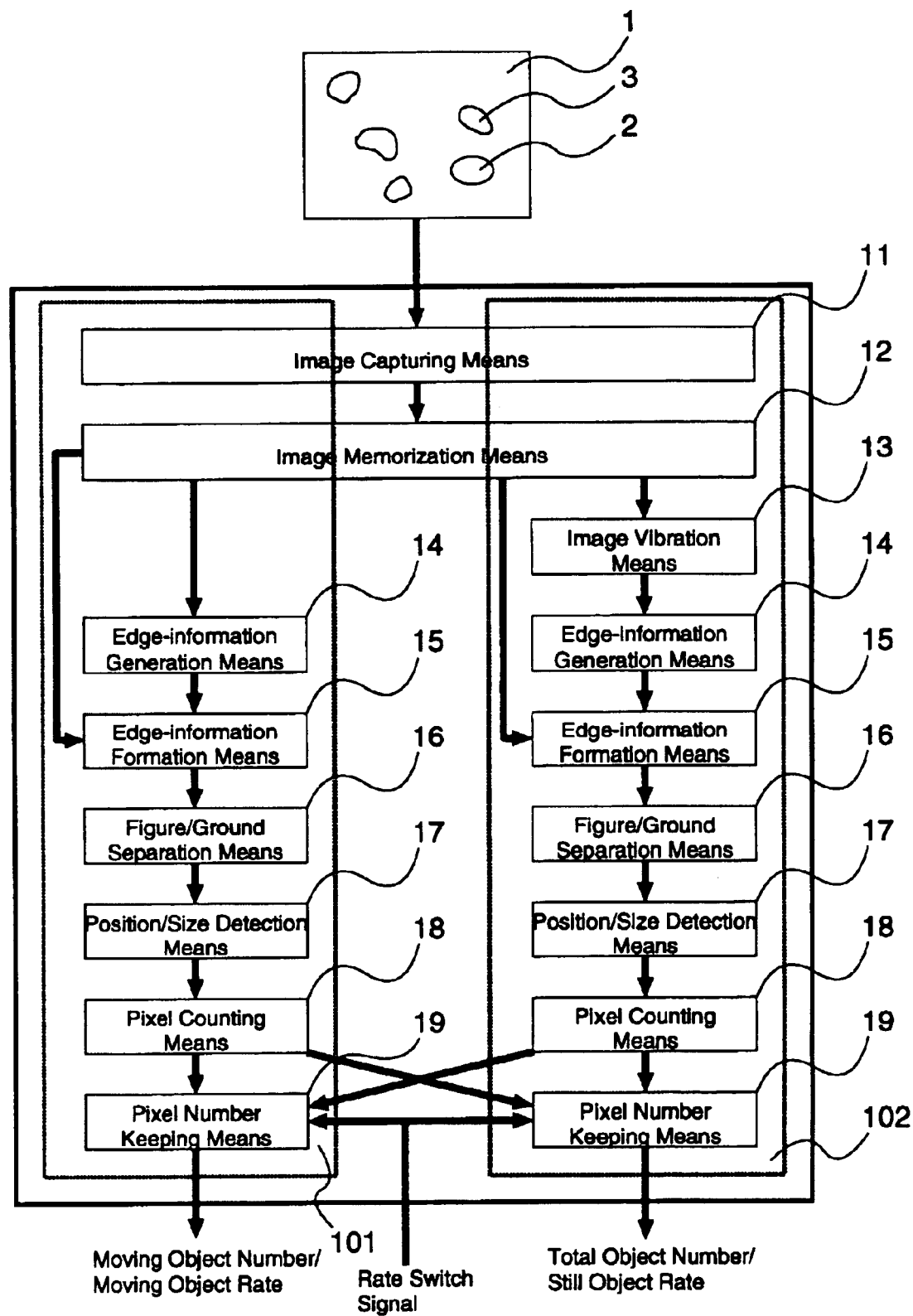
FIG. 5 is a block diagram of a visual device computing the rate of moving and still objects.

It is described below about these enforcement forms of twelve visual devices shown in FIG. 1 to FIG. 12. These enforcement forms are realized by using an image capturing means 11 (refer to FIG. 1), which translates frame image 1 receiving from a video camera to the suitable format and size of digital image 111, an image memorization means 12 (refer to FIG. 1), which memorizes a digital image 111 for a certain period, an image vibration means 13 (refer to FIG. 3), which vibrates the digital image 111 by digital circuits, an edge-information generation means 14 (refer to FIG. 1 and FIG. 3), which generates rough edge information 112 of moving objects 2 or still objects 3 from two digital images 111, an edge-information formation means 15 (refer to FIG. 1), which forms rough edge information 112 into exacter and clearer formed edge information 114, a figure/ground separation means 16 (refer to FIG. 2), which separates areas distinguished by formed edge information 114, a position/size detection means 17 (refer to FIG. 1 and FIG. 2), which detects position and size of each area distinguished or separated by formed edge information 114, a pixel counting means 18 (refer to FIG. 1), which counts the number of areas whose size are suitable, by using thier positions, a pixel number keeping means 19 (refer to FIG. 1 and FIG. 5), which outputs the number of the areas or the rate of the numbers of the areas of moving objects 2 and still objects 3, and so on. With reference to the drawings, then, I explain their means.

As shown in FIG. 1, a moving-object counting part 101 inputs a frame image 1 of an animation image taken by a video camera to the image capturing means 11, and passes data in turn of the image memorization means 12, the edge-information generation means 14, the edge-information formation means 15, the position/size detection means 17, the pixel counting means 18 and the pixel number keeping means 19, followed by outputting the number of moving objects 2 in the frame image 1. Note that the frame image 1 may be one of still images taken successively by a digital camera.

Suppose that the image capturing means 11 inputs a frame image 1 of an animation image from a video camera. In a case that the animation image consists of analog signals, the means translates the frame image 1 to a digital image 111, converting the analog signals to digital signals by A/D conversion function of a general capture board. If the means can input voltage of CCD elements directly, it may translate the voltage to suitable bits of digital signals by the A/D conversion function. In a case that the amination image consists of digital signals, on the other hand, the means expands it if it has been compressed. Otherwise, the means only inputs it. Since the means selects any frame image 1 in the animation image, the means make a digital image 111 from the selected frame image 1. Since the converted digital image 111 has any size according to suitable format, the image capturing means 11 converts the format to another format possible to refer image data every one pixel, distinguishes the domain of size desired by the moving-object counting part 101, and outputs the domain as the digital image 111. If the image capturing means 11 can output all pixels of the digital image 111 in parallel, communication from the image capturing means 11 to the image memorization means 12 can carry out in parallel every one pixel.

Suppose that the image memorization means 12 inputs the digital image 111 from the image capturing means 11. The image memorization means 12 memorizes the digital image 111 for a certain period, corresponding to time decomposition ability of the moving-object counting part 101 or computational power of each means. In short, each following means can input the same digital image 111 at the different timing, because the image memorization means 12 does not change its memorized image even though another digital image 111 is inputed in this period. In addition, since the image memorization means 12 does not carry out image processing for the digital image 111, the means remains two-dimensional topological relation for each pixel of the digital image 111. If the image memorization means 12 can output all pixels of the digital image 111 in parallel, communication from the image memorization means 12 to the edge-information generation means 14 can carry out in parallel every one pixel.

Suppose that the edge-information generation means 14 inputs the digital image 111 from the image memorization means 12. The edge-information generation means 14 generates a rough edge-information image 113 of the moving object 2 by comparing it with the digital image 111 inputed beforehand. Since the edge-information generation means 14 can generate the rough edge-information image 113 by carrying out neighbor processing every one pixel, the means is suitable for parallel processing. If the edge-information generation means 14 can output all pixels of the rough edge-information image 113 in parallel, communication from the edge-information generation means 14 to the edge-information formation means 15 can carry out in parallel every one pixel.

Suppose that the edge-information formation means 15 inputs the rough edge-information image 113 from the edge-information generation means 14, the edge-information formation means 15 generates an exacter and clearer formed edge-information image 115 than the rough edge-information image 113 of the moving object 2, refering to the digital image 111 memorized in the image memorization means 12. Since the edge-information formation means 15 can generate the formed edge-information image 115 by carrying out neighbor processing every one pixel, the means is suitable for parallel processing.

If the edge-information formation means 15 can output all pixels of the formed edge-information image 115 in parallel, communication from the edge-information formation means 15 to the position/size detection means 17 can carry out in parallel every one pixel.

Suppose that the position/size detection means 17 inputs the formed edge-information image 115 from the edge-information formation means 15. The position/size detection means 17 detects position and size of an area of the moving object 2 pointed out by the formed edge information 114. Since the position/size detection means 17 can generate a redundant-information image 132 appearing a detect result of the position and the size of the area of the moving object 2 by carrying out neighbor processing every one pixel, the means is suitable for parallel processing. If the position/size detection means 17 can output all pixels of the redundant-information image 132 in parallel, communication from the position/size detection means 17 to the pixel counting means 18 can carry out in parallel every one pixel.

Suppose that the pixel counting means 18 inputs the redundant-information image 132 from the position/size detection means 17. The pixel counting means 18 counts the number of pixels appearing the position of the area of the moving object 2 whose size is suitable. Serial processing is more convenient for this process than parallel processing. Therefore, each pixel of the redundant-information image 132 is memorized in a linear memory. The number of pixels appearing the position of the area of the moving object 2 is outputed from the pixel counting means 18 to the pixel number keeping means 19.

Suppose that the pixel number keeping means 19 inputs the number of pixels from the pixel counting means 18. The pixel number keeping means 19 converts its expression to the expression desired by an output place, such as the complemental number of 2, floating point and so on, and outputs it for the desired period. In short, the moving-object counting part 101 can output the moving object number.

Since each means described above can compute in parallel if it is realized by an independent hardware, the moving-object counting part 101 can work in real time. Therefore, these means are suitable for a case that the visual device must count the number of objects moving quickly or it must process many animation images for a short time. If some of the means are realized by a software running on a processor, the visual device can also be made cheap, where its computational power goes down. This visual device, then, is suitable for the use as it takes more than a few minutes until the device finishes computing.

Let us now consider that the position/size detection means 17 detects position and size of an area of a moving object 2 by using a formed edge-information image 115 generated by the edge-information formation means 15. The number of pixels appearing the position of the area of the moving object 2 may be different from the number of moving objects 2, corresponding to density of the moving objects 2. This mainly causes that formed edge information 114 does not always represent edges of the moving objects 2 exactly and the position/size detection means 17 does not distinguish the moving objects 2 from the formed edge information 114. The position/size detection means 17, then, may take a mistake that the combination of the formed edge information 114 generated from some different moving objects 2 represents an object which does not exist when density of the moving object 2 is high. In order to solve this problem, the position/size detection means 17 should just distinguish form of the moving object 2 from the formed edge information 114, but conventional geometrical analysis needs much computational complexity because of global processing. In addition, the higher the accuracy of a distinguished result becomes, the more exponentially the computational time explodes. We then can use the figure/ground separation means 16 (refer to FIG. 2) as means solving this problem by carrying out neighbor processing.

Suppose that the figure/ground separation means 16 inputs the formed edge-information image 115 from the edge-information formation means 15. The figure/ground separation means 16 separates some pixels within an object area 141 and some pixels within background into some different groups, followed by outputting a separation result of each groups in turn. Note that the figure/ground separation means 16 can separate some object areas 141 into some different groups when the areas are adjoining but distinguished exactly by formed edge information 114. In short, the number of these groups may become more than or equal to three. Since the figure/ground separation means 16 can separate the object area 141 and background by carrying out neighbor processing every one pixel, the means is suitable for parallel processing. If the figure/ground separation means 16 can output all pixels of the object-area image 142 in parallel, communication from the figure/ground separation means 16 to the position/size detection means 17 can carry out in parallel every one pixel.

As shown in FIG. 2, the visual device can separate the area of the moving object 2 and background including other objects by using the figure/ground separation means 16, complementing the formed edge information 114 by only neighbor processing. If the area of the moving object 2 is similar to a circle, in short, there are only a few parts of unevenness on the contour of the area, the position/size detection means 17 can select only the domain, whose size is suitable, and decide position of the moving object 2. If it is clear beforehand that the moving object 2 is similar to a circle, the pixel counting means 18 can count the number of pixels appearing the position of the area of the moving object 2 whose size is suitable, by using the figure/ground separation means 16. The moving-object counting part 101 then can output the moving object number more exactly.

It has been described above about what the moving-object counting part 101 work, in counting the number of moving objects 2 in more than or equal to two Frame Images 1 of an animation image. I explain here about the case that a visual device counts the total number of the moving objects 2 and still objects 3 in a frame image 1, the total object number, of the animation image.

First, basic behaviour of this counting is the same as the above counting of the number of the moving objects 2 using the frame image 1 of the animation image. In this counting, in short, the still object 3 in the frame image 1 is only superseded by the moving object 2 in the frame image 1 on appearance, by using a certain method. Since rough edge information 112 of the still object 3 is generated in this case, the moving-object counting part 101 can also count the number of the still objects 3. The simplest way possible to regard the still object 3 as the moving object 2 is to vibrate a vide camera (or a digital camera) on a vibration table. Otherwise the table vibrate the still object 3 itself. However, since these ways desire physical mechanism, the moving-object counting part 101 becomes expensive and complex. On the other hand, the image vibration means 13 (refer to FIG. 3) does not use such mechanism.

Suppose that the image vibration means 13 inputs the digital image 111 from the image memorization means 12. The image vibration means 13 transfer the whole digital image 111 or the digital image 111 every one pixel as a still object 3 moves the distance between about three pixel in the digital image 111. If the image vibration means 13 can output all pixels of the digital image 111 in parallel, communication from the image vibration means 13 to the edge-information generation means 14 can carry out in parallel every one pixel.

As shown in FIG. 3, the image vibration means 13 vibrates the still object 3 in the digital image 111 generated by the image capturing means 11 within about three pixels vertically and horizontally. Since the edge-information generation means 14 can generate rough edge information 112 of the still object 3, regarding the still object 3 as moving object 2, all-object counting part 102 can count the toal number of the moving objects 2 and the still objects 3, that is, the total object number.

In addition, whichever a target is a moving object 2 or a still object 3, the figure/ground separation means 16 separates object areas 141 from background by only formed edge information 114. If it is clear beforehand that the moving object 2 and the still object 3 are similar to a circle, the position/size detection means 17, as shown in FIG. 4, can count the number of pixels appearing position of the area of moving object 2 or still object 3, whose size is suitable, by inputing a formed edge-information image 115 generated by the edge-information formation means 15 to the figure/ground separation means 16, and by inputing an object-area image 142 generated by the figure/ground separation means 16 to the position/size detection means 17. The all-object counting part 102, then, can output the total object number more exactly.

As described above, now, the visual device can count the total number of the moving objects 2 and the still objects 3 in the frame image 1 of the animation image, using the moving-object counting part 101 counting the number of the moving objects 2 in the animation image, and the all-object counting part 102 having almost the same means as the moving-object counting part 101. Let us consider here a case that a visual device counts the number of the moving objects 2 and the still objects 3 in parallel. If the device can count the number of the moving objects 2 and the still objects 3, it is very easy for the device to compute the rate of the moving objects 2 per all objects, or the rate of the still objects 3 per all objects. I also explain about the visual device computing these rates.

As shown in FIG. 5, the whole architecture of a visual device, which counts the number of moving objects 2 and the number of all objects, and computes the rate of the moving objects 2 and the rate of still objects 3, consists of two major parts; a moving-object counting part 101 and a all-object counting part 102. The moving-object counting part 101 and the all-object counting part 102 consist of the above means, respectively. Note that the moving-object counting part 101 and all-object counting part 102 shown in FIG. 5 shares the image capturing means 11 and the image memorization means 12 because the image capturing means 11 and the image memorization means 12 carry out the same process in two parts, respectively. It is important, here, for the visual device to switch its process by an external signal like a Rate Switch Signal, as the device computes the rate of the moving objects 2 or the rate of the still objects 3, and converts one of them to the expression of floating-point, where the pixel number keeping means 19 of the moving-object counting part 101 must input the total object number from the pixel counting means 18 of the all-object counting part 102, and the pixel number keeping means 19 of the all-object counting part 102 must input the moving object number from the pixel counting means 18 of the moving-object counting part 101. Of course, the pixel number keeping means 19 does not need such a function as computing the rate of the moving objects 2 and the rate of the still objects 3 if we do not desire these rates or the function is realized by another device. Oppositely, if the visual device must count the moving object number and the still object number simultaneously, the pixel number keeping means 19 only has to append such functions. The visual device can arrange freely some functions corresponding to its use when the pixel number keeping means 19 is realized in a general processor.

As described above, now, the visual devices described in claim 1 to claim 3, which consist of a moving-object counting part 101 and a all-object counting part 102, is a device for counting the number of moving objects 2 and still objects 3 in a frame image 1 taken by a video camera. If the moving objects 2 and the still objects 3 are shown in the frame image 1, these visual devices can count the number of the moving objects 2 and the still objects 3. Once the moving objects 2 and the still objects 3 are not appeared in the frame image 1, however, it is impossible for these visual devices to count the number of the moving objects 2 and the still objects 3. It is explained here about visual devices described in claim 4 and claim 5, which always find out the moving objects 2 and the still objects 3 and count the number of them, using a moving camera 10 (refer to FIG. 6).

First, the moving camera 10 can pan and tilt, where it has two mechanical system moving itself horizontally and vertically, respectively, and the systems input commands controlling their moving angle from an external part. The moving camera 10 can also zoom, where it has a mechanical system changing the zoom magnification of an image taken by it, and the system inputs commands controlling the magnification from the external part. The moving camera 10, then, can vibrate itself frequently by the commands from the external part. Since a frame image 1 of an animation image taken by the moving camera 10 blurs, an object in the frame image 1 is taken as if it is vibrating. In short, only moving-object counting part 101 can count the areas of all objects without using the image vibration means 13 of the all-object counting part 102, when the moving camera 10 is used. Although this way make some troubles about processing performance and the accuracy of counting because of using physical mechanism of the moving camera 10, only the moving-object counting part 101 can count the number of areas of both the moving object 2 and all objects. This way is then suitable for the use counting the moving objects 2 and the still objects 3 in a wide place impossible to be appeared in the frame image 1.

Suppose here that the moving camera 10 can output the present position of itself moved by control commands of pan, tilt and zoom whenever it must output the position, and its state which it is moving or stops whenever it must output the state, too. If the visual device can control pan, tilt and zoom of the moving camera 10, the device can also change the direction and the magnification of the moving camera 10 as the device can take an image of the moving object 2 and the still object 3, whose size in the image is always suitable.

Figure 6:
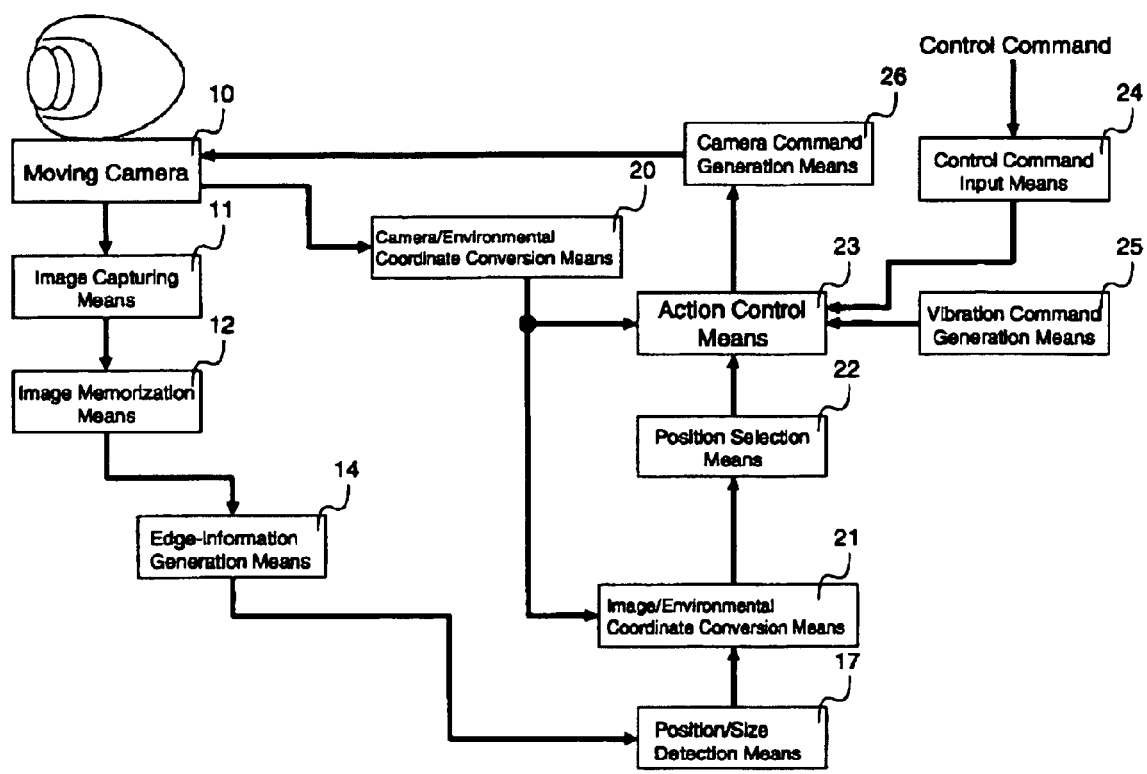
FIG. 6 is a block diagram of a visual device controlling a moving camera.

FIG. 6 shows a visual device described in claim 4, which has some basic means for a moving camera 10 to take an image of moving objects 2 and still objects 3, whose size in the image is suitable. Note that the visual device uses three coordinate systems, the camera coordinate system, the image coordinate system and the environmental coordinate system, corresponding to its functions. First, the camera coordinate system is a three-dimensional ball coordinate system used by the camera, in order to control pan, tilt and zoom for a minimum control unit, respectively. In general, the origin of the camera coordinate system is the primitive position of the moving camera, called the home position. The camera coordinate system is only a coordinate system possible to appear physical positions of the moving objects 2 and the still objects 3, but the system can not be used for general purpose because each model of the moving camera 10 has its own camera coordinate system. Therefore, the visual system has to keep the camera coordinate system secret against other means. Second, the image coordinate system is the two-dimensional coordinate system whose unit is a pixel, and whose origin is the center of the frame image 1 taken by the moving camera 10. This system is used to appear a pixel of the frame image 1, where the moving objects 2 and the still objects 3 is. The image coordinate system is suitable for distinguishing positions of some objects in the frame image 1 finely, but the physical positions of the moving objects 2 and the still objects 3 can not be appeard by only the image coordinate system. Third, the environmental coordinate system is the three-dimensional ball coordinate system used in order for the visual device to appear consistently internal positions of the moving objects 2 and the still objects 3. The angle for horizontal and vertial directions is represented by radian. The distance in the environmental coordinate system is represented by real numbers, whose unit is 1.0, in order to appear the product of the size of objects and the distance to them. Since the size of the objects do not change extremely, in general, we can assume that the distance to the objects is proportional to the magnification of the moving camera 10. The origin of the environmental coordinate system can be defined freely. In short, the environmental coordinate system is used to appear the relative coordinate of any two point on the environmental system itself. The visual device can distinguish some objects, by projecting the objects, which are in environment, possible to be taken by the moving camera 10 to the environmental coordinate system.

The camera coordinate system and the image coordinate system must be converted to themselves each other. Means which play such a role are a camera/environmental coordinate conversion means 20, an image/environmental coordinate conversion means 21 and an action control means 23. These means derive two units of the camera coordinate system and the image coordinate system, corresponding to the specification of the moving camera 10 and the image capturing means 11, and then compute a matrix for converting to the environmental coordinate system. A convert matrix from the environmental coordinate system to the camera coordinate system is also derived by computing an invert matrix of the convert matrix from the camera coordinate system to the environmental coordinate system. Note that the position of the environmental coordinate system converted from the camera coordinate system is equal to the relative position from the home position of the moving camera 10, which is on the environmental coordinate system, since the origin of the camera coordinate system is the home position of the moving camera 10. On the other hand, the position of the camera coordinate system converted from the environmental coordinate system is equal to the relative position from the present position of the moving camera 10, which is on the camera coordinate system. In addition, the position is not converted to the environmental coordinate system by using only the image coordinate system since the image coordinate system is the two-dimensional coordinate system. The position of the image coordinate system can be converted to the environmental coordinate system, when the image/environmental coordinate conversion means 21 computes the convert matrix frequently, using the direction and the magnification of the moving camera 10 represented by the environmental coordinate system, and the size of areas of the moving objects 2 and the still objects 3 in the frame image 1. Note that the position of the environmental coordinate system converted from the image coordinate system is equal to the relative position from the center of the image.

Therefore, we can regard that the remaining means of the visual device described in claim 4 is the mean for generating and converting the positions of the moving objects 2 and the still objects 3 represented in three coordinate system, in order always to take an image of the moving objects 2 and the still objects 3 whose size in the image is suitable. Now, I explain about FIG. 6, based on the camera coordinate system, the image coordinate system and the environmental coordinate system.

First, the image capturing means 11, the edge-information generation means 14 and the position/size detection means 17 are the same as the means explained in the visual devices described in claim 1 to claim 3, which consist of the moving-object counting part 101 and the all-object counting part 102. Note that the position/size detection means 17 inputs a formed edge-information image 115 generated by the edge-information formation means 15 in the visual devices described in claim 1 to claim 3. However, the position/size detection means 17 inputs a rough edge-information image 113 generated by the edge-information generation means 14 in the visual device described in claim 4. Of course, if this visual device uses the edge-information formation means 15, the position/size detection means 17 can input the formed edge-information image 115, but this visual device works well for the following reasons even though the edge-information formation means 15 is not used. First, this visual device does not have to count the number of the areas of the moving objects 2 and the still objects 3 as the visual devices described in claim 1 to claim 3 must count. However, it is important for this visual device to find out the moving objects 2 and the still objects 3 and to set the direction and the magnification of the moving camera 10 to the position of them. The position/size detection means 17 can also derive the near size of the areas of the moving objects 2 and the still objects 3 from rough edge information 112. Second, the edge-information formation means 15 generates the formed edge-information image 115, by using the rough edge-information image 113 generated by the edge-information generation means 14. In short, the moving objects 2 move while the edge-information formation means 15 generates the formed edge-information image 115. The movemental velocity of the moving camera 10 seems not to be fast, because the moving camera 10 has generally the physical mechanism. When this visual device moves the moving camera 10, the moving camera 10 may not be able to control its movement because of slow velocity of the moving camera 10. The visual device described in claim 4, then, does not always use the exact and clear formed edge information 114 of the moving objects 2 and the still objects 3.

Next, the camera/environmental coordinate conversion means 20 and the image/environmental coordinate conversion means 21 convert the position of the areas of the moving objects 2 and the still object 3, which is represented by redundant-information image 132 generated by the position/size detection means 17, to the position on the environmental coordinate system. If the total number of the position of the areas of the moving objects 2 and the still objects 3 in the frame image 1 is more than or equal to two, this also means that there are more than or equal to two positions on the environmental coordinate system. One of the positions on the environmental coordinate system, then, must be selected to set the direction and the magnification of the moving camera 10 to the position of either one of the objects, controlling pan, tilt and zoom of the moving camera 10. A position selection means 22 selects one of the positions on the environmetal coordinate position, in terms of certain judgement standards. The judgement standards used here are as follow: First, the means selects the nearest object (or the biggest one) on the environmental coordinate system. The reason is that the edge-information generation means 14 may generate noise when a object is far (or small). The means then selects the position on the environmental coordinate system, where probability of existing the object is higher. Second, when some positions crowed within a certain domain on the environmental coordinate system, the means select one of them. This select derives two case. One is that the edge-information generation means 14 generates some distributed rough edge information 112 for a object. Another is that there are some objects in fact. Third, when many positions on the environmental coordinate system represent almost same distance (or almost same size), the means selects the nearest position to the origin, that is, the direction of the moving camera 10 the position selection means 22 can select one of positions on the environmental coordinate system, by combining with these selections, according to use and situation of the visual device.

The visual device described in claim 4, now, carries out pan, tilt and zoom to the positions selected by the position selection means 22, and must, moreover, carry out pan, tilt and zoom to the following positions: First, this visual device must vibrate the moving camera 10. In order to vibrate the moving camera 10, a vibration command generation means 25 specifies the position where the moving camera 10 moves as a position on the environmental coordinate system. The position specified by the vibration command generation means 25 is decided by the number like pseudo-random number within the domain where the moving camera 10 does not vibrate extremely. In addition, the visual device described in claim 4 must carry out pan, tilt and zoom of the moving camera 10 when the control command is inputed from an external part. In general purpose, the moving camera 10 carries out pan, tilt and zoom, comparing with its present direction and its present magnification. Once a control command input means 24 memorises the control command, the visual device computes some positions on the environmental coordinate system whose origin is the present position of the moving camera 10. Note that it is easily possible to move the moving camera 10 to a certain position, by improving the control command input means 24.

In order to control pan, tilt and zoom of the moving camera 10, the action control means 23 selects one of three positions, which are described above, on the environmental it coordinate system. When the action control means 23 selects one of three positions, the position is selected from one of three means which may have an input position, in turn of the control command input means 24, the position selection means 22 and the vibration command generation means 25. The selected position on the environmental coordinate system is converted to the position on the camera coordinate system. After the converted position is translated by a camera command generation means 26 to a command which the moving camera 10 can recognize, the command is sent to the moving camera 10. The visual device described in claim 4, then, can control pan, tilt and zoom of the moving camera 10.

Here, there are some models of moving camera 10 which can send their state, that is, the direction and the magnification of the moving camera 10, and information whether the moving camera 10 is moving or stops, only when the moving camera 10 receives some special commands. After the action control means 23 selects one of three positions and outputs to the camera command generation means 26, the action control means 23 directs the camera command generation means 26 to send the command, which asks whether the moving camera 10 is moving or not, to the moving camera 10, and then waits an answer from the moving camera 10 via the camera/environmental coordinate conversion means 20. If the received answer represents moving, the action control means 23 directs the camera command generation means 26 to send the command, which asks whether the moving camera 10 is moving or not, to the moving camera 10 again. If the received answer represents stop, the action control means 23 directs the camera command generation means 26 to send the command, which asks the present direction and the present magnification of the moving camera 10, to the moving camera 10. In this period, the action control means 23 does not select one of three positions the camera command generation means 26 sends the corresponding command to the moving camera 10, according to direction of the action control means 23. The camera/environmental coordinate conversion means 20 sends information whether the moving camera 10 is moving or not to the action control means 23 directly. Moreover, the camera/environmental coordinate conversion means 20 converts the present direction and the present magnification of the moving camera 10 on the camera coordinate system to the position on the environmental coordinate system. The visual device described in claim 4, then, can control pan, tilt and zoom of the moving camera 10, investigating the state of the moving camera 10 one by one.

It has been explained above about the visual device described in claim 4 having the basic means that the moving camera 10 can take the frame image 1 showing the moving objects 2 and the still objects 3 whose size in the frame image 1 is always suitable. However, there are not always the moving objects 2 and the still object 3 within a domain taken by the moving camera 10. Moreover, it is natural for the moving objects 2 to move to other place outside of the domain taken by the moving camera 10 soon. Of course, if the moving objects 2 move to anywhere, form and color of the moving objects 2 catched by the moving camera 10 will also change. The visual device described in claim 5, which is explained below, is regarded as the visual device described in claim 4 with some additional means as follows; some means in order to recognize form and color of the moving objects 2 and the still objects 3 in the frame image 1 more exactly, some means in order to count the number of the moving objects 2 and the still objects 3 more exactly, and means in order to move the moving camera 10 toward the positon of the moving objects 2 and the still objects 3 taken by the moving camera 10 in a certain period more exactly.

Figure 7:
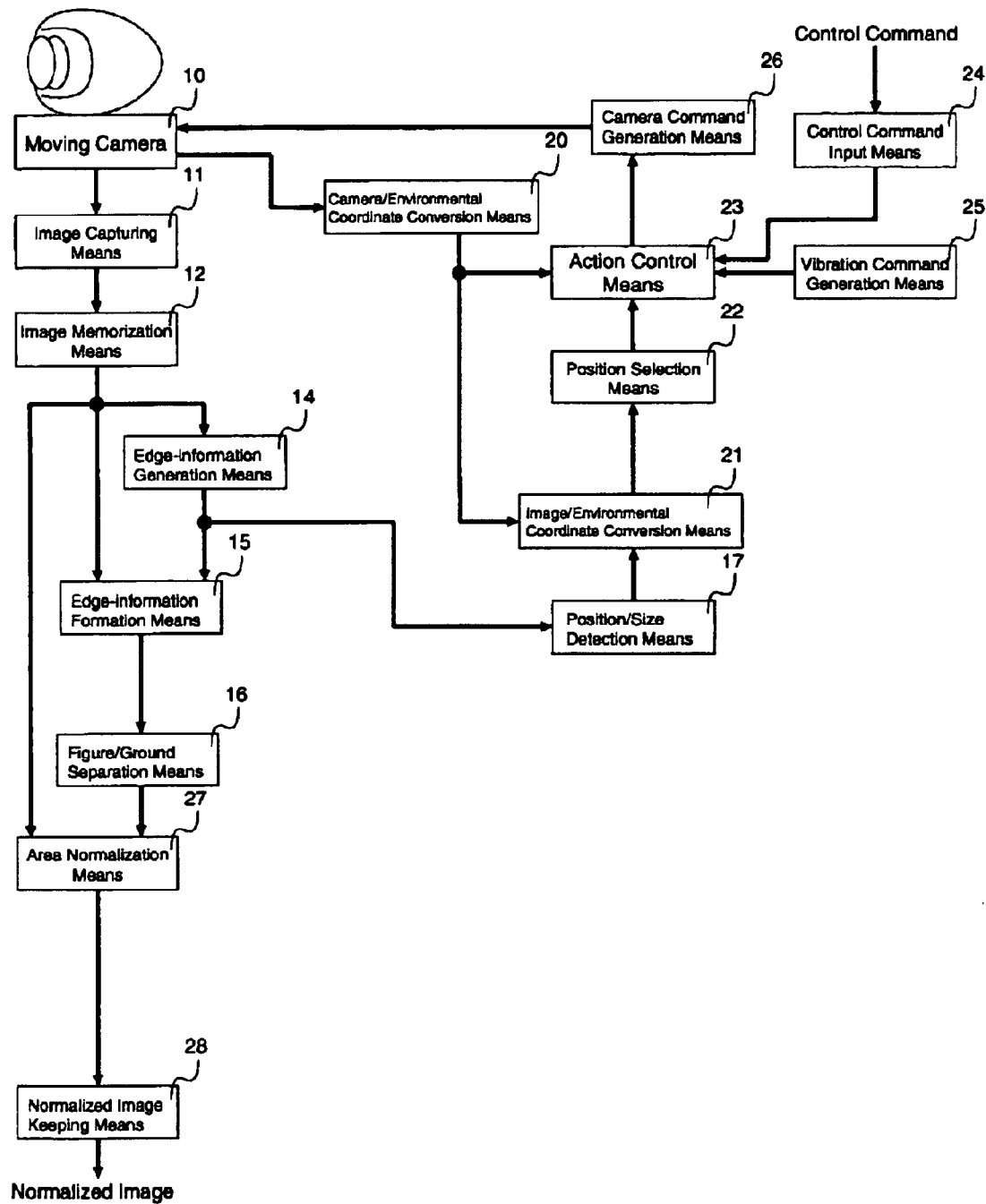
FIG. 7 is a block diagram of a visual device generating a normalized image of an object.

A visual device shown in FIG. 7 generates normalized image 145, by appending the edge-information formation means 15, the figure/ground separation means 16, an area normalization means 27 and an normalized image keeping means 28 to the visual device described in claim 4. The edge-information formation means 15 and the figure/ground separation means 16 are the same as the edge-information formation means 15 and the figure/ground separation means 16 of the visual devices described in claim 1 to claim 3, which consist of a moving-object counting part 101 and an all-object counting part 102, respectively.

Suppose that the area normalization means 27 inputs the object-area image 142 and the digital image 111 from the figure/ground separation means 16 and the image capturing means 11, respectively. The area normalization means 27 generates a normalized image 145 by segmenting the Segmented Object Area 143 from the digital image 111, and by complementing and expanding the Segmented Object Area 143 as varying it and resizing it to the size of the digital image 111. Since the area normalization means 27 can normalize the Segmented Object Area 143 by carrying out neighbor processing every one pixel, the means is suitable for parallel processing. If the area normalization means 27 can output all pixels of the normalized image 145 in parallel, communication from the area normalization means 27 to the normalized image keeping means 28 can carry out in parallel every one pixel.

Suppose that the normalized image keeping means 28 inputs the normalized image 145 from the area normalization means 27. If an output place of the normalized image 145 desires a specific format of the normalized image 145, the normalized image 145 is converted to the format desired by the output place of the normalized image 145. The normalized image keeping means 28 memorizes the normalized image 145 for a specific period until it sends the normalized image 145 to the output place of the normalized image 145 certainly. Since the normalized image keeping means 28 converts the limited format of the normalized image 145 by carrying out neighbor processing every one pixel, the means is suitable for parallel processing. If the normalized image keeping means 28 can output all pixels of the normalized image 145 in parallel, communication from the normalized image keeping means 28 to normalized image 145 can carry out in parallel each one pixel.

Even though any size of the moving objects 2 and any size of the still objects 3 stay at any position of the frame image 1 taken by the visual device described in claim 4, the visual device shown in FIG. 7 can generate the normalized image 145 of as the similar moving objects 2 as possible and as the similar still objects 3 as possible, by using the edge-information formation means 15, the figure/ground separation means 16, the area normalization means 27 and the normalized image keeping means 28. When the output place of normalized image 145 has to recognize the moving objects 2 and the still objects 3, the output place of the normalized image 145 can use the suitable recognition method, without considering the position and the size of the moving objects 2 and the still objects 3 in the frame image 1 very well.

Note that it is not necessary desired that the resolution or the size of an image inputed by the edge-information generation means 14 is consistent with the resolution or the size of the edge-information formation means 15, the figure/ground separation means 16, the area normalization means 27 and the normalized image keeping means 28 in the visual device shown in FIG. 7. For example, suppose that the edge-information generation means 14 inputs a low-resolution digital image 116, which is generated by making the resolutin of the digital image 111 low. Suppose also that the edge-information formation means 15 inputs a rough edge-information image 113, which is a expanded low-resolution Rough edge-information image 117 genereted by the edge-information generation means 14 to the size of the digital image 111 in a specific method. Suppose, moreover, that the figure/ground separation means 16 and the area normalization means 27 input the digital image 111. In this case, the visual device shown in FIG. 7 can reduce loads of the edge-information generation means 14. In short, the visual device can accelerate control of pan, tilt and zoom of the moving camera 10, which is carried out in the position/ size detection means 17 or subsequent means, much more, with seldom changing quality of the normalized image 145 generated by the edge-information formation means 15 or some subsequent means. If this method is advanced further, the visual device shown in FIG. 7 can reduce loads of the edge-information formation means 15 or some subsequent means in generating the normalized image 145, where the edge-information formation means 15 inputs a cut rough edge-information image 113, which is an area of the low-resolution rough edge-information image 117 generated by the edge-information generation means 14 and includes the rough edge information 112. In addition, the figure/ground separation means 16 and the area normalization means 27 inputs a cut digital image 120, which is the same domain as a cut rough edge-information image 119 and is cut from the digital image 111. Therefore, some loads of generating the normalized image 145 in the means after the edge-information formation means 15 can be reduced. If the moving camera 10 can take the frame image 1 which shows the moving objects 2 and the still objects 3 at the center and the size of these objects is suitable, by using the visual device described in claim 4, the device can decide beforehand a cut domain of the cut rough edge-information image 119 and the cut digital image 120 from the digital image 111. By using this method, the visual device with one moving camera 10 shown in FIG. 7 can achieve the same performance as a device finding an object with both a wide-angle camera and a high-resolution camera.

Figure 8:
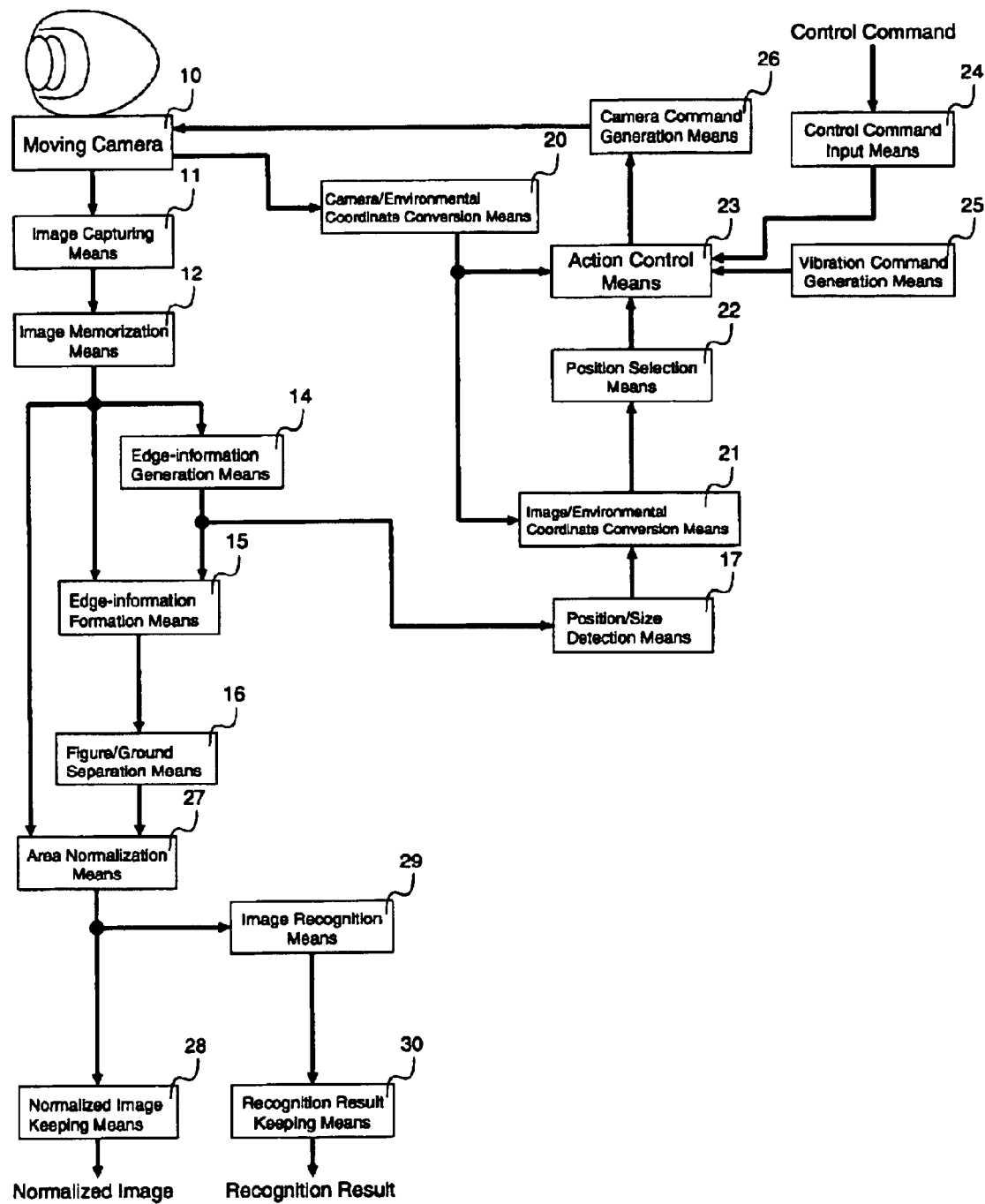
FIG. 8 is a block diagram of a visual device outputing a recognition result of objects.

A visual device shown in FIG. 8 generates a recognition result, by appending an image recognition means 29 and a recognition result keeping means 30 to the visual device shown in FIG. 7.

Suppose that the image recognition means 29 inputs the normalized image 145 from the area normalization means 27. The image recognition means 29 recognizes the normalized area 144 of the moving objects 2 and the still objects 3 by a specific method of pattern recognition, and outputs the recognition result. Since form of the moving objects 2 and the still objects 3 of the normalized image 145 inputed by the image recognition means 29 has been changed by the area normalization means 27, it is suitable for the image recognition means 29 to carry out rather pattern matching that compare an input image with some template images than geometrical analysis using such a method strong to a position gap as stroke extraction method, Fourier transform and Hough transform. The image recognition means 29 can use such neural networks as Perceptron which can learn some template images by back propagation, for the pattern matching method. Moreover, when the neural networks are used, the image recognition means 29 can work in parallel and fast by using an accelerator specialized for the neural networks. The image recognition means 29 outputs the recognition result of the normalized image 145 to the recognition result keeping means 30.

Suppose that the recognition result keeping means 30 inputs the recognition result of the normalized image 145 from the image recognition means 29. If an output place of the recognition result desires a specific format of signals, the recognition result is converted to the format desired by the output place of the recognition result. The recognition result keeping means 30 memorizes the recognition result for a specific period until it sends the recognition result to the output place of the recognition result certainly.

The visual device shown in FIG. 8 can generate the recognition result of the moving objects 2 and the still objects 3 in an image taken by the moving camera 10, whose size of the image is suitable, by using the image recognition means 29 and the recognition result keeping means 30. The output place of the recognition result can use the visual device shown in FIG. 8 for a recognition device of the moving objects 2 and the still objects 3 taken by the moving camera 10.

Figure 9:
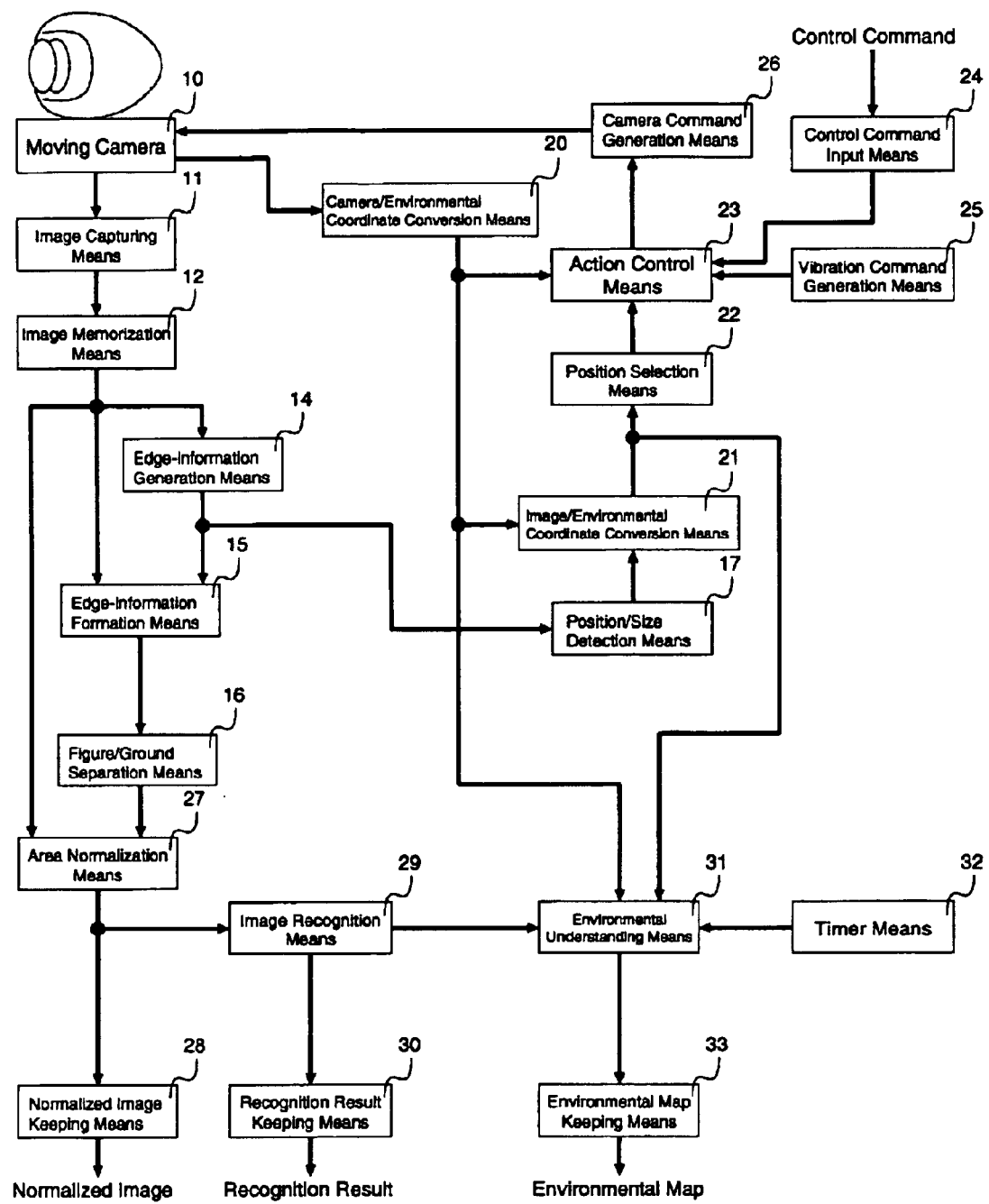
FIG. 9 is a block diagram of a visual device generating an environmental map.

A visual device shown in FIG. 9 generates an environmental map, by appending an environmental understanding means 31, a timer means 32 and an environmental map keeping means 33 to the visual device shown in FIG. 8.

The timer means 32 outputs the present time for one millisecond by using a timer circuit. The timer means 32 always outputs the present time to the environmental understanding means 31.

Suppose that the environmental understanding means 31 inputs the recognition result of the moving objects 2 and the still objects 3 from the image recognition means 29. The environmental understanding means 31 generates an environmental datum consisting of the recognition result, the position of the moving camera 10 on the environmental coordinate system and the present time. Suppose also that the environmental understanding means 31 inputs the position on the environmental coordinate system of all areas of the moving objects 2 and the still objects 3 in the frame image 1 from the image/environmental coordinate conversion means 21. The environmental understanding means 31 generates the same number of environmental data consisting of the recognition result, which is null data, the position adding the position on the environmental coordinate system of the moving camera 10 with the position on the environmental coordinate system of one of the areas of the moving objects 2 and the still objects 3 in the frame image 1, and the present time as the number of the areas of the moving objects 2 and the still objects 3. The environmental map is a set of the environmental data generated within a specific period from the present time, and is represented by the environmental coordinate system, whose origin is the home position of the moving camera 10 the environmental understanding means 31 appends some environmental data to the environmental map one by one, and also deletes them from the environmental map. The environmental understanding means 31 deletes some redundant environmental data. In this case, if the position in an environmental datum whose recognition result is null data is near to the position in other environmental data whose recognition result is not null data, the environmental understanding means 31 also deletes the environmental datum whose recognition result is null data. In the case, moreover, that the position in environmental datum whose recognition result is not null data is near to the position in other environmental data whose recognition result is not null data, if the recognition results of these environmental data the environmental understanding means 31 also deletes the former environmental datum. Accuracy of the environmental map is decided by recording period of the environmental data and domain of neighbors around the position in the environmental data. The environmental understanding means 31 outputs the environmental map to the environmental map keeping means 33.

Suppose that the environmental map keeping means 33 inputs the environmental map from the environmental understanding means 31. If an output place of the environmental map desires a specific format of signals, the environmental map is converted to the format desired by the output place of the environmental map. The environmental map keeping means 33 memorizes the environmental map for a specific period until it sends the environmental map to the output place of the environmental map certainly.

The visual device shown in FIG. 9 can specify the position of the moving objects 2 and the still objects 3 taken by the moving camera 10, by using the environmental understanding means 31, the timer means 32 and the environmental map keeping means 33. The output place of the environmental map can use the visual device shown in FIG. 9 for a device specifying the position of the moving objects 2 and the still objects 3 whose image can be taken by the moving camera 10.

Figure 10:
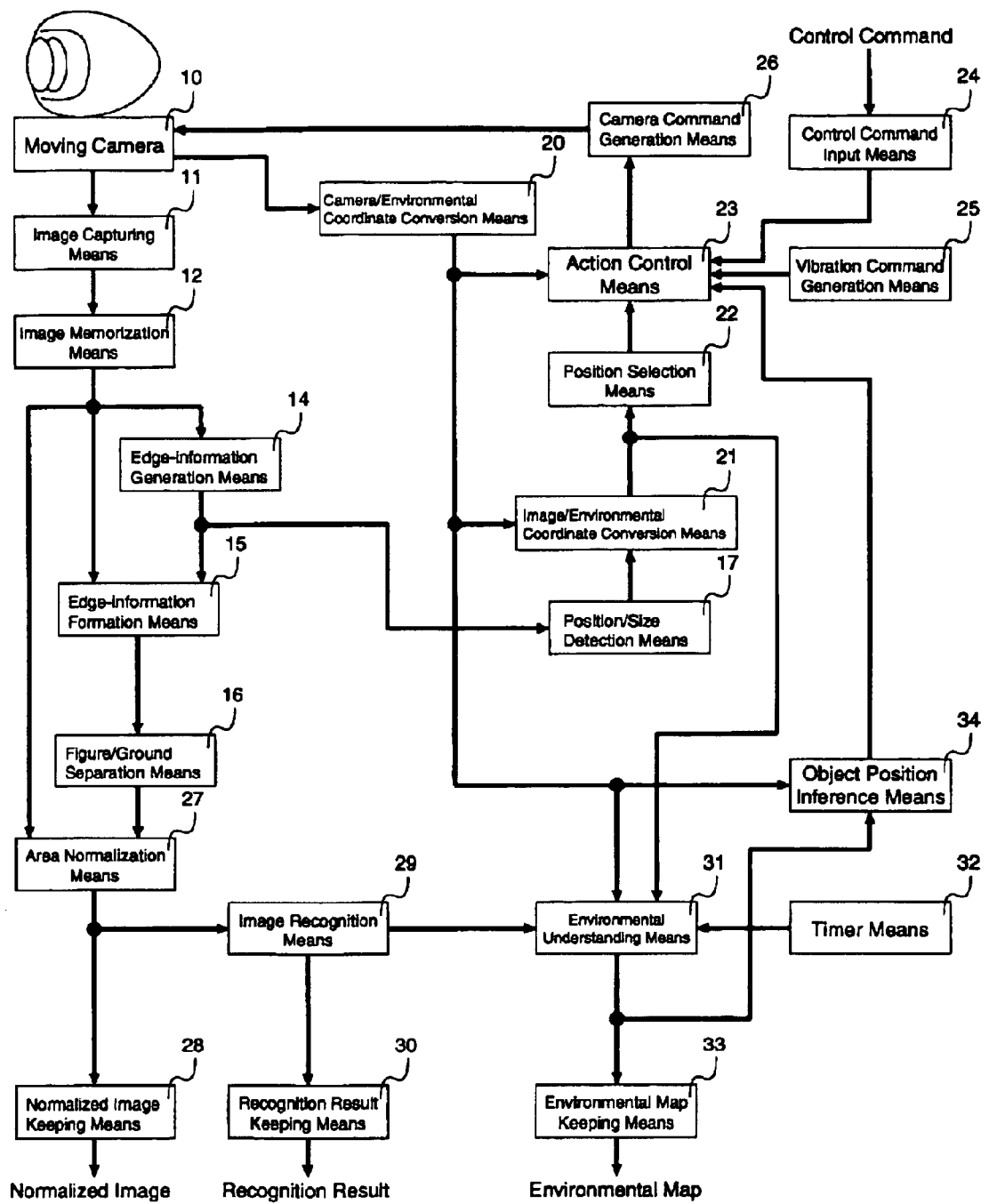
FIG. 10 is a block diagram of a visual device controlling a moving camera, using a environmental map.

A visual device shown in FIG. 10 controls the moving camera 10 to the inferred position of the objects, by appending an object position inference means 34 to the visual device shown in FIG. 9.

Suppose that the object position inference means 34 inputs the environmental map from the environmental understanding means 31. The object position inference means 34 selects one of environmental data whose recognition result is null data, and extracts the position from this environmental datum. When the present position on the environmental coordinate system of the moving camera 10, which is computed by the camera/environmental coordinate conversion means 20, is subtracted from the position, the object position inference means 34 can compute the relative position on the environmental coordinate system of the moving objects 2 and the still objects 3, whose rough edge information 112 has been already generated but whose recognition result has not been decided yet, from the present position on the environmental coordinate system of the moving camera 10, which is regarded as the origin. Note that it is not necessary that the object exists at this relative position at present when the object is moving. This position, thus, is the inferred position of the moving objects 2 and the still objects 3, where the moving objects 2 and the still objects 3 must exist. On the other hand, if there are no environmental data whose recognition result is null data in the Recognition Map, the object position inference means 34 generates a specific position on the environmental coordinate system within domain where the moving camera 10 can move. The standards for generating the specific position, here, are listed as follows: First, the object position inference means 34 generates any position by pseudo-random number. Second, the object position inference means 34 computes the position where density of the position of environmental data in the environmental map is low. Third, the object position inference means 34 generates the position within a domain where the moving camera 10 can move in a specific order, one by one. For example, the object position inference means 34 generates the position from the upper left side toward the right side one by one. When the position achieved to the right side, the position once goes down to the next row and the object position inference means 34 generates the position toward the left side one by one. After the position achieved to the left side, the position once goes down to the next row and the object position inference means 34 generates the position toward the right side one by one. The object position inference means 34 then repeats these steps. The object position inference means 34 can infer effectively the inferred position of the moving objects 2 and the still objects 3 whose image has not been taken by the moving camera 10, by combining with these standards according to the use and the situation of the visual device. The object position inference means 34 outputs the inferred position of the objects to the action control means 23.

Now, based on the action control means 23 in the visual device described in claim 4, the action control means 23 is changed as follows; in order to control pan, tilt and zoom of the moving camera 10, the action control means 23 selects one of input positions from the means which have the input position at present, in order of the control command input means 24, the object position inference means 34, the position selection means 22 and the vibration command generation means 25. Note that the action control means 23 has not to select the input position from the object position inference means 34 successively.

The visual device shown in FIG. 10 can find out the moving objects 2 and the still objects 3 which exist within a domain taken by the moving camera 10, by using the object position inference means 34. The output place of the environmental map can use the visual device shown in FIG. 10 for a device specifying the position of the moving objects 2 and the still objects 3 whose image can be taken by the moving camera 10.

Figure 11:
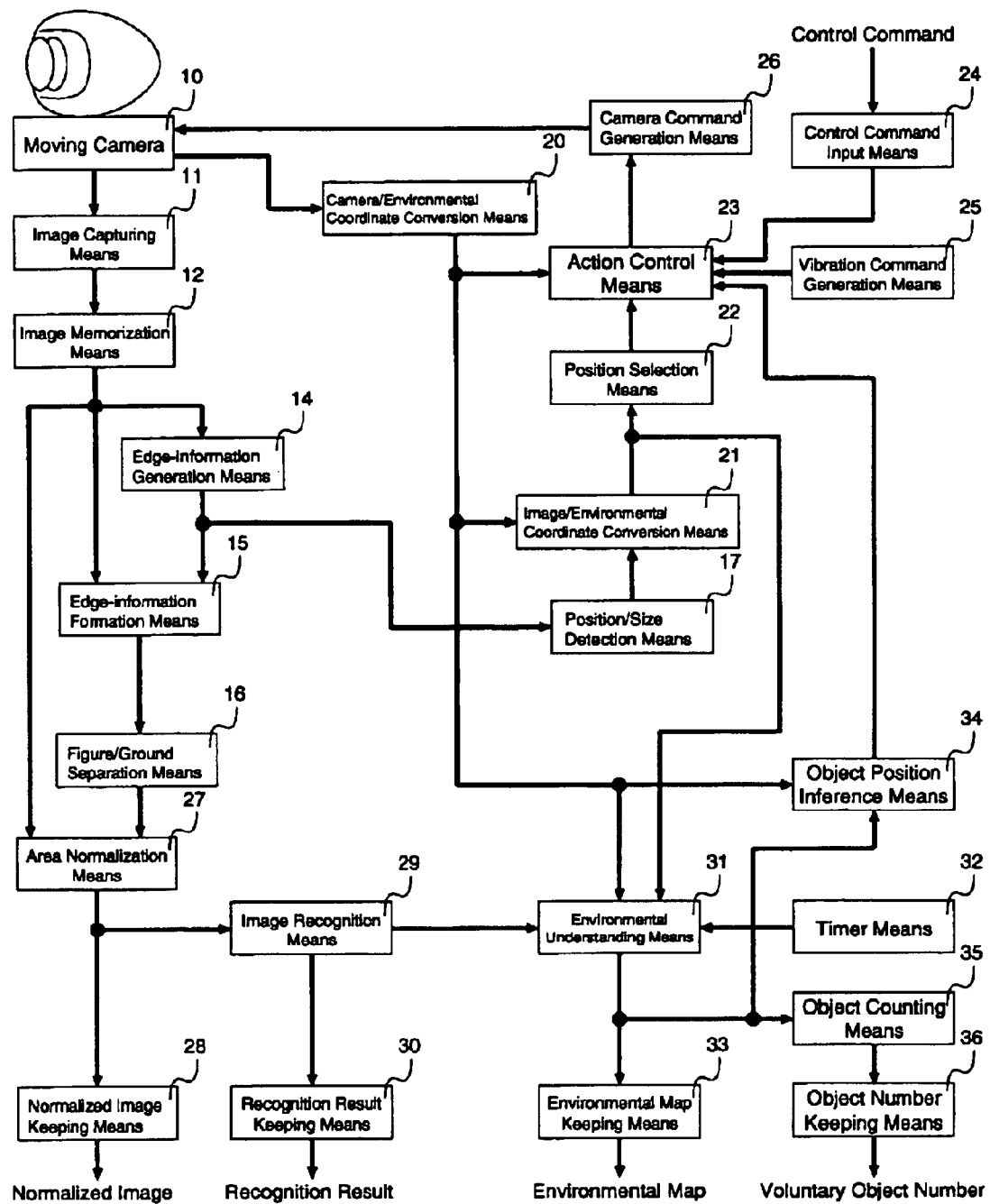
FIG. 11 is a block diagram of a visual device calcurating voluntary object number.

A visual device shown in FIG. 11 generates the voluntary object number, by appending an object counting means 35 and an object number keeping means 36 to the visual device shown in FIG. 10.

Suppose that the object counting means 35 inputs the environmental map from the environmental understanding means 31. The object counting means 35 counts the number of the environmental data having the recognition result which represents some specific objects, in the environmental map and generates the voluntary object number. The recognition result in the environmental can be selected from the type of the objects discriminated by the image recognition means 29 without limit. The object counting means 35 outputs the voluntary object number to the object number keeping means 36.

Note that it is easy for us to change the object counting means 35 as the object counting means 35 can direct the type of the objects which must be counted from an external part, according to the use of the visual device.

Suppose that the object number keeping means 36 inputs the voluntary object number from the object counting means 35. The object number keeping means 36 memorizes the voluntary object number for a specific period until it sends the voluntary object number to the output place of the voluntary object number certainly.

The visual device shown in FIG. 11 can count the number of specific moving objects 2 and still objects 3 which exist within a domain taken by the moving camera 10, by using the object counting means 35 and the object number keeping means 36. The output place of the voluntary object number can use the visual device shown in FIG. 11 for a device counting the number of the specific moving objects 2 and still objects 3 whose image can be taken by the moving camera 10.

Figure 12:
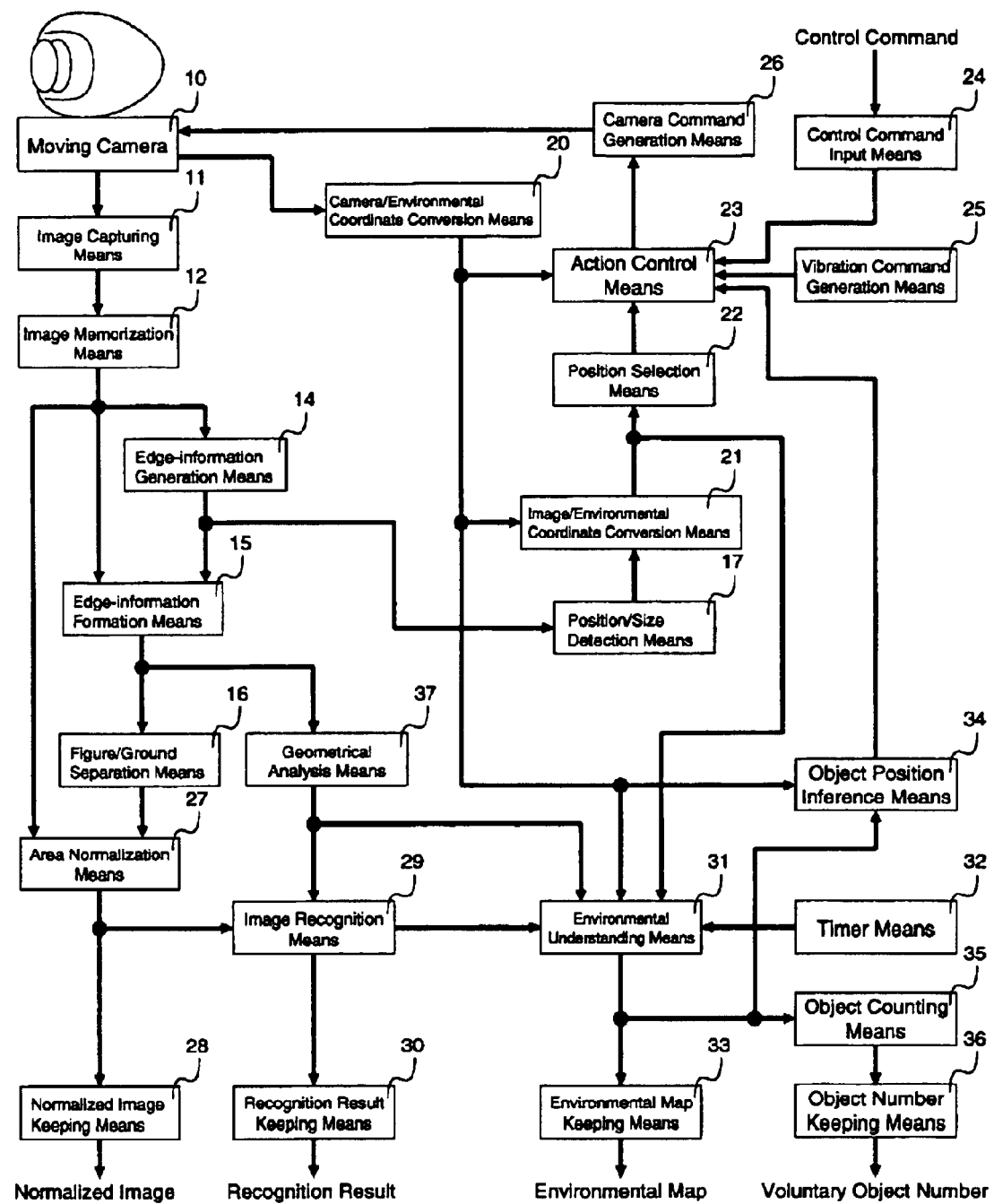
FIG. 12 is a block diagram of a visual device accelerated by geometrical analysis.

As shown in FIG. 12, the visual device described in claim 5 generates the environmental map exactly and quickly, by appending a geometrical analysis means 37 to the visual device shown in FIG. 11.

Suppose that the geometrical analysis means 37 inputs the formed edge-information image 115 from the edge-information formation means 15. The geometrical analysis means 37 infers form of the moving objects 2 and the still objects 3 in the frame image 1 and generates a result of geometrical analysis, by carrying out such geometrical analysis as stroke extraction method, Fourier transform and Hough transform. In previous image recognition, an object in an image has been recognized by extracting line segments directly from the image itself or using many transform methods which are independent of position, size and so on. In spite of simple processing, then, the image recognition needs a huge number of combination of the processing. Since this causes the heavy computational complexity, the image recognition has taken much time to get a desired result. Otherwise, it could get only low quality of recognition results. In the visual device described in claim 5, however, the figure/ground separation means 16, the area normalization means 27 and the image recognition means 29 recognize patterns of the moving objects 2 and the still objects 3 in the frame image 1 in cooperation. When the geometrical analysis means 37 analyzes roughly in a simple way such a figure as contour of the moving objects 2 and the still objects 3, which is no good for the figure/ground separation means 16, the area normalization means 27 and the image recognition means 29, using the formed edge-information image 115, the image recognition means 29 omits unnecessary pattern matching, and the environmental understanding means 31 generates the exact environmental map quickly. In addition, the geometrical analysis means 37 can also reduce load of itself. The geometrical analysis means 37 outputs the result of geometrical analysis to the image recognition means 29 and the environmental understanding means 31. Therefore, the image recognition means 29 and the environmental understanding means 31 work as follows, respectively.

Suppose that the image recognition means 29 the result of geometrical analysis from the geometrical analysis means 37. First, the image recognition means 29 judges whether the result corresponds to the figure of targets recognized by the image recognition means 29 or not. If the result does not correspond to the figure of the targets, the image recognition means 29 does not work. If the result corresponds to the figure of the targets, the image recognition means 29 carries out pattern matching, using some template images for targets' figures. In a case of Perceptron learning by back propagation, the image recognition means 29 is designed as it carries out pattern matching for the target figures effectively, by learning the Perceptron each target figure, by generating learning data of the Perceptron, and by selecting the learning data based on the result of geometrical analysis. In short, if the result of geometrical analysis corresponds to a circle, the image recognition means 29 uses only learning data of circular objects like human faces and balls. If the result of geometrical analysis corresponds to a triangle, the image recognition means 29 uses only learning data of triangular objects like road signs and a mountain range. In this case, not only the image recognition means 29 can recognize patterns of many objects in a small size of Perceptron, but also the Perceptron itself can learn effectively.

Suppose that the environmental understanding means 31 inputs the result of geometrical analysis from the geometrical analysis means 37. First, the image recognition means 29 judges whether the result corresponds to the figure of targets recognized by the image recognition means 29 or not. If the result does not correspond to the figure of the targets, the environmental understanding means 31 deletes immediately some environmental data, whose position is near the position on the environmental coordinate system of the moving camera 10 and whose recognition result is null data, from the environmental map. Since some unnecessary environmental data are deleted from the environmental map, the object position inference means 34 and so on do not have to output some unnecessary inferred positions of objects. If the result corresponds to the figure of the targets, the environmental understanding means 31 waits until the recognition result is inputed from the image recognition means 29.

The visual device described in claim 5 can count exactly and quickly the number of specific moving objects 2 and still Objects 3 which exist within a domain taken by the moving camera 10, by using the geometrical analysis means 37. The output place of the voluntary object number can use the visual device described in claim 5 for a fast device counting the number of the specific moving objects 2 and still objects 3 whose image can be taken by the moving camera 10.

Now, the image memorization means 12, the image vibration means 13, the edge-information generation means 14, the edge-information formation means 15, the figure/ground separation means 16, the position/size detection means 17, the area normalization means 27, the normalized image keeping means 28 and the image recognition means 29 used in the visual devices described in claim 1 to claim 5 can be implemented by using a data processing device 110 consisting of some array operation units 40. I list below some enforcement forms of the data processing device 110 consisting of the array operation units 40, and explain about the visual devices described in claim 6 to claim 12, with reference to the drawings.

Figure 13:
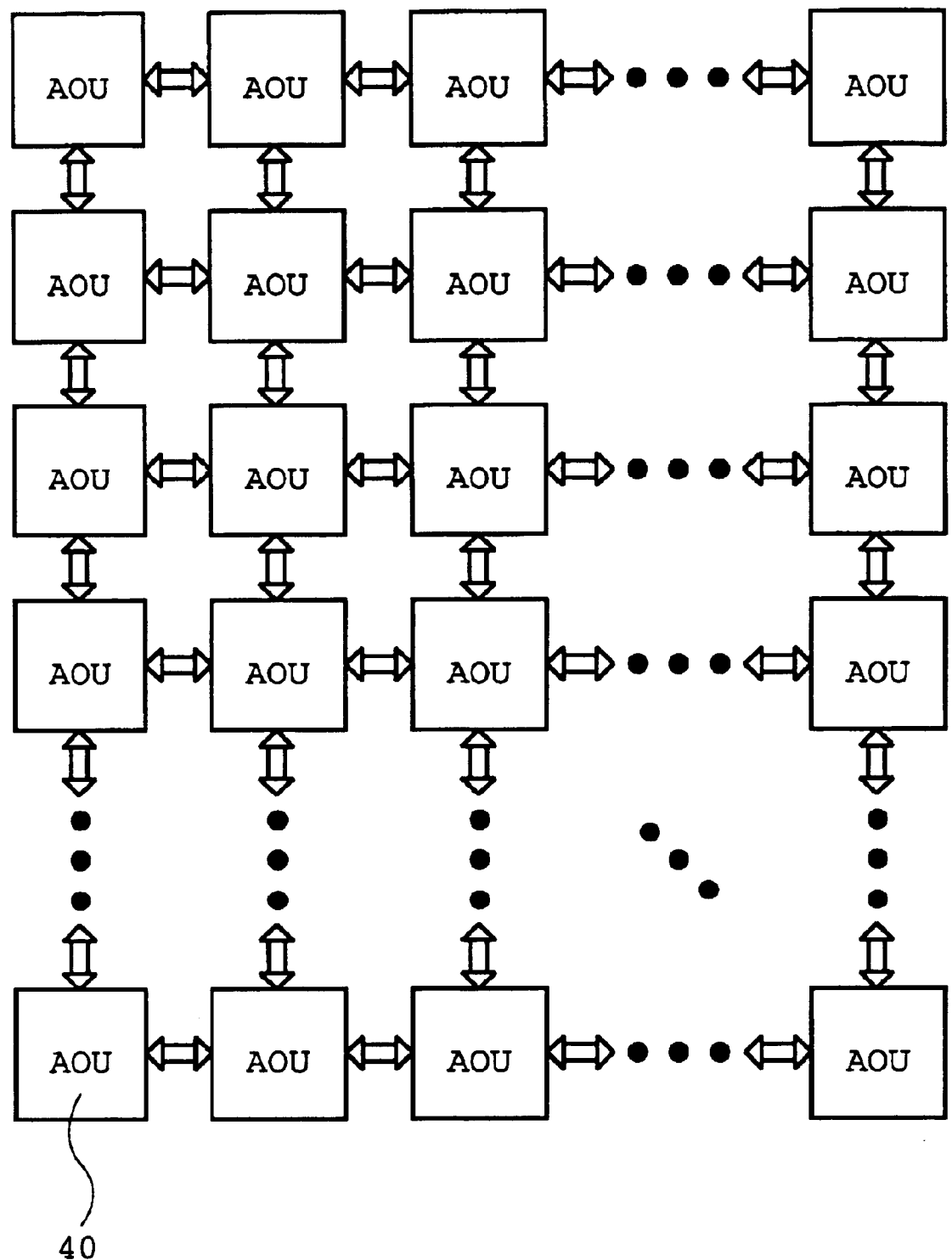
FIG. 13 is a block diagram of array operation units arranged in the shape of a lattice.

First, the array operation unit 40 generates a pixel in an output image, by using a pixel and some neighbor pixels in an input image. As shown in FIG. 13, the data processing device 110 can generate the output image from the input image, when some array operation units 40 are arranged in the shape of a lattice in the data processing device 110, according to the size of the input image. Note that the array operation unit 40 is denoted as AOU in FIG. 13. Next, the array operation unit 40 may be implemented by a specialized hardware. Otherwise, it can be implemented by a software on a general computer, too. That is, if the data processing device 110 can generate the output image from the input image, the implementation way of the array operation unit 40 is not limited. Image processing of the data processing device 110 can be appeared by describing some algorithms of the array operation unit 40. In order to describe the algorithms of the array operation unit 40, it is explained here about some equations used in the image memorization means 12 (refer to FIG. 1 and FIG. 6), the image vibration means 13 (refer to FIG. 3, FIG. 4 and FIG. 5), the edge-information generation means 14 (refer to FIG. 1 and FIG. 6), the edge-information formation means 15 (refer to FIG. 1 or FIG. 5, FIG. 7 or FIG. 12), the figure/ground separation means 16 (refer to FIG. 2, FIG. 4, FIG. 5, FIG. 7 or FIG. 12), the position/size detection means 17 (refer to FIG. 1 and FIG. 6), the area normalization means 27 (refer to FIG. 7), the normalized image keeping means 28 (refer to FIG. 7), and the image recognition means 29 (refer to FIG. 8).

Suppose that any three $2^n$-tone image whose width is w, whose heigth is h, whose band number is b are denoted as x, y and w. The x, y and w are represented as EQ.1, EQ.2 and EQ.3, using three band-pixel values $x_{ijk}$, $y_{ijk}$ and $w_{ijk}$ at a position p(i, j, k), respectively. Note that bold letters means vectors, n is the non-negative number, w, h, b, i, j and k are the natural number.

$$x=\{x_{ijk}|x_{ijk} \text{ is value at p(i, j, k)}, 1 \leq i \leq w, 1 \leq j \leq h, 1 \leq k \leq b\} \quad (1)$$

$$y=\{y_{ijk}|y_{ijk} \text{ is value at p(i, j, k)}, 1 \leq i \leq w, 1 \leq j \leq h, 1 \leq k \leq b\} \quad (2)$$

$$w=\{w_{ijk}|w_{ijk} \text{ is value at p(i, j, k)}, 1 \leq i \leq w, 1 \leq j \leq h, 1 \leq k \leq b\} \quad (3)$$

First, it is described here about functions on point processing for each band-pixel value in the above images.

When the image x is converted to a binary image, EQ.4 makes the band-pixel value of x binary.

$$\Phi_{ijk}(x) = \begin{cases} 1 & \text{if } x_{ijk} > 0, \\ 0 & \text{otherwise.} \end{cases} \quad (4)$$

When the image x is converted to a band maximum-value image, EQ.5 selects the maximum value of all band values of pixel at column i and row j. Note that the number of bands of the above band maximum-value image is dealt with one for convenience since the above band maximum-value image becomes a one-band image. The third index of function $B_{ij1}(x)$ is then equal to one.

$$B_{ij1}(x) = \max\{x_{ijk}\} \quad (5)$$

Suppose that the image x is a binary image. When the image x is inverted, EQ.6 calculates inversion.

$$I_{ijk}(x) = 1 - x_{ijk} \quad (6)$$

EQ.7 converts a value at a position p(i, j, k) of the image x to a logarithm of the value. Note that e is a offset value, and there is no problem for e=1 in general because this value is used in order for a value which a natural logarithmic functin outputs to be within valid range. Subtraction between two band-pixel values can supersede division between them by this convertion. Suppose also that the image x is a $2^n$-tone digital image. If a memory has a look-up table including $2^n$ elements in spite of the number of bands, a natural logarithm function does not have to be calcurated every time, and the memory also does not have to memorize a standard table of logarithms.

$$L_{ijk}(x) = \ln(x_{lmk} + e) \quad (7)$$

Now, a set $P_{ijk}(q)$ of neighbor positions around p(i, j, k) is represented by EQ.8, where q is a progression of 4, 8, 24, 48, 80, 120, $(2r+1)^2-1$, and r is a natural number. When a position outside of an image is included in the set $P_{ijk}(q)$, it is superseded by the position p(i, j, k) as long as there is especially no specification. Otherwise, the position is superseded by a fictitious position, a pixel value at which is equivalent to zero, and which is not included by the image. Processing around the border is automatically carried out by this replacement. Then, the number of elements, $N_{ijk}$, of the set $P_{ijk}(q)$ is always q.

$$P_{ijk}(q) = \begin{cases} \{p(i+1, j, k), p(i, j+1, k), p(i-1, j, k), p(i, j-1, k)\} & \text{if } q = 4, \\ \{p(l, m, k) \mid i-r \le l \le i+r, j-r \le m \le j+r, p(l, m, k) \ne p(i, j, k)\} & \text{if } q = (2r+1)^2 - 1. \end{cases} \quad (8)$$

I explain here about some functions and an operator for each band-pixel value on neighbor processing, the number of whose neighbors is less than or equal to eight.

The vibration at the position p(i, j, k) of the image x is carried out according to EQ.9. It can be decided by a way selecting only one position from q neighbors around the position p(i, j, k) whether the whole image is vibrated or each pixel is vibrated independently. If one of q neighbors is selected by the same way for all positions of the image x, all pixels of the image x vibrates together. On the other hand, if one of q neighbors is selected randomly in each position of the image x, using random number and so on, each pixel of the image x vibrates scatteringly.

$$\Xi_{ijk}(x) = x_{lmk} \text{ for only one of } p(l, m, k) \in P_{ijk}(q) \quad (9)$$

Smoothing at the position p(i, j, k) of the image x is carried out according to EQ.10, where int(v) represents omission below decimal point for any real number v. Let us consider a case that this equation is implemented by a hardware. If a band-pixel value of the image x is an integer, a division circuit is reduced by changing a general arithmetic circuit as to perform a right-shift command two times in calcurating summation of $x_{lmk}$ if $N_{ijk}=4$, or three times in calcurating summation of $x_{lmk}$ if $N_{ijk}=8$.

$$S_{ijk}(x) = int\left(\frac{1}{N_{ijk}} \sum_{p(l,m,k) \in P_{ijk}(q)} x_{lmk}\right) \quad (10)$$

As shown in EQ.11, a Laplacian operator is just a second differential operator. Since a Laplacian operator for eight neighbors can catch a delicate change of noise, it makes many zero-points and zero crossing. The Laplacian operator for eight neighbors is suitable for the present invention. Let us consider a case that this equation is implemented by a hardware. Since $N_{ijk}$ is either four or eight, a multiple circuit is reduced by changing a general arithmetic circuit as to perform a left-shift command two times in calcurating summation of $x_{lmk}$ if $N_{ijk}=4$, or three times in calcurating summation of $x_{lmk}$ if $N_{ijk}=8$.

$$\nabla^2_{ijk} x = \sum_{p(l,m,k) \in P_{ijk}(q)} x_{lmk} - N_{ijk} x_{ijk} \quad (11)$$

The way deriving a zero-point from a value calcurated by a Laplacian operator has found a pixel value varying from positive to negative. According to EQ.12, however, the present invention finds a pixel value which shows zero crossing from negative to positive, which goes via zero such as from negative to zero and from zero to positive, and which remains zero.

In the present invention, a zero-point found by EQ.12 does not suggest a place where edge exists, but represents a place where noise happens, that is, where edge does not exist. EQ.12 also makes real number binary.

$$Z_{ijk}(x) = \begin{cases} 1 & \text{if } x_{ijk} \le 0 \text{ and } x_{lmk} \ge 0 \text{ for } \exists p(l, m, k) \in P_{ijk}(q), \\ 0 & \text{otherwise.} \end{cases} \quad (12)$$

Suppose that the image x is any binary image. The filling a pixel with a hole in the image x is carried out according to EQ.13, where a parameter f represents the size of the hole to fill, and there is no problem for f=1 in general. Since this equation for four neighbors can not detect a diagonal line in nature, the equation has to use eight neighbors as much as possible.

$$F_{i,j,k}(x) = \begin{cases} 1 & \text{if } \sum_{p(l,m,k) \in P_{ijk}(q)} x_{lmk} + f \ge N_{ijk}, \\ x_{ijk} & \text{otherwise.} \end{cases} \quad (13)$$

Suppose that the image x is any binary image. The deleting a pixel with an alone point or an alone hole in the image x is carried out according to EQ.14. Since this equation for four neighbors can not detect a diagonal line by nature, the equation has to use eight neighbors as much as possible.

$$A_{ijk}(x) = \begin{cases} 0 & \text{if } x_{ijk} = 1 \text{ and } \sum_{p(l,m,k) \in P_{ijk}(q)} x_{lmk} = 0, \\ 1 & \text{if } x_{ijk} = 0 \text{ and } \sum_{p(l,m,k) \in P_{ijk}(q)} x_{lmk} = N_{ijk}, \\ x_{ijk} & \text{otherwise.} \end{cases} \quad (14)$$

Suppose that the image x is any binary image. In order to detect some lines whose width is equal to one in the image x, EQ.15 finds a pixel making the lines, using its four neighbors.

$$J_{ijk}(x) = \begin{cases} x_{ijk} & \text{if } x_{i-1jk} + x_{i+1jk} = 0 \text{ or } x_{ij-1k} + x_{ij+1k} = 0, \\ 0 & \text{otherwise.} \end{cases} \quad (15)$$

Suppose that two image x and y are binary images, and the image y consists of pixels representing a line whose width is equal to one in the image x. In order to expand the lines whose width is equal to one in the image x, EQ.16 change a pixel, using its four neighbors.

$$K_{ijk}(x, y) = \begin{cases} 1 & \text{if } y_{i-1jk} + y_{i+1jk} + y_{ij-1k} + y_{ij+1k} > 0, \\ x_{ijk} & \text{otherwise.} \end{cases} \quad (16)$$

The complement of line width in a binary image can be simply described by EQ.17, using the detection of line width, EQ.15, and the expansion of line width, EQ.16.

$$C_{ijk}(x) = K_{ijk}(x, J(x)) \quad (17)$$

I explain here about some functions and operators for each band-pixel value on neighbor processing.

Suppose that there axe two image x and y. A maximum-value image between them is derived by EQ.18.

$$M_{ijk}(x, y) = \begin{cases} x_{ijk} & \text{if } x_{ijk} \geq y_{ijk}, \\ y_{ijk} & \text{otherwise.} \end{cases} \quad (18)$$

Suppose that there are two image x and y. A difference between them is calcurated by EQ.19.

$$D_{ijk}(x,y) = x_{ijk} - y_{ijk} \quad (19)$$

The enhancement of a binary image can be simply described by EQ.20, using the Laplacian operator, EQ.11, and the diffenece, EQ.19.

$$E_{ijk}(x) = D_{ijk}(x, \nabla_{ijk}^2 x) \quad (20)$$

Suppose that there are two image x and y, and the image y is a one-band binary image. EQ.21 can mask each band-pixel value of the image x by a band-pixel value of the image y.

$$O_{ijk}(x,y) = x_{ijk} y_{ijl} \quad (21)$$

Suppose that there are two image x and y, and they are both binary. The image y can be operated orthopedically according to EQ.22, based on the image x.

$$Q_{ijk}(x, y) = \begin{cases} x_{ijk} & \text{if } y_{ijk} + \sum_{p(l,m,k) \in P_{ijk}(q)} y_{lmk} > 0, \\ 0 & \text{otherwise.} \end{cases} \quad (22)$$

Suppose that there are two image x and y, and the image y is binary. A band-pixel value of the image x not directed by the image y is complemented by the average of some band-pixel values, which are directed by the image y, among neighbors of the band-pixel value of the image x, according to EQ.23. Note that int(v) represents omission below decimal point for any real number v.

$$V_{ijk}(x, y) = \quad (23)$$

$$\begin{cases} \text{int}\left( \dfrac{\sum_{p(l,m,1) \in P_{ijl}(q)} x_{lmk} y_{lml}}{\sum_{p(l,m,1) \in P_{ijl}(q)} y_{lml}} \right) & \text{if } y_{ijl} = 0 \text{ and } \sum_{p(l,m,1) \in P_{ijl}(q)} y_{lml} > 0, \\ x_{ijk} & \text{otherwise.} \end{cases}$$

In the present invention, now, processing is carried out more simply by regarding positions of an image and transfer values as image data. I call this imagery of positions. It is described here about some functions and operators on imagery of positions.

Suppose first that an operator converting all values, l, m, o of a positon p(l, m, o) to a band-pixel value for an image datum is denoted as #, moreover the converted band-pixel value is denoted as #p(l, m, o). Let us consider a case that a band-pixel value is transferd from the position p(i, j, k) to the position p(i+l,j+m,k+o). A transfer value of the band-pixel value is represented by the position p(l, m, o). In short, a transfer value is regarded as a vector from some position. A operator taking out a position from a band-pixel value is denoted as $\#^{-1}$, where $\#^{-1}\#p(l,m,o) = p(l,m,o)$.

EQ.24 can change the direction of a transfer value p(i,j, k) to the opposite direction, that is, 180 degrees in a plane represented by width and height.

$$\gamma(p(i, j, k)) = p(-i, -j, k) \quad (24)$$

Suppose that there is an image x, and the image y is binary, a transfer value toward gravity center at a position p(i, j, 1) of the image x is calcurated by EQ.25. Although division has to be carried out by nature in calcurating the gravity center, the division is omitted in EQ.25 because the division is offset in converting the transfer value to one of eight neighbors.

$$G_{ijl}(x) = \quad (25)$$

$$p\left( \sum_{p(l,m,1) \in P_{ijl}(q)} (l-i)x_{lml}, \sum_{p(l,m,1) \in P_{ijl}(q)} (m-j)x_{lml}, 0 \right)$$

A pixel value of a transfer-value image can be made from a transfer value p(i, j, k), by converting p(i, j, k) to one of eight neighbors, according to EQ.26 and EQ.27, where EQ.27 is used only when an descrete image makes a trouble in EQ.26.

$$\Theta(p(i, jk)) = \begin{cases} \#p(1, 0, k) & \text{if } i > 0, |j| < |i|/2, \\ \#p(1, -1, k) & \text{if } i > 0, j < 0, |i|/2 \le |j| \le 2|i|, \\ \#p(0, -1, k) & \text{if } j < 0, 2|i| < |j|, \\ \#p(-1, -1, k) & \text{if } i < 0, j < 0, |i|/2 \le |j| \le 2|i|, \\ \#p(-1, 0, k) & \text{if } i < 0, |j| < |i|/2, \\ \#p(-1, 1, k) & \text{if } i < 0, j > 0, |i|/2 \le |j| \le 2|i|, \\ \#p(0, 1, k) & \text{if } j > 0, 2|i| < |j|, \\ \#p(1, 1, k) & \text{if } i > 0, j > 0, |i|/2 \le |j| \le 2|i|, \\ \#p(0, 0, k) & \text{otherwise.} \end{cases} \quad (26)$$

$$\Theta'(p(i, jk)) = \begin{cases} \#p(1, 0, k) & \text{if } i > 0, |j| < |i|/2, \\ \#p(1, 0, k) & \text{if } i > 0, j < 0, |i|/2 \le |j| \le 2|i|, \\ \#p(0, 1, k) & \text{if } i < 0, j < 0, |i|/2 \le |j| \le 2|i|, \\ \#p(0, 1, k) & \text{if } j > 0, 2|i| < |j|, \\ \#p(1, 1, k) & \text{if } i > 0, j > 0, |i|/2 \le |j| \le 2|i|, \\ \#p(0, 0, k) & \text{otherwise.} \end{cases} \quad (27)$$

The band-pixel value of the transfer-value image toward the gravity center of the one-band binary image x can be simply described by EQ.28 and EQ.29, using EQ.25, EQ.26 and EQ.27. Note that the number of bands of the transfer-value image is equal to one.

$$\Delta_{ij1}(x) = \Theta(G_{ij1}(x)) \quad (28)$$

$$\Delta'_{ij1}(x) = \Theta'(G_{ij1}(x)) \quad (29)$$

On the other hand, since the opposite position against the gravity center is derived by EQ.24, the band-pixel value of the transfer-value image against the gravity center of the one-band binary image x can be simply described by EQ.30. Note that the number of bands of the transfer-value image is equal to one.

$$R_{ij1}(x) = \Theta(Y(G_{ij1}(x))) \quad (30)$$

Suppose that there are two image x and y, and the image y is a transfer-value image. After a band-pixel value of the image x is transferd to a transfer position directed by the image y, according to EQ.31, a grayscale image can be made from summation of some band-pixel values which have been transfered to the sane band-pixel.

$$\Gamma_{ijk}(x, y) = \quad (31)$$
$$\sum x_{lmk} \text{ for } p(l, m, 1) \in P_{ijl}(q) \text{ and } \#^{-1}y_{lml} = p(i-l, j-m, 0).$$

In a case that each pixel of the one-band grayscale image x is transfered to one of neighbors toward the gravity center, followed by calcurating the summation of the band-pixel values transfered to the same band-pixel, this process can be simply described by EQ.32 and EQ.33, using EQ.4, EQ.28, EQ.29 and EQ.31.

$$\nabla_{ij1}(x) = \Gamma_{ij1}(x, \Delta(\Phi(x))) \quad (32)$$

$$\nabla'_{ij1}(x) = \Gamma_{ij1}(x, \Delta'(\Phi(x))) \quad (33)$$

Suppose that there are two image x and y, the image x is a binary image, and the image y is a transfer-value image. Since a transfer position of each band-pixel value of the image x can be derived, some band-pixel values whose transfer position is redundant can also be found. EQ.34 generates a band-pixel value of a transferability image appearing that a transfer position of each band-pixel value of the image x is not redundant, and that the band-pixel value can also be transfered to another position. Note that the number of bands of the transferability image is equal to one.

$$H_{ijl}(x, y) = \begin{cases} 1 & \text{if } x_{ijl} = 0 \text{ and } \#^{-1}y_{lml} = p(i-l, j-m, 0) \\ & \text{for only one of } p(l, m, 1) \in P_{ijl}(q), \\ 0 & \text{otherwise.} \end{cases} \quad (34)$$

Suppose that there are two image x, y and w, the image y is a transferability image, and the image w is a transfer-value image. EQ.35 can transfer a band-pixel value of the image x.

$$T_{ijk}(x, y, w) = \begin{cases} x_{lmk} & \text{if } y_{ijl} = 1 \text{ and } \#^{-1}w_{lml} = p(i-l, j-m, 0) \\ & \text{for } \exists p(l, m, 1) \in P_{ijl}(q), \\ 0 & \text{if } y_{lml} = 1 \text{ and } \#^{-1}w_{ijl} = p(i-l, j-m, 0) \\ & \text{for } \exists p(l, m, 1) \in P_{ijl}(q), \\ x_{ijk} & \text{otherwise.} \end{cases} \quad (35)$$

The band-pixel value of an image that can be derived by transfering a band-pixel value of the image x to the direction against the gravity center derived from the binary image y can be simply described by EQ.36, using EQ.30, EQ.34 and EQ.35.

$$U_{ijk}(x,y) = T_{ijk}(x, H(y, R(y)), R(y)) \quad (36)$$

Algorithm of all array operation units 40 in a data processing device 110, which can realize the image memorization means 12 (refer to FIG. 1 and FIG. 6), the image vibration means 13 (refer to FIG. 3, FIG. 4 and FIG. 5), the edge-information generation means 14 (refer to FIG. 1 and FIG. 6), the edge-information formation means 15 (refer to FIG. 1 or FIG. 5, FIG. 7 or FIG. 12), the figure/ground separation means 16 (refer to FIG. 2, FIG. 4, FIG. 5, FIG. 7 or FIG. 12), the position/size detection means 17 (refer to FIG. 1 and FIG. 6), the area normalization means 27 (refer to FIG. 7), and the normalized image keeping means 28 (refer to FIG. 7), can be described by EQ.1 to EQ.36. It is explained here about the visual devices described in claim 6 to claim 10, corresponding to the image vibration means 13, the edge-information generation means 14, the edge-information formation means 15, the position/size detection means 17 and the area normalization means 27, respectively, by representing the algorithm of any array operation unit 40 in the data processing device 110.

Figure 14:
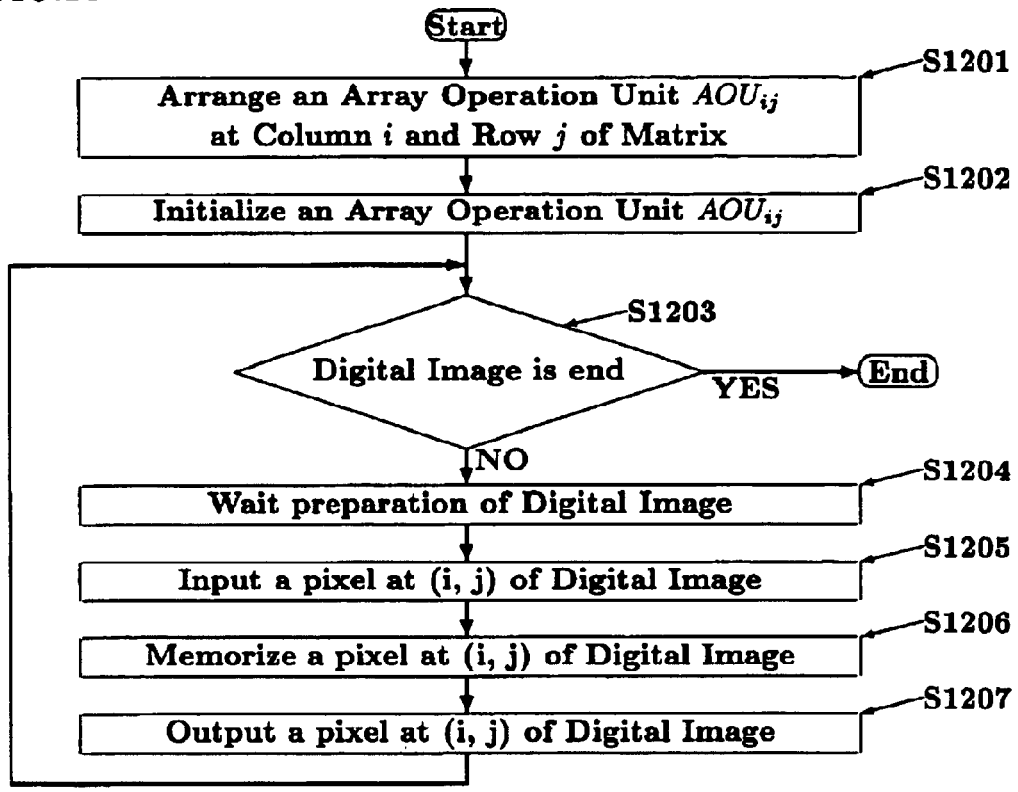
FIG. 14 is a flow chart appearing an algorithm of an image memorization means in this enforcement form.

In order for the image memorization means 12 (refer to FIG. 1 and FIG. 6) realized by a data processing device 110 to memorize a digital image 111, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 14.

At step 1201, $AOU_{ij}$ is arranged at the column i and the row j of the matrix. This is desired to decide neighbors of $AOU_{ij}$ either logically and physically.

At step 1202, neighbors of $AOU_{ij}$ are set and its parameters are initialized.

At step 1203, $AOU_{ij}$ judges whether there is a digital image 111 inputed one by one or not. If there is not the digital image 111 any more (step 1203: YES), this algorithm ends. If there is the digital image 111 (step 1203: NO), this algorithm goes to step 1204. Note that this algorithm can be an infinite loop when array operation unit 40 is realized for a specific size of the image.

At step 1204, $AOU_{ij}$ waits while the input digital image 111 is under preparation.

At step 1205, $AOU_{ij}$ inputs the whole pixel on the column i and the row j of the digital image 111. Therefore, $AOU_{ij}$ needs memory 42 memorizing at least the number of bands of image data.

At step 1206, $AOU_{ij}$ memorizes the pixel on the column i and the row j of the digital image 111, as outputing the pixel during waiting the input data.

At step 1207, $AOU_{ij}$ outputs all band-pixel values of the digital image 111. This algorithm then returns to step 1203.

The visual device corresponding to the image memorization means 12 can memorize the digital image 111, by using the data processing device 110 consisting of array operation units 40.

Figure 15:
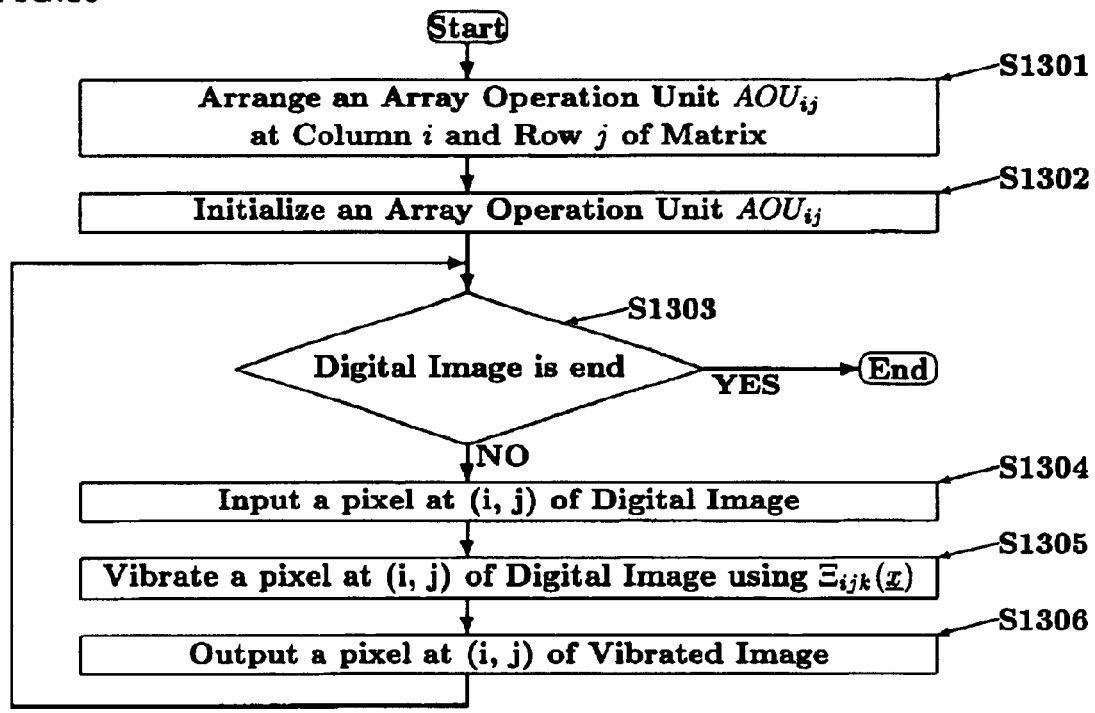
FIG. 15 is a flow chart appearing an algorithm of an image vibration means in this enforcement form.

In order for the image vibration means 13 described in claim 6 (refer to FIG. 3, FIG. 4 and FIG. 5) realized by a data processing device 110 to vibrate a digital image 111, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 15.

At step 1301, $AOU_{ij}$ is arranged at the column i and the row j of the matrix. This is desired to decide neighbors of $AOU_{ij}$ either logically and physically.

At step 1302, neighbors of $AOU_{ij}$ are set and its parameters are initialized.

At step 1303, $AOU_{ij}$ judges whether there is a digital image 111 inputed one by one or not. If there is not the digital image 111 any more (step 1303: YES), this algorithm ends. If there is the digital image 111 (step 1303: NO), this algorithm goes to step 1304. Note that this algorithm can be an infinite loop when array operation unit 40 is realized for a specific size of the image.

At step 1304, $AOU_{ij}$ inputs the whole pixel on the column i and the row j of the digital image 111. Therefore, $AOU_{ij}$ needs memory 42 memorizing at least the number of bands of image data.

At step 1305, $AOU_{ij}$ transfers the pixel on the column i and the row j of the digital image 111 to one of its neighbors, according to the function $\Xi_{ijk}(x)$.

At step 1306, $AOU_{ij}$ outputs all band-pixel values of the digital image 111. This algorithm then returns to step 1303.

The visual device described in claim 6 corresponding to the image vibration means 13 can vibrate the digital image 111, by using the data processing device 110 consisting of array operation units 40.

Figure 16:
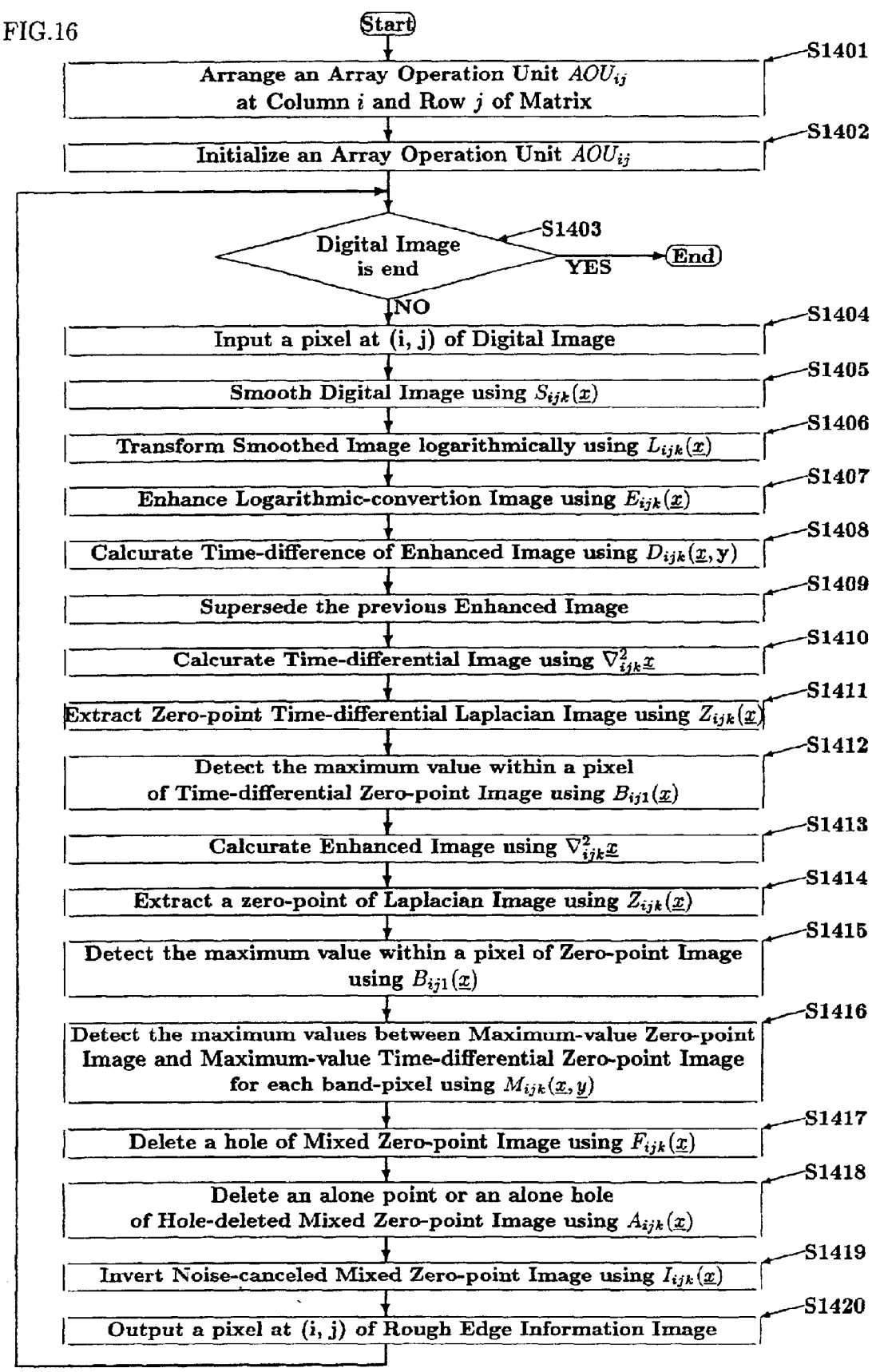
FIG. 16 is a flow chart appearing an algorithm of an edge information generation means in this enforcement form.

In order for the edge-information generation means 14 described in claim 7 (refer to FIG. 1 and FIG. 6) realized by a data processing device 110 to generate rough edge-information image 113 from a digital image 111, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 16.

At step 1401, $AOU_{ij}$ is arranged at the column i and the row j of the matrix. This is desired to decide neighbors of $AOU_{ij}$ either logically and physically.

At step 1402, neighbors of $AOU_{ij}$ are set and its parameters are initialized. In setting the neighbors, the number of neighbors used in the above functions can be defined as either four or eight individually, or all of them can be defined as either four or eight uniformly. In order to make rough edge information 112 generated by the edge-information generation means 14 of the present invention more exact, the number of neighbors q has to be set to eight for all functions. The edge-information generation means 14, however, can cope with limitation of computational time to generate the rough edge information 112 and the number of bands of the digital image 111, by varying the number of neighbors suitably.

At step 1403, $AOU_{ij}$ judges whether there is a digital image 111 inputed one by one or not. If there is not the digital images 111 any more (step 1403: YES), this algorithm ends. If there is the digital image 111 (step 1403: NO), this algorithm goes to step 1404. Note that this algorithm can be an infinite loop when array operation unit 40 is realized for a specific size of the image.

At step 1404, $AOU_{ij}$ inputs the whole pixel on the column i and the row j of the digital image 111. This is done for $AOU_{ij}$ to process the pixel on the column i and the row j of the digital image 111. Therefore, $AOU_{ij}$ needs memory 42 memorizing at least the number of bands of image data.

At step 1405, for each band-pixel value of the inputed digital image 111, $AOU_{ij}$ carries out smoothing according to the function $S_{ijk}(x)$, by communicating with neighbor array operation units 40. The smoothed band-pixel value regards as a band-pixel value of a Smooth digital image. The function $S_{ijk}(x)$ may be calcurated some times if necessary. It is enough for a general color image to repeat the function two times.

At step 1406, for each band-pixel value of the Smooth digital image, $AOU_{ij}$ carries out logarithm convertion according to the function $L_{ijk}(x)$. The band-pixel value converted to logarithm regards as a band-pixel value of a logarithmic-conversion image.

At step 1407, for each band-pixel value of the logarithmic-conversion image, $AOU_{ij}$ carries out enhancement according to the function $E_{ijk}(x)$, by communicating with neighbor array operation units 40. The enhanced band-pixel value regards as a band-pixel value of a enhanced image.

At step 1408, from each band-pixel value of the logarithmic-conversion image, $AOU_{ij}$ subtracts each band-pixel value of the previous enhanced image, respectively, according to the function $D_{ijk}(x, y)$. The band-pixel value representing the difference regards as a band-pixel value of a time-differential image.

At step 1409, Each band-pixel value of the previous enhanced image is superseded by the corresponding band-pixel value of the enhanced image.

At step 1410, for each band-pixel value of the Time-diffential Image, $AOU_{ij}$ carries out calcuration of Laplacian according to the operator $V_{ijk}^2 x$, by communicating with neighbor array operation units 40. The band-pixel value calcurated by the Laplacian operator regards as a band-pixel value of a time-differential Laplacian image.

At step 1411, for each band-pixel value of the Time-diffential Laplacian Image, $AOU_{ij}$ extracts zero-point according to the function $Z_{ijk}(x)$, by communicating with neighbor array operation units 40. The band-pixel value representing the extracted zero-point regards as a band-pixel value of a time-differential zero-point image.

At step 1412, for each band-pixel value of the Time-diffential Laplacian Image, $AOU_{ij}$ detects the maximum value among some band-pixel values of the Time-diffential Laplacian Image, according to the function $B_{ij1}(x)$. The band-pixel value representing the detected maximum value regards as a band-pixel value of a maximum-value time-differential zero point image. Note that the number of bands, on facilities, is one.

At step 1413, for each band-pixel value of the enhanced image, $AOU_{ij}$ carries out calcuration of Laplacian according to the operator $\nabla_{ijk}^2 x$, by communicating with neighbor array operation units 40. The band-pixel value calcurated by the Laplacian operator regards as a band-pixel value of a Laplacian image.

At step 1414, for each band-pixel value of the Laplacian image, $AOU_{ij}$ extracts zero-point according to the function $Z_{ijk}(x)$, by communicating with neighbor array operation units 40. The band-pixel value representing the extracted zero-point regards as a band-pixel value of a zero-point image.

At step 1415, for each band-pixel value of the Laplacian image, $AOU_{ij}$ detects the maximum value among some band-pixel values of the Laplacian image, according to the function $B_{ij1}(x)$. The band-pixel value representing the detected maximum value regards as a band-pixel value of a maximum-value zero-point image. Note that the number of bands, on facilities, is one.

At step 1416, for each band-pixel value of the Laplacian image and each band-pixel value of the time-differential Laplacian image, $AOU_{ij}$ detects the maximum value between two band-pixel values at the same position of the images according to the function $M_{ijk}(x,y)$. The band-pixel value representing the detected maximum value regards as a band-pixel value of a mixed zero-point image. Note that the number of bands, on facilities, is one.

At step 1417, for a band-pixel value of the mixed zero-point image, $AOU_{ij}$ deletes a hole according to the function $F_{ijk}(x)$, by communicating with neighbor array operation units 40. The band-pixel value deleted the hole regards as a band-pixel value of a hole-deleted mixed zero-point image. Note that the number of bands, on facilities, is one. The function $F_{ijk}(x)$ may be calcurated some times if necessary. It is enough for a general color image to calcurate the function one time.

At step 1418, for a band-pixel value of the hole-deleted mixed zero-point image, $AOU_{ij}$ deletes an alone point and an alone hole according to the function $A_{ijk}(x)$, by communicating with neighbor array operation units 40. The band-pixel value deleted the point and the hole regards as a band-pixel value of a noise-canceled mixed zero-point image. Note that the number of bands, on facilities, is one.

At step 1419, for a band-pixel value of the noise-canceled mixed zero-point image, $AOU_{ij}$ inverts zero and one according to the function $I_{ijk}(x)$. The inverted band-pixel value regards as a band-pixel value of a rough edge-information image 113.

At step 1420, $AOU_{ij}$ outputs a band-pixel value of the rough edge-information image 113. This algorithm then returns to step 1403.

The visual device described in claim 7 corresponding to the edge-information generation means 14 can generate the rough edge-information image 113 from the digital image 111, by using the data processing device 110 consisting of array operation units 40.

Figure 17:
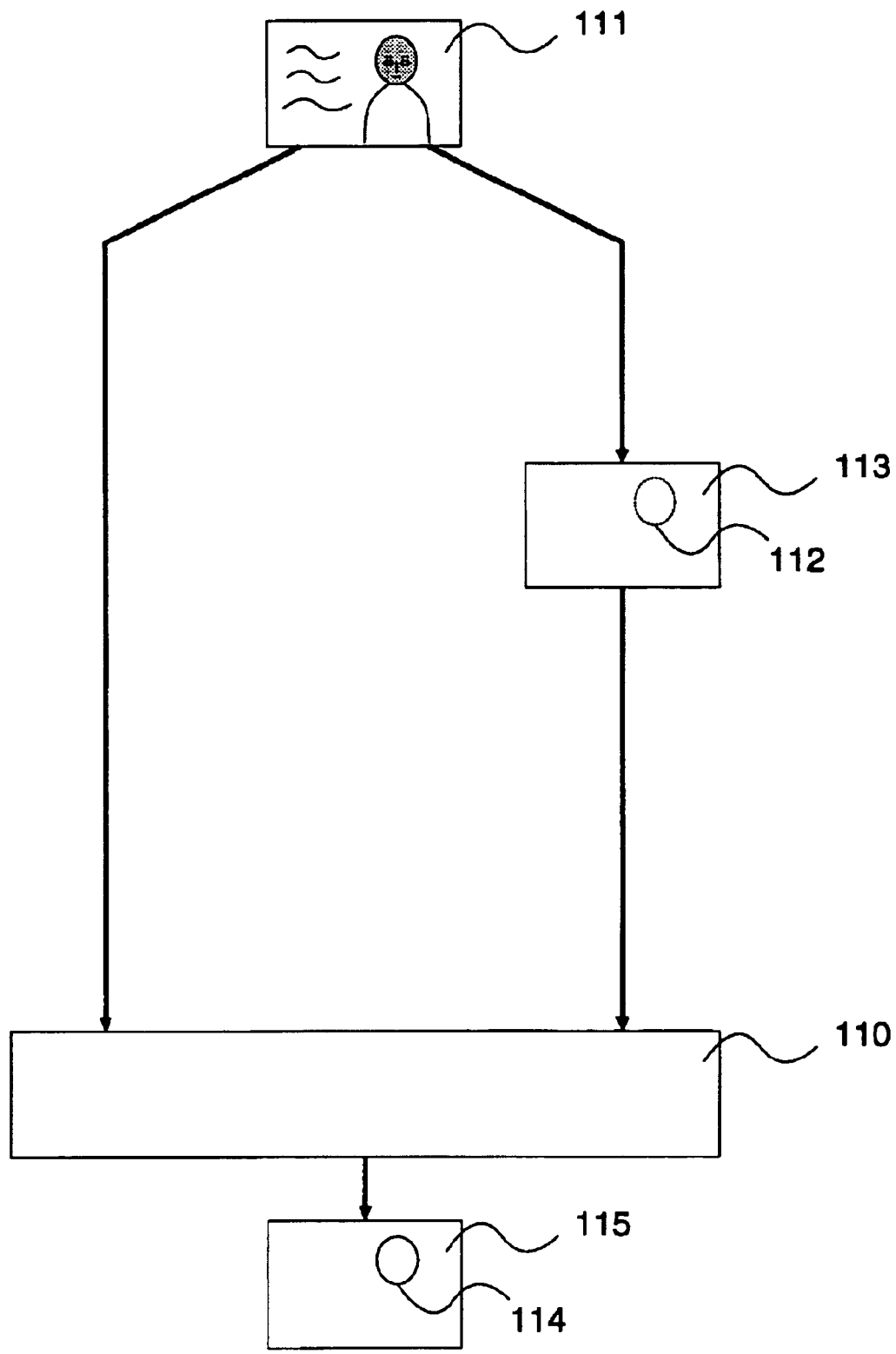
FIG. 17 is an explanation view for forming rough edge information into formed edge information, using a digital image.
Figure 18:
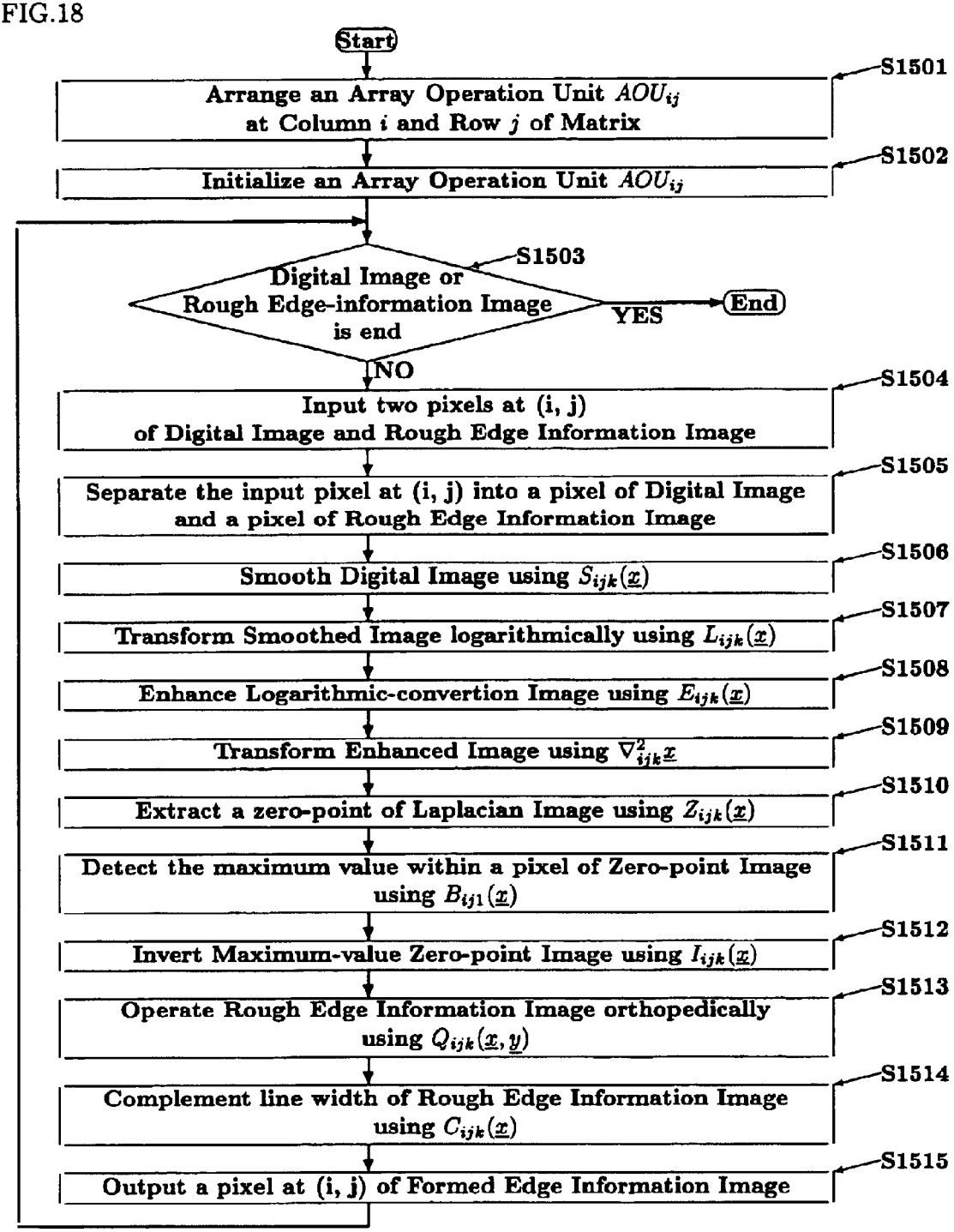
FIG. 18 is a flow chart appearing an algorithm of an edge information formation means in this enforcement form.

As shown in FIG. 17, in order for the edge-information formation means 15 (refer to FIG. 1 or FIG. 5, FIG. 7 or FIG. 12) realized by a data processing device 110 to generate formed edge-information image 115 consisting of formed edge information 114 from a rough edge-information image 113 consisting of rough edge information 112 described in claim 8 and a digital image 111, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 18.

At step 1501, $AOU_{ij}$ is arranged at the column i and the row j of the matrix. This is desired to decide neighbors of $AOU_{ij}$ either logically and physically.

At step 1502, neighbors of $AOU_{ij}$ are set and its parameters are initialized. In setting the neighbors, the number of neighbors used in the above functions can be defined as either four or eight individually, or all of them can be defined as either four or eight uniformly. In order to make formed edge information 114 formed by the edge-information formation means 15 of the present invention more exact, the number of neighbors q has to be set to eight for all functions. The edge-information formation means 15, however, can cope with limitation of computational time to form the rough edge information 112 and the number of bands of the digital image 111, by varying the number of neighbors suitably.

At step 1503, $AOU_{ij}$ judges whether there is both a digital image 111 and a rough edge-information image 113 inputed one by one or not. If there is not the digital images 111 or the rough edge-information image 113 any more (step 1503: YES), this algorithm ends. If there is either the digital images 111 or the rough edge-information image 113 (step 1503: NO), this algorithm goes to step 1504. Note that this algorithm can be an infinite loop when array operation unit 40 is realized for a specific size of the image.

At step 1504, $AOU_{ij}$ inputs the whole pixel on the column i and the row j of the digital image 111 and the whole pixel on the column i and the row j of the rough edge-information image 113. This is done for $AOU_{ij}$ to process collectively the pixel on the column i and the row j of the digital image 111 and the pixel on the column i and the row j of the rough edge-information image 113. Therefore, $AOU_{ij}$ needs memory 42 memorizing at least the number of bands of image data At step 1505, $AOU_{ij}$ separates the pixel on the column i and the row j of the digital image 111 and the pixel on the column i and the row j of the rough edge-information image 113. This is done for $AOU_{ij}$ to process the pixel on the column i and the row j of the digital image 111 and the pixel on the column i and the row j of the rough edge-information image 113 as two pixel of independent images, respectively. If the pixel on the column i and the row j of the digital image 111 and the pixel on the column i and the row j of the rough edge-information image 113 are beforehand separated and are then inputed, $AOU_{ij}$ carries out nothing.

At step 1506, for each band-pixel value of the inputed digital image 111, $AOU_{ij}$ carries out smoothing according to the function $S_{ijk}(x)$, by communicating with neighbor array operation units 40. The smoothed band-pixel value regards as a band-pixel value of a Smooth digital image. The function $S_{ijk}(x)$ may be calcurated some times if necessary. It is enough for a general color image to repeat the function two times.

At step 1507, for each band-pixel value of the Smooth digital image, $AOU_{ij}$ carries out logarithm convertion according to the function $L_{ijk}(x)$. The band-pixel value converted to logarithm regards as a band-pixel value of a logarithmic-conversion image.

At step 1508, for each band-pixel value of the logarithmic-conversion image, $AOU_{ij}$ carries out enhancement according to the function $E_{ijk}(x)$, by communicating with neighbor array operation units 40. The enhanced band-pixel value regards as a band-pixel value of a enhanced image.

At step 1509, for each band-pixel value of the enhanced image, $AOU_{ij}$ carries out calcuration of Laplacian according to the operator $\nabla_{ijk}^2 x$, by communicating with neighbor array operation units 40. The band-pixel value calcurated by the Laplacian operator regards as a band-pixel value of a Laplacian image.

At step 1510, for each band-pixel value of the Laplacian image, $AOU_{ij}$ extracts zero-point according to the function $Z_{ijk}(x)$, by communicating with neighbor array operation units 40. The band-pixel value representing the extracted zero-point regards as a band-pixel value of a zero-point image.

At step 1511, for each band-pixel value of the zero-point image, $AOU_{ij}$ detects the maximum value among some band-pixel values of the zero-point image, according to the function $B_{ij1}(x)$. The band-pixel value representing the detected maximum value regards as a band-pixel value of a maximum-value zero-point image. Note that the number of bands, on facilities, is one.

At step 1512, for a band-pixel value of the maximum-value zero-point image, $AOU_{ij}$ inverts zero and one according to the function $I_{ijk}(x)$. The inverted band-pixel value regards as a band-pixel value of a based edge-information image.

At step 1513, the band-pixel value of the input rough edge-information image 113 first regards as a band-pixel value of a Orthopedical Rough edge-information image. For a band-pixel value of the Orthopedical Rough edge-information image, $AOU_{ij}$ operates orthopedically according to the function $Q_{ijk}(x,y)$. The band-pixel value operated orthopedically regards as a band-pixel value of a Orthopedical Rough edge-information image again. The function $Q_{ijk}(x,y)$ is repeated by nature until the band-pixel value of the Orthopedical Rough edge-information image stops changing. However, it is better for $AOU_{ij}$ to close this orthpedical processing in some specific repeat times, corresponding to limitation of computational time, quality of the input rough edge-information image 113, quality desired for the formed edge-information image 115.

At step 1514, for a band-pixel value of the Orthopedical Rough edge-information image, $AOU_{ij}$ complements line width according to the function $C_{ijk}(x)$, by communicating with neighbor array operation units 40. The complemented band-pixel value regards as a band-pixel value of a formed edge-information image 115.

At step 1515, $AOU_{ij}$ outputs a band-pixel value of the formed edge-information image 115. This algorithm then returns to step 1503.

The visual device described in claim 8 corresponding to the edge-information formation means 15 can generate the formed edge-information image 115 from the rough edge-information image 113, by using the data processing device 110 consisting of array operation units 40.

Figure 19:
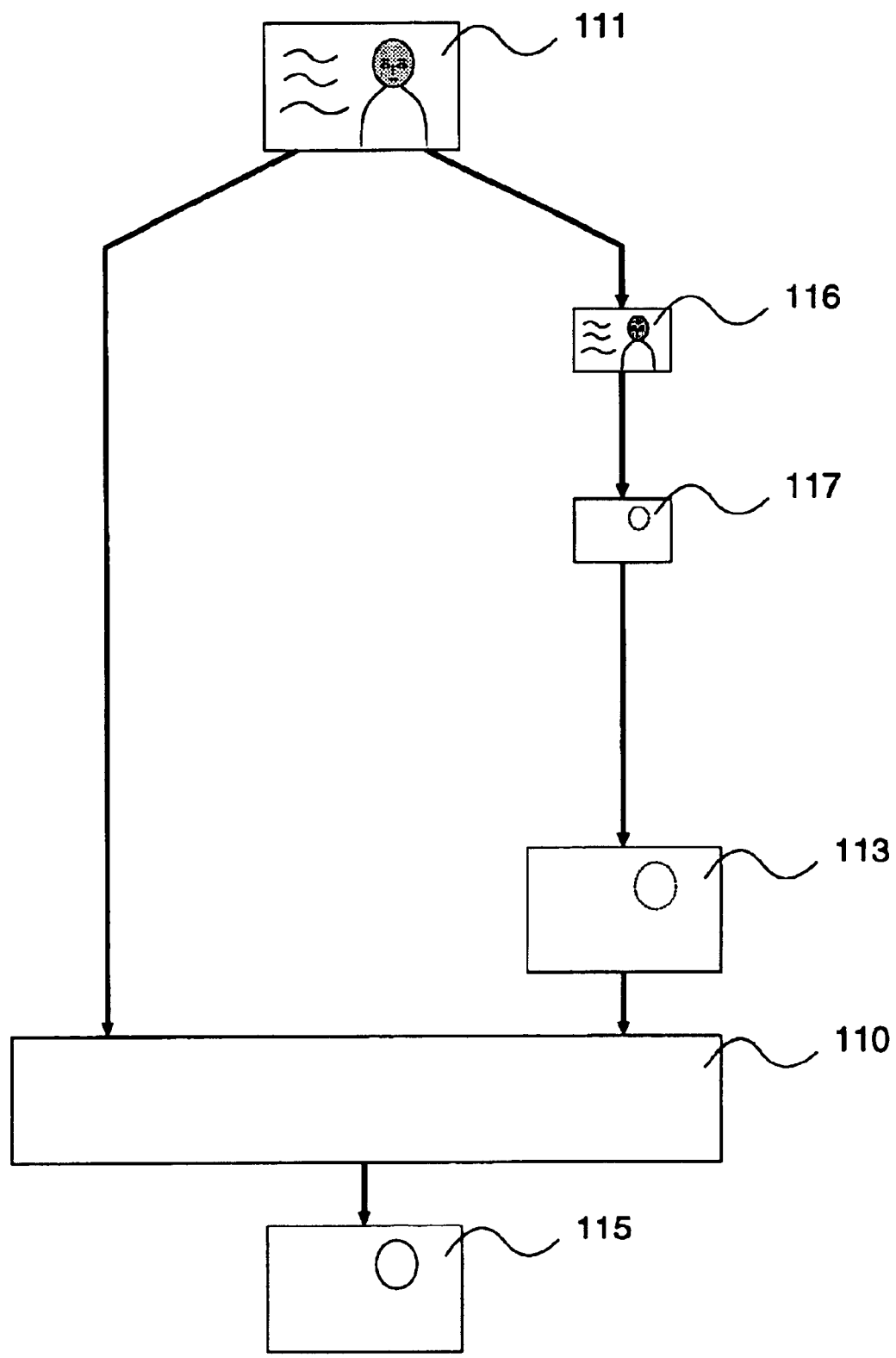

We can regard here that the formation from the rough edge-information image 113 to formed edge-information image 115 is to inference edge information to be generated from a high-resolution digital image 111 taken in a scene from edge information generated from a low-resolution digital image 111 taken in the same scene. As shown in FIG. 19, for a natural number n, the rough edge-information image 113 can be generated by expanding a low-resolution rough edge-information image 117 n times, when the edge-information generation means 14 generates the low-resolution rough edge-information image 117 from the low-resolution digital image 116 whose resolution is equivalent to 1/n resolution of the digital image 111. In order to decrease the resolution of the digital image 111 to 1/n, we only have to extract one of n horizontally or vertically successive pixels of the digital image 111. On the other hand, in order to expand the low-resolution rough edge-information image 117 n times, we only have to fill in successive pixels of the low-resolution rough edge-information image 117 with n−1 pixels whose band-pixel value is equivalent to zero. Suppose here that a rough edge-information image 113 is made by expanding a low-resolution rough edge-information image 117, and another rough edge-information image 113 is generated from the digital image 111. If n is not too large, a formed edge-information image 115, to which a data processing device 110 realizing the edge-information formation means 15 forms the former rough edge-information image 113, becomes almost same as a formed edge-information image 115, to which a data processing device 110 realizing the edge-information formation means 15 forms the latter rough edge-information image 113. This reason is because the edge-information formation means 15 only uses the rough edge-information image 113 to refer to which of edge information, generated by the edge-information formation means 15 itself from digital image 111, is used. Therefore, in a case that the edge-information formation means 15 inputs a rough edge-information image 113 made by expanding a low-resolution rough edge-information image 117, a data processing device 110 realizing the edge-information generation means 13, which generates the low-resolution rough edge-information image 117 from a low-resolution digital image 116, can reduce volume of hardware.

Figure 20:
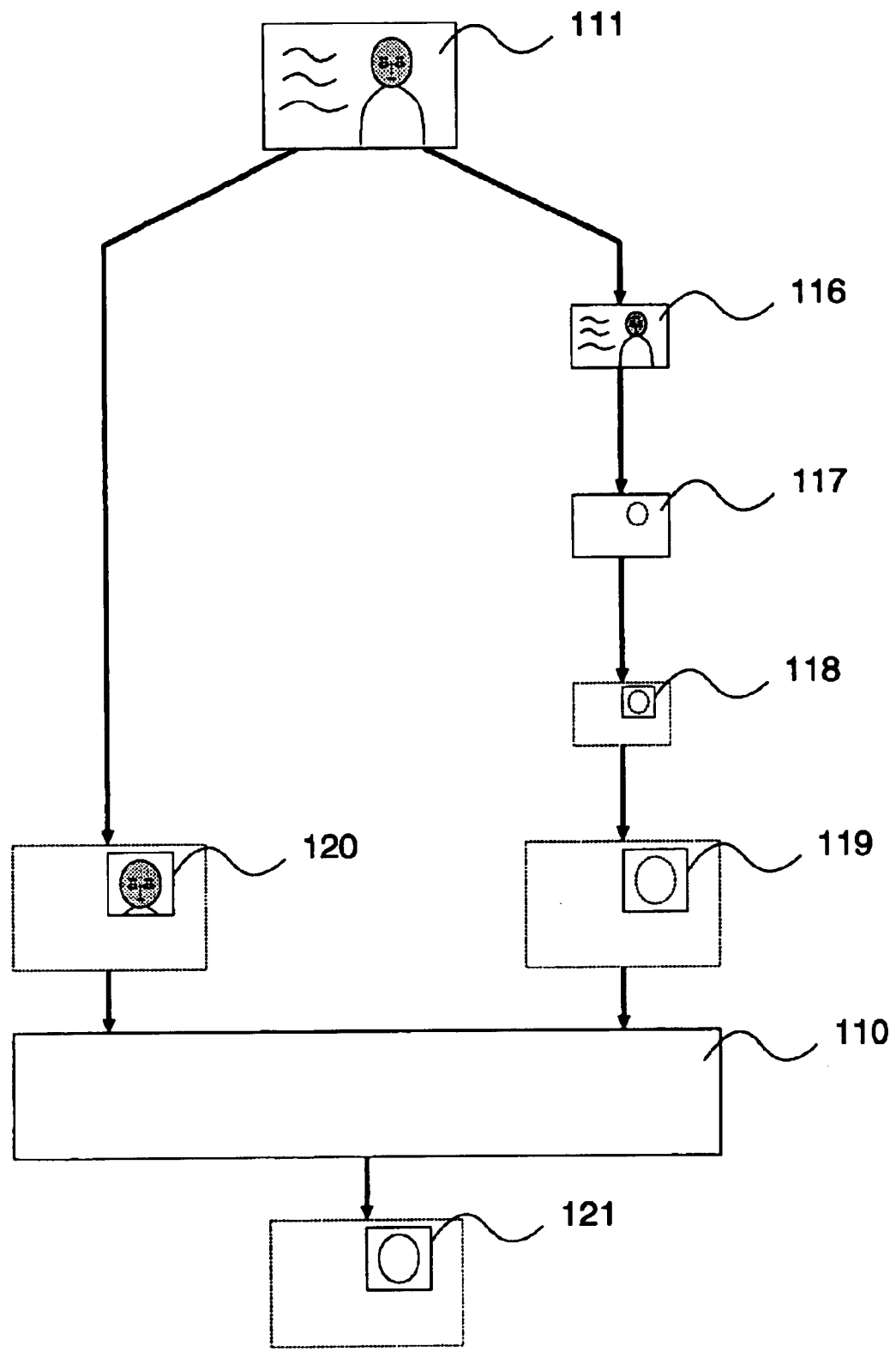
FIG. 20 is an explanation view for forming formed edge information after cutting an area of low-resolution rough edge information generated from a low-resolution digital image.

When this method is developed, furthermore, as shown in FIG. 20, the data processing device 110 can cut a low-resolution cut rough edge-information image 118 around the rough edge information 112 out of the low-resolution rough edge-information image 117 generated from low-resolution digital image 116 which is a low resolution of the digital image 111. Suppose that the data processing device 110 realizing the edge-information formation means 14 inputs a cut rough edge-information image 119 made by expanding this low-resolution cut rough edge-information image 118 and a cut digital image 120 which is the same cut domain of the digital image 111 as the cut rough edge-information image 119. The data processing device 110 can generate a cut formed edge-information image 121. In this case, the data processing device 110 realizing the edge-information formation means 14 can reduce volume of hardware.

Figure 21:
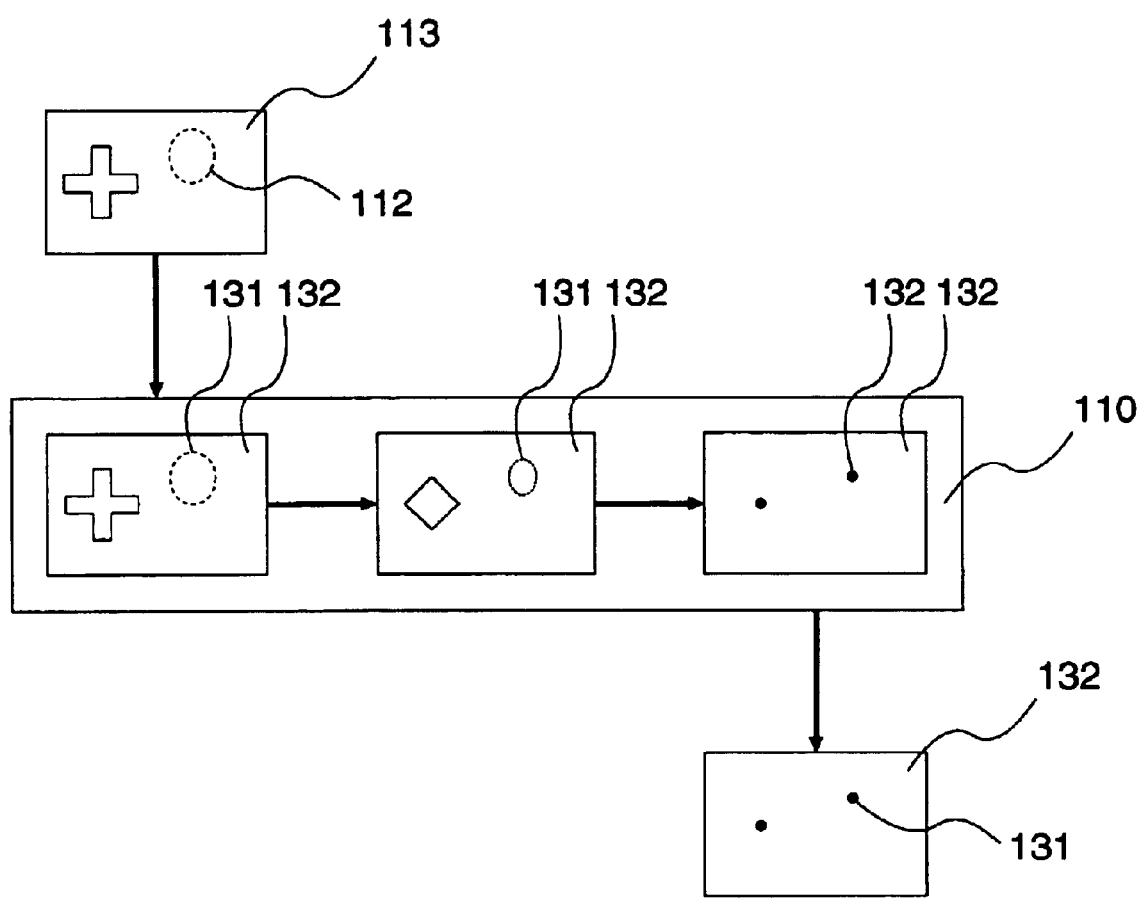
FIG. 21 is an explanation view for detecting position and size of objects in an edge-information image.
Figure 22:
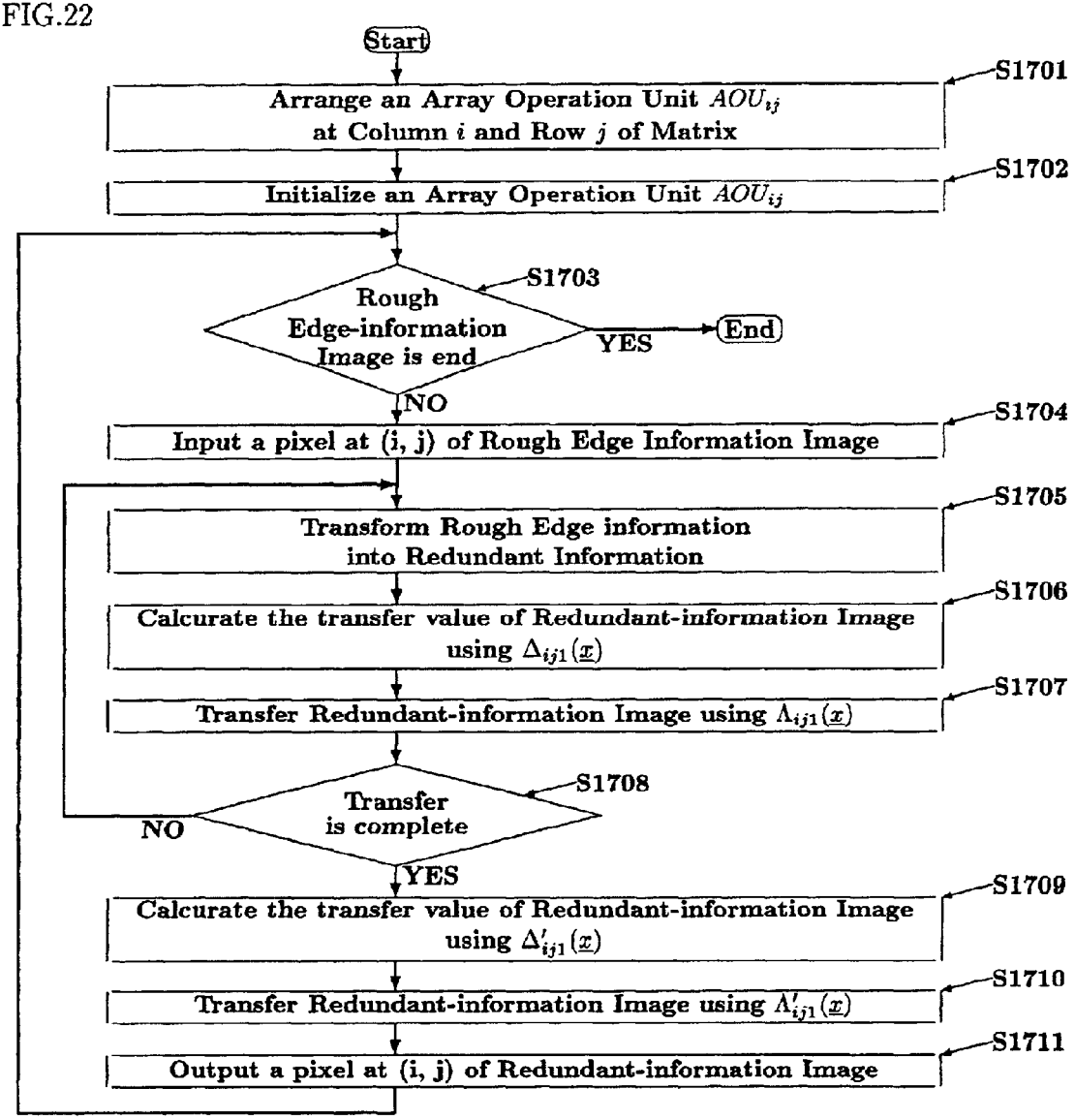
FIG. 22 is a flow chart appearing an algorithm of a position/size detection means in this enforcement form.

As shown in FIG. 21, in order for the position/size detection means 17 described in claim 9 (refer to FIG. 1 and FIG. 6) realized by a data processing device 110 to generate a redundant-information image 132 consisting of redundant information 131 from a rough edge-information image 113 consisting of rough edge information 112, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 22.

At step 1701, $AOU_{ij}$ is arranged at the column i and the row j of the matrix. This is desired to decide neighbors of $AOU_{ij}$ either logically and physically.

At step 1702, neighbors of $AOU_{ij}$ are set and its parameters are initialized. In setting the neighbors, the number of neighbors used in the above functions can be defined as either four or eight individually, or all of them can be defined as either four or eight uniformly. In order to make the redundant-information image 132 generated by the data processing device 110 of the present invention more exact, the number of neighbors q have to be set a large number for all functions. The position/size detection means 17, however, can cope with limitation of computational time to calcurate gravity of the rough edge information 112 of a object and the size of the input rough edge-information image 113, by varying the number of neighbors suitably.

At step 1703, $AOU_{ij}$ judges whether there is a rough edge-information image 113 inputed one by one or not. If there is not the rough edge-information image 113 any more (step 1503: YES), this algorithm ends. If there is the rough edge-information image 113 (step 1503: NO), this algorithm goes to step 1704. Note that this algorithm can be an infinite loop when array operation unit 40 is realized for a specific size of the image.

At step 1704, $AOU_{ij}$ inputs the whole pixel on the column i and the row j of the rough edge-information image 113. Therefore, $AOU_{ij}$ needs memory 42 memorizing at least the number of bands of image data.

At step 1705, $AOU_{ij}$ converts the rough edge information 112 to the rough edge-information image 113. The redundant information 131 becomes a pixel value equivalent to one or zero.

At step 1706, for each band-pixel value of the redundant-information image 132, $AOU_{ij}$ calcurates a transfer value, according to the function $\Delta_{ij1}(x)$, by communicating with neighbor array operation units 40. The band-pixel value representing the transfer value regards as a band-pixel value of a transfer-value image.

At step 1707, for each band-pixel value of the redundant-information image 132, $AOU_{ij}$ transfers it according to the function $A_{ij1}(x)$, by communicating with neighbor array operation units 40. The transfered band-pixel value regards as a band-pixel value of a new redundant-information image 132.

At step 1708, $AOU_{ij}$ judges whether the transfer times representing the repeat times from step 1706 to step 1707 achieve the directed times or not. If the transfer times do not achieve the directed times (step 1708: NO), this algorithm returns to step 1706. If the transfer times achieve the directed times (step 1708: YES), this algorithm goes to step 1709. Note that the directed times are derived by the size of the rough edge-information image 113, the size of the object represented by the rough edge information 112, and the number of neighbors q. In a case that some parameters are set to specific numbers corresponding to the aim of use, there is no problem even though the directed times are set to more than the necessary times. If the directed times are too much, however, $AOU_{ij}$ takes much time to detect the position and the size of the object.

At step 1709, for each band-pixel value of the redundant-information image 132, $AOU_{ij}$ calcurates a transfer value according to the function $\Delta'_{ij1}(x)$, by communicating with neighbor array operation units 40. The band-pixel value representing the transfer value regards as a band-pixel value of the transfer-value image.

At step 1710, for each band-pixel value of the redundant-information image 132, $AOU_{ij}$ transfers it according to function $\nabla'_{ij1}(x)$, by communicating with neighbor array operation units 40. The transfered band-pixel value regards as a band-pixel value of a new redundant-information image 132.

At step 1711, $AOU_{ij}$ outputs a band-pixel value of the redundant-information image 132. This algorithm then returns to step 1703.

Note that each redundant information 131 of the redundant-information image 132 consequently means the size of the object, whose center is a position of the redundant-information image 132, because it means the total number of the rough edge information 112 around the position.

The visual device described in claim 9 corresponding to the position/size detection means 17 can generate the redundant-information image 132 from the rough edge-information image 113, by using the data processing device 110 consisting of array operation units 40. Of course, the visual device described in claim 9 can also generate the redundant-information image 132 from the formed edge-information image 115, instead of the rough edge-information image 113. Therefore, the visual device corresponding to the position/size detection means 17 can generate the redundant-information image 132 from the formed edge-information image 115, by using the data processing device 110 consisting of array operation units 40.

Figure 23:
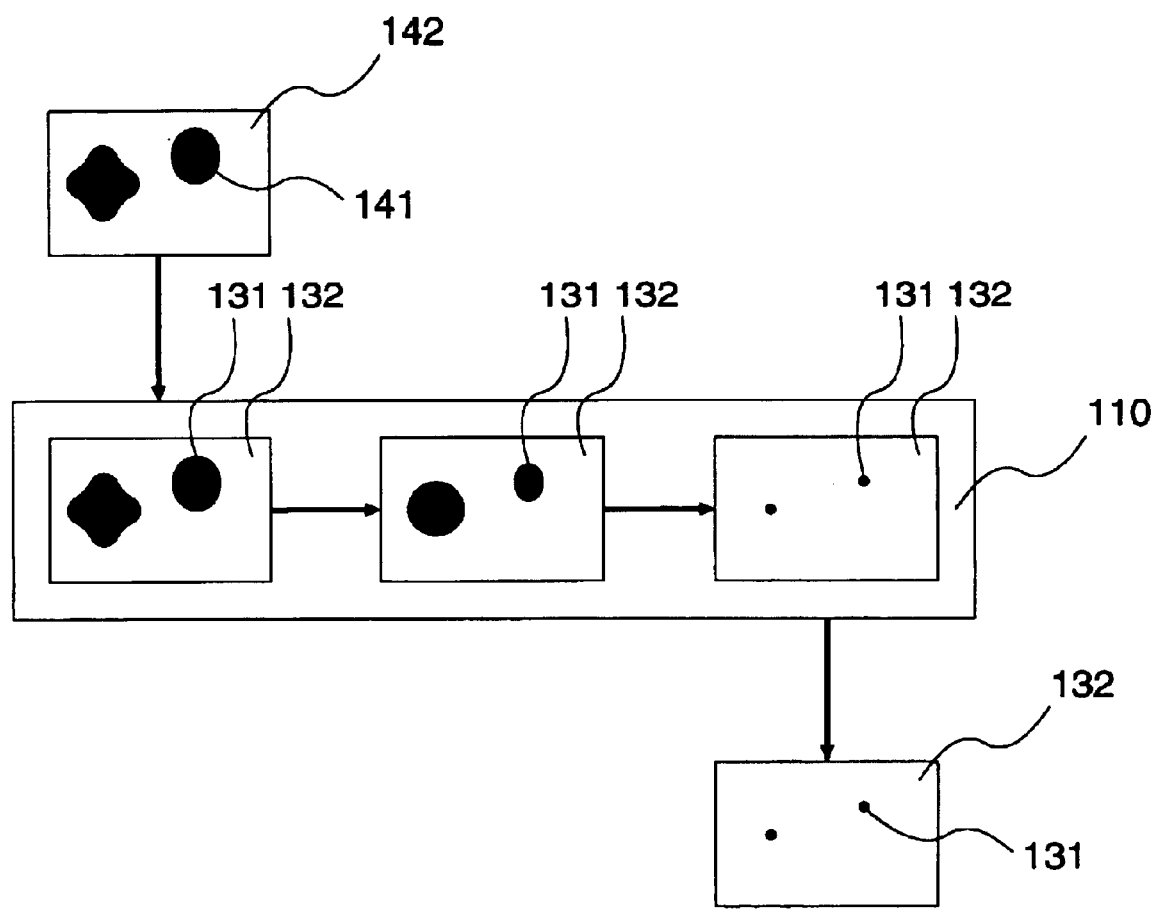
FIG. 23 is an explanation view for detecting position and size of objects in an object-area image.

By the way, suppose that an object-area image 142 representing an object area 141 is used in the algorithm shown in FIG. 22, instead of the rough edge-information image 113 consisting of the rough edge information 112. As shown in FIG. 23, the position/size detection means 17 (refer to FIG. 2 and FIG. 4) realized by the data processing device 110 can also generate the redundant-information image 132 representing redundant information 131 from the object-area image 142 representing the object area 141. In the case that the object-area image 142 is used, however, each redundant information 131 of the redundant-information image 132 consequently means the area of the object, whose center is a position of the redundant-information image 132, because it means the total number of pixels of the object area 141 around the position. When the size of object is derived from the redundant-information image 132, therefore, we must pay attention such as calcurating the square root of the redundant information 131.

Figure 24:
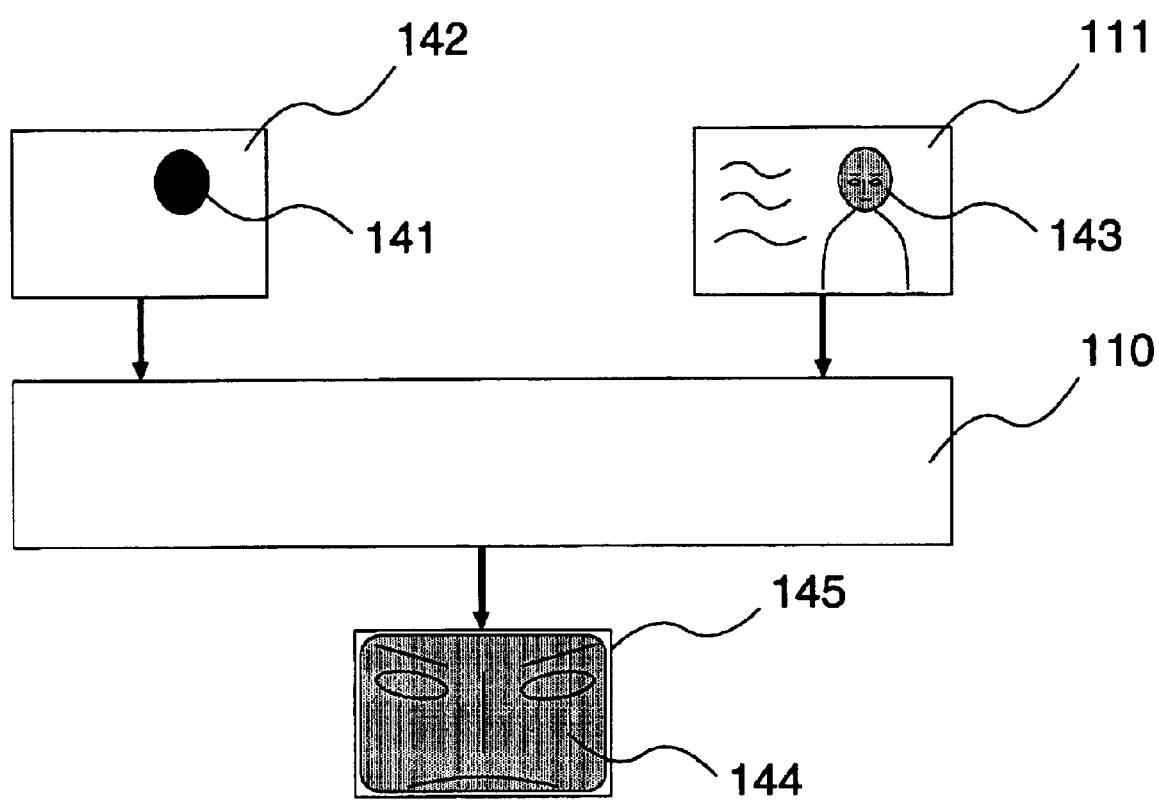
FIG. 24 is an explanation view for normalizing a segmented object area in a digital image.
Figure 25:
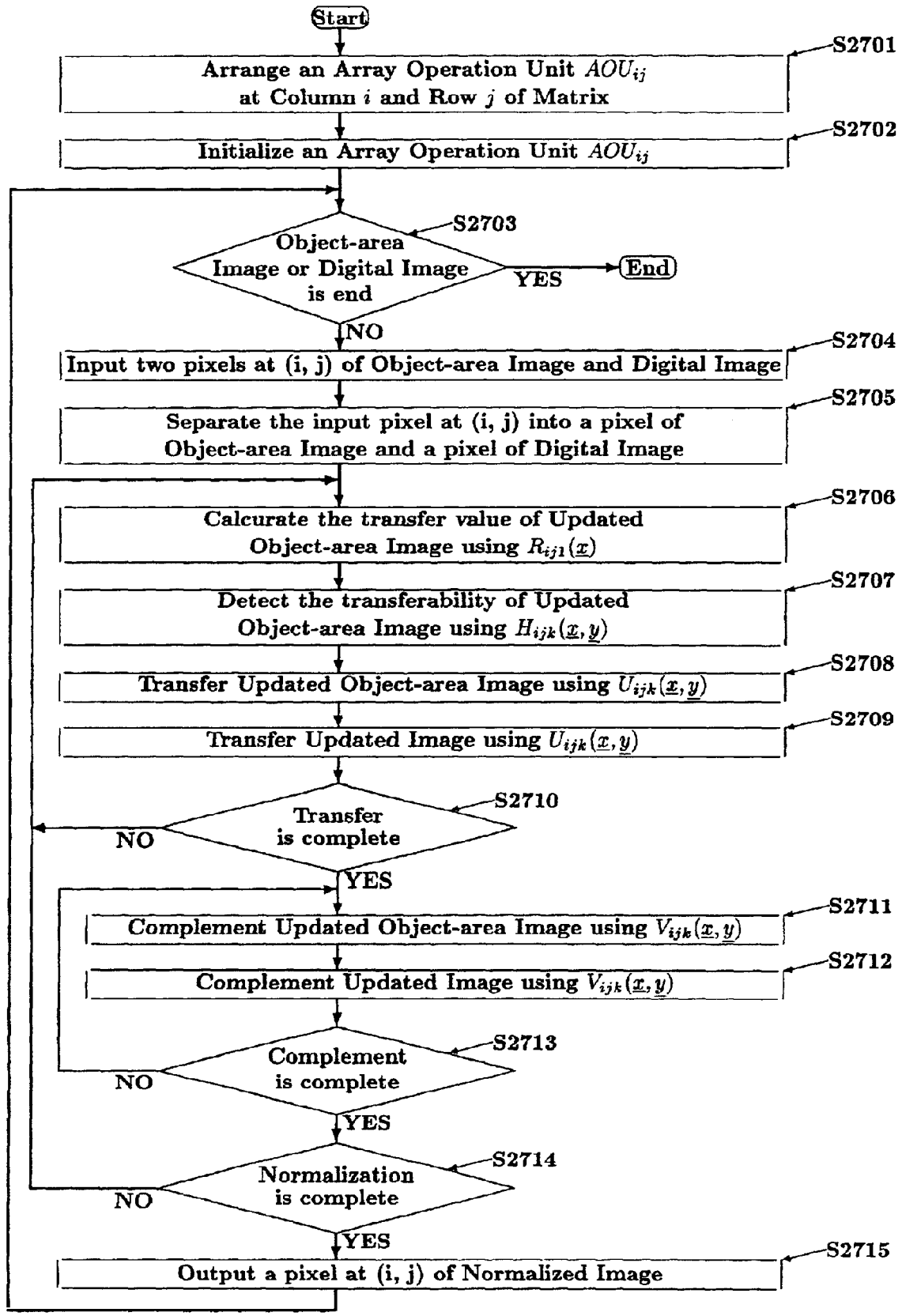
FIG. 25 is a flow chart appearing an algorithm of an area normalization means in this enforcement form.

As shown in FIG. 24, in order for the area normalization means 27 described in claim 10 (refer to FIG. 7) realized by a data processing device 110 to generate a normalized image 145 including a normalized area 144 from an object-area image 142 including an object area 141 and a digital image 111, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 25.

At step 2701, $AOU_{ij}$ is arranged at the column i and the row j of the matrix. This is desired to decide neighbors of $AOU_{ij}$ either logically and physically.

At step 2702, neighbors of $AOU_{ij}$ are set and its parameters are initialized. In setting the neighbors, the number of neighbors used in the above functions can be defined as either four or eight individually, or all of them can be defined as either four or eight uniformly. In order to make the normalized image 145 generated by the area normalization means 27 of the present invention more exact, the number of neighbors q have to be set a large number for all functions. The area normalization means 27, however, can cope with limitation of computational time to normalize a segmented object area 143 and the size of the input digital image 111, by varying the number of neighbors suitably.

At step 2703, $AOU_{ij}$ judges whether there is both an object-area image 142 and a digital image 111 inputed one by one or not. If there is not the object-area image 142 or the digital images 111 any more (step 2703: YES), this algorithm ends. If there is either the object-area image 142 or the digital image 111 (step 2703: NO), this algorithm goes to step 2704. Note that this algorithm can be an infinite loop when array operation unit 40 is realized for a specific size of the image.

At step 2704, $AOU_{ij}$ inputs the whole pixel on the column i and the row j of the object-area image 142 and the whole pixel on the column i and the row j of the digital image 111. This is done for $AOU_{ij}$ to process collectively the pixel on the column i and the row j of the object-area image 142 and the pixel on the column i and the row j of the digital image 111. Therefore, $AOU_{ij}$ needs memory 42 memorizing at least the number of bands of image data.

At step 2705, $AOU_{ij}$ separates the pixel on the column i and the row j of the object-area image 142 and the pixel on the column i and the row j of the digital image 111. This is done for $AOU_{ij}$ to process the pixel on the column i and the row j of the object-area image 142 and the pixel on the column i and the row j of the digital image 111 as two pixel of independent images, respectively. If the pixel on the column i and the row j of the object-area image 142 and the pixel on the column i and the row j of the digital image 111 are beforehand separated and are then inputed, $AOU_{ij}$ carries out nothing. The object-area image 142 and the digital image 111 are copied to the updated object-area image and the updated digital image, respectively.

At step 2706, for each band-pixel value of the updated object-area, $AOU_{ij}$ calcurates a transfer value, according to the function $R_{ijk}(x)$, by communicating with neighbor array operation units 40. The band-pixel value representing the transfer value regards as a band-pixel value of a transfer-value image.

At step 2707, for each band-pixel value of the updated object-area image, $AOU_{ij}$ can find a transfer-place band-pixel value possible to transfer according to the function $H_{ijk}(X,y)$, by communicating with neighbor array operation units 40. The value representing whether the transfer-place band-pixel value is a transfer place possible to transfer or not regards as a band-pixel value of a transferable image.

At step 2708, for each band-pixel value of the updated object-area image, $AOU_{ij}$ transfers it to the transfer place according to the function $U_{ijk}(X,y)$, by communicating with neighbor array operation units 40. The transfered band-pixel value regards as a band-pixel value of a new updated object-area image.

At step 2709, for each band-pixel value of updated digital image, $AOU_{ij}$ transfers it to the transfer place according to the function $U_{ijk}(X,y)$, by communicating with neighbor array operation units 40. The transfered band-pixel value regards as a band-pixel value of a new updated digital image.

At step 2710, $AOU_{ij}$ judges whether the transfer times representing the repeat times from step 2706 to step 2709 achieve the directed times or not. If the transfer times do not achieve the directed times (step 2710: NO), this algorithm returns to step 2706. If the transfer times achieve the directed times (step 2710: YES), this algorithm goes to step 2711. Note that the directed times are derived by the size of the digital image 111, the size of the segmented object area 143 of the digital image 111, and the number of neighbors q. In a case that some parameters are set to specific numbers corresponding to the aim of use, there is no problem even though the directed times are set to more than the necessary times. If the directed times are too much, however, $AOU_{ij}$ takes much time to normalize the images.

At step 2711, for each band-pixel value of the updated object-area image which has been finished transfering, $AOU_{ij}$ complements it with the average of its neighbors according to the function $V_{ijk}(x,y)$, by communicating with neighbor array operation units 40. Note that both x and y are dealt as the updated object-area image. The complemented band-pixel value regards as a band-pixel value of a normalized updated object-area image.

At step 2712, for each band-pixel value of the updated digital image which has been finished transfering, $AOU_{ij}$ complements it with the average of its neighbors according to the function $V_{ijk}(x,y)$, by communicating with neighbor array operation units 40. Note that x is dealt as the updated digital image, and y is dealt as the updated object-area image. The transfered band-pixel value regards as a band-pixel value of a normalized updated digital image.

At step 2713, $AOU_{ij}$ judges whether the transfer times representing the complement times from step 2706 to step 2709 achieve the directed times or not. If the complement times do not achieve the directed times (step 2713: NO), this algorithm returns to step 2711. If the complement times achieve the directed times (step 2713: YES), this algorithm goes to step 2714. In general, there is no problem if the complement times are about half of the number of neighbors q.

At step 2714, $AOU_{ij}$ judges whether the remain times representing the repeat times from step 2706 to step 2713 achieve the directed times or not. If the remain times do not achieve the directed times (step 2714: NO), this algorithm returns to step 2706. If the remain times achieve the directed times (step 2714: YES), this algorithm goes to step 2715. Note that the directed times are derived by the size of the digital image 111, the size of the segmented object area 143 of the digital image 111, and the number of neighbors q. In a case that some parameters are set to specific numbers corresponding to the aim of use, there is no problem even though the directed times are set to more than the necessary times. If the directed times are too much, however, $AOU_{ij}$ takes much time to normalize the images.

At step 2715, $AOU_{ij}$ outputs a band-pixel value of the updated digital image as a band-pixel value of the normalized image 145. This algorithm then returns to step 2703.

The visual device described in claim 10 corresponding to the area normalization means 27 can generate the normalized image 145 from the object-area image 142 and the digital image 111, by using the data processing device 110 consisting of array operation units 40.

Figure 26:
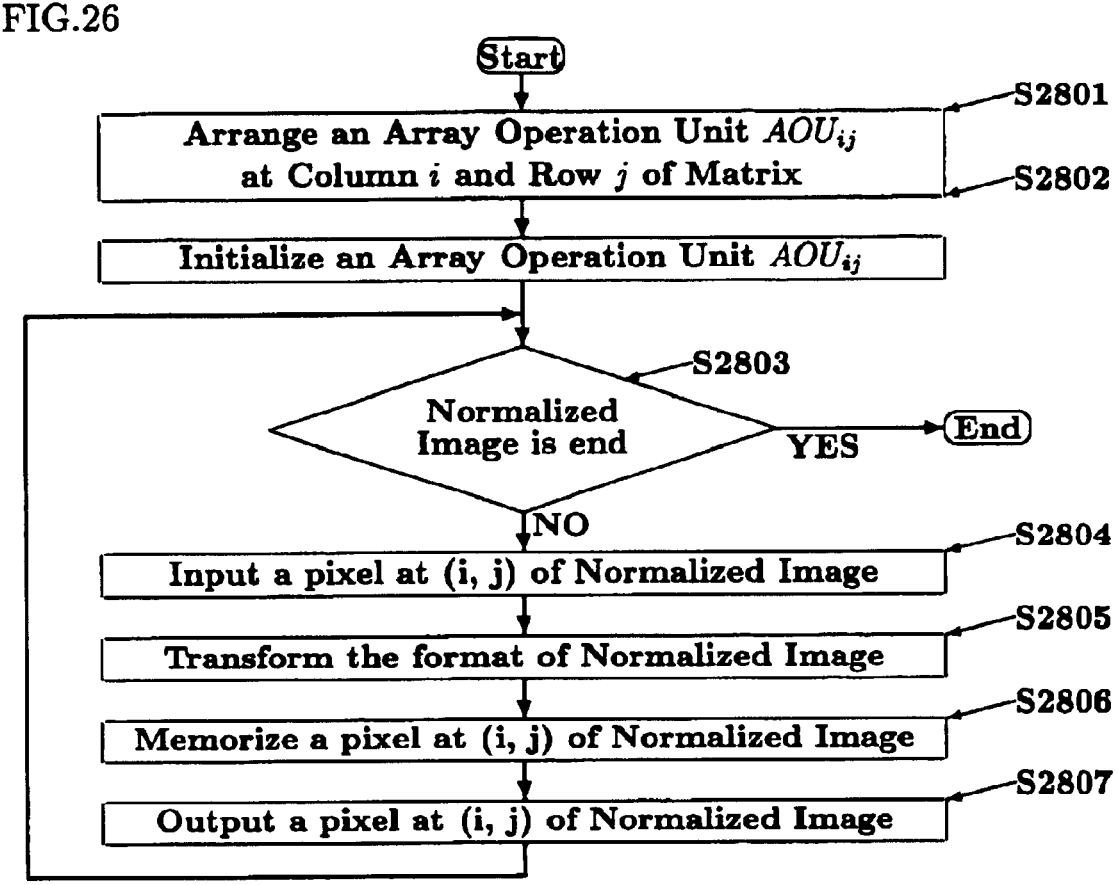
FIG. 26 is a flow chart appearing an algorithm of a normalized image keeping means in this enforcement form.

In order for the normalized image keeping means 28 (refer to FIG. 7) realized by a data processing device 110 to memorize a normalized image 145, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 26.

At step 2801, $AOU_{ij}$ is arranged at the column i and the row j of the matrix. This is desired to decide neighbors of $AOU_{ij}$ either logically and physically.

At step 2802, neighbors of $AOU_{ij}$ are set and its parameters are initialized.

At step 2803, $AOU_{ij}$ judges whether there is a normalized image 145 inputed one by one or not. If there is not the normalized image 145 any more (step 2803: YES), this algorithm ends. If there is the normalized image 145 (step 2803: NO), this algorithm goes to step 2804. Note that this algorithm can be an infinite loop when array operation unit 40 is realized for a specific size of the image.

At step 2804, $AOU_{ij}$ inputs the whole pixel on the column i and the row j of the normalized image 145. Therefore, $AOU_{ij}$ needs memory 42 memorizing at least the number of bands of image data.

At step 2805, $AOU_{ij}$ changes the format of the normalized image 145 if necessary for a device of an output place. This is useful for the device to generate analog signals easily, especially by converting the normalized image 145 to any one-band image, or converting the more than or equal to 4 band normalized image 145 to any three-band image. Otherwise, $AOU_{ij}$ does nothing.

At step 2806, $AOU_{ij}$ memorizes a pixel on the column i and the row j of the normalized image 145, as it can certainly send image data to the devices of the output place, which has the different computational power from it.

At step 2807, $AOU_{ij}$ outputs a band-pixel value of the normalized image 145. This algorithm then returns to step 2803.

The visual device corresponding to the normalized image keeping means 28 can output the normalized image 145, by using the data processing device 110 consisting of array operation units 40.

Now, algorithm of the image memorization means 12 (refer to FIG. 1 and FIG. 6), the image vibration means 13 (refer to FIG. 3, FIG. 4 and FIG. 5), the edge-information generation means 14 (refer to FIG. 1 and FIG. 6), the edge-information formation means 15 (refer to FIG. 1 or FIG. 5, FIG. 7 or FIG. 12), the figure/ground separation means 16 (refer to FIG. 2, FIG. 4, FIG. 5, FIG. 7 or FIG. 12), the position/size detection means 17 (refer to FIG. 1 and FIG. 6), the area normalization means 27 (refer to FIG. 7), and the normalized image keeping means 28 (refer to FIG. 7), has been described above. Since all of these means are realized by neighbor processing, they can use a data processing device 110 consisting of array operation units 40 arranged in the shape of a lattice. It is, however, difficult that the image recognition means 29 (refer to FIG. 8) is realized by only neighbor processing. In order to inquire whether the data processing device 110 consisting of array operation units 40 arranged in the shape of a lattice can be used by the image recognition means 29 or not, the image recognition means 29 is classified here in details.

The image recognition means 29 is desired that the image recognition means 29 identifies one among candidates prepared beforehand as a moving object 2 or a still object 3 expanded to the size of the normalized image 145 (refer to FIG. 24) and makes a recognition result. The most basic method identifying the moving object 2 or the still object 3 is to prepare as many Template Images 146 (refer to FIG. 27) as possible, and then to find out the most similar template image 146 with the normalized image 145 by comparing the normalized image 145 with the Template Images 146. However, the image recognition means 29 can not find out the most similar template image 146 with the normalized image 145 only by extracting any two pixels from the normalized image 145 and the template image 146, respectively, and by comparing them. It is, therefore, desired that all pixels of the normalized image 145 and the template image 146 must be compared collectively. The image recognition means 29 needs such global processing as least square method and neural netowrks. Since the data processing device 110 has an architecture suitable for neighbor processing, it is difficult for the data processing device 110 itself to realize the image recognition means 29.

The image recognition means 29, now, does not have to carry out global processing in the whole process generating a recognition result from the normalized image 145. Although the image recognition means 29 must carry out global processing in the process generating the recognition result from the comparing result of any two pixels extracted from the normalized image 145 and the template image 146, the image recognition means 29 do not always have to carry out global processing in the process extracting any two pixels from the normalized image 145 and the template image 146 and comparing them. The process extracting any two pixels from the normalized image 145 and the template image 146 and comparing them is just the most basic pattern matching. Therefore, if this pattern matching is realized by neighbor processing, the image recognition means 29 can realize only process generating the recognition result from a result of this pattern matching by a general processor carrying simple calcuration like decision by majority. It is described here about a method to realize pattern matching by the data processing device 110.

Suppose first that a normalized image 145 is denoted as x, and n Template Images 146 as $y^1, y^2, ,, y^h, ,, y^n$. For a natural number g, a matching result $\delta_{ij1}$, for a pixel on the column i and the row j of a matching-result image 147 represents number of template image 146 which has the most similar pixel as the pixel of the normalized image 145 after comparing the pixels on the column i and the row j of the normalized image 145 and the template image 146. Note that the number of bands of the matching-result image 147 is dealt with one for convenience since the matching-result image 147 becomes a one-band image. The third index of function $\delta_{ij1}$ is then equal to one.

$$\delta_{ijl} = \begin{cases} g & \text{if } \sum_k (x_{ijk} - y^g_{ijk})^2 = \min_{1 \le h \le n} \sum_k (x_{ijk} - y^h_{ijk})^2 \\ & \text{for } 1 \le g \le n \text{ and only one of } g, \\ 0 & \text{otherwise.} \end{cases} \quad (37)$$

Note that all of the matching result $\delta_{ij1}$ of the matching-result image 147 generated by EQ.37 are not always identified each other. When there are many template images 146, matching-result image 147 rather tends to be like mosaic frequently. It is described here about a method that the data processing device 110 calcurates histogram of the matching result $\delta_{ij1}$ and the matching results of q neighbors, and converges the matching result $\delta_{ij1}$.

Suppose that any one-band image x represents a matching-result image 147. For a natural number g, two real number u, v, a matching image 172 is updated by EQ.38 and EQ.39. Note that the number of bands of the matching-result image 147 is dealt with one for convenience since the matching-result image 147 becomes a one-band image. The third index of function $\Psi_{ij1}(x)$ is then equal to one.

$$\Psi_{ijl}(x) = \begin{cases} g & \text{if } eq(q, x_{ijl}) + \sum_{p(l,m,1) \in P_{ijl}(q)} eq(g, x_{lml}) = \\ & \max_{1 \le h \le n} \left\{ eq(h, x_{ijl}) + \sum_{p(l,m,1) \in P_{ijl}(q)} eq(h, x_{lml}) \right\} \\ & \text{and } 2 \left\{ eq(g, x_{ijl}) + \sum_{p(l,m,1) \in P_{ijl}(q)} eq(g, x_{lml}) \right\} \ge N_{ijl} \\ & \text{for } 1 \le g \le n \text{ and only one of } g, \\ 0 & \text{otherwise.} \end{cases} \quad (38)$$

$$eq(u, v) = \begin{cases} 1 & \text{if } u = v, \\ 0 & \text{otherwise.} \end{cases} \quad (39)$$

The data processing device 110 can converge all matching results of the matching-result image 147, by computing EQ.38 and EQ.39 repeatedly while the matching-result image 147 changes. Corresponding to the combination of the normalized image 145 and the template image 146, the matching results are converged as follows: If about half pixels of the normalized image 145 are most similar to pixels of a specific Template Image 145, respectively, almost matching results of the matching-result image 147 converge to number of this specific template image 146. However, if a lump of some pixels of the normalized image 145 is similar to some lumps of pixels of some different template images 146, the matching-result image 147 includes some lumps of number of some template images 146, which are surrounded by zero. If the normalized image 145, moreover, does not have correlation with the set of template images 146, almost matching results of the matching-result image 147 becomes zero. It is assumed that it is difficult for pattern matching realized by the data processing device 110 to find the most similar template image 146 to the normalized image 145, but the pattern matching can select some similar template images 146 among all template images 146. The process generating a recognition result from a result of pattern matching only has to select the most similar one among similar candidates of Templated Image 146 listed by the matching-result image 147 generated by the pattern matching.

Figure 27:
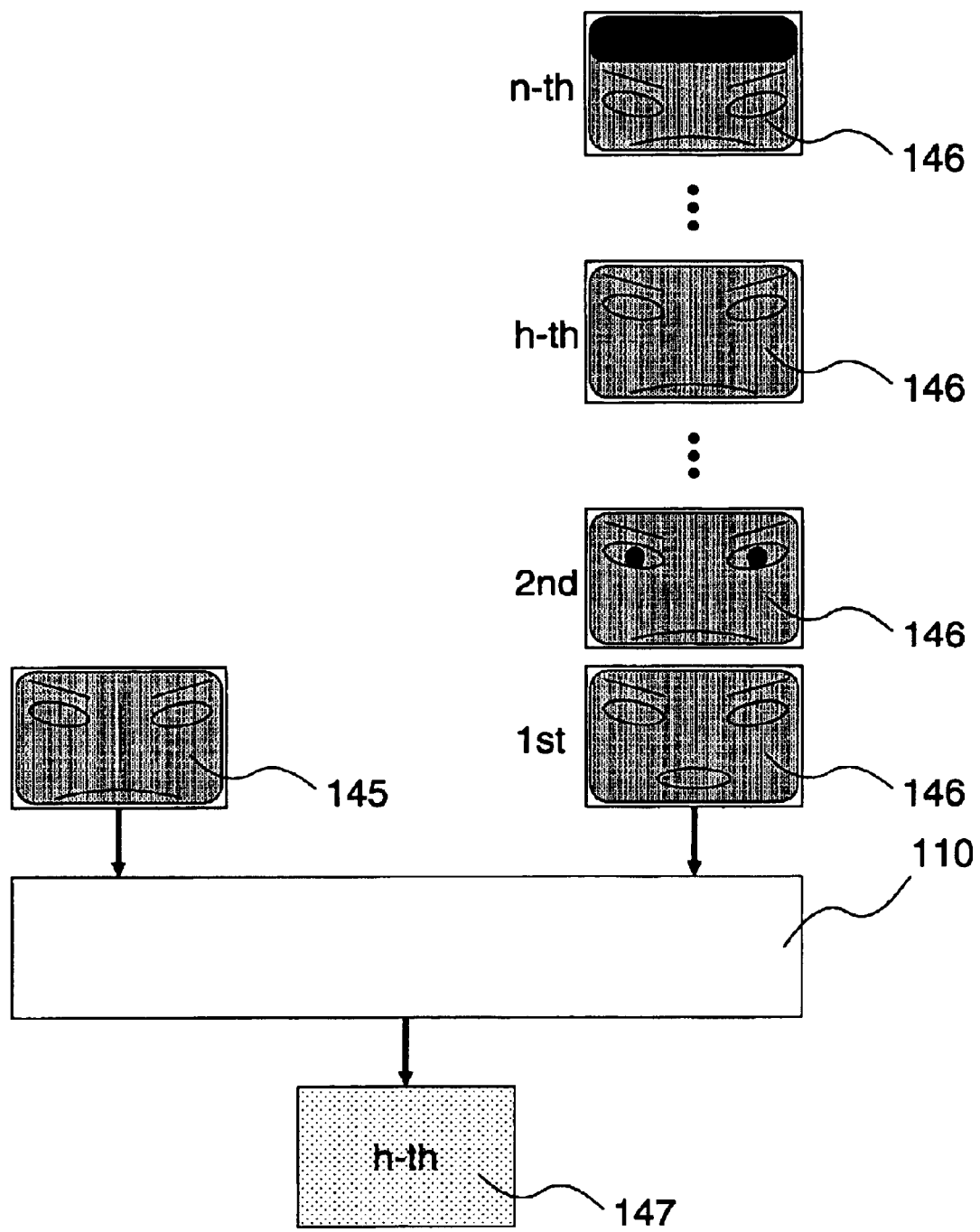
FIG. 27 is an explanation view for carrying out pattern matching for a normalized image from a Template Image.
Figure 28:
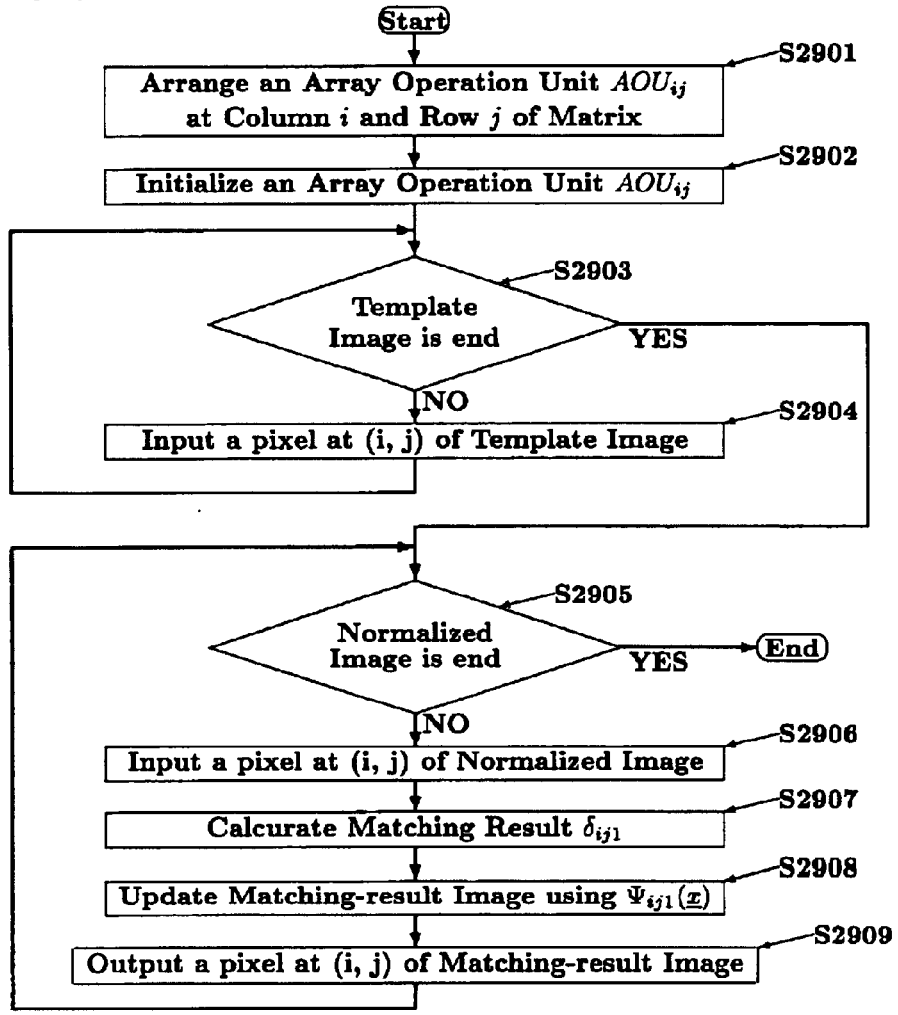
FIG. 28 is a flow chart appearing an algorithm of pattern matching including an image recognition means in this enforcement form.

As shown in FIG. 27, in order for pattern matching described in claim 11 realized by a data processing device 110 to generate a matching-result image 147 consisting of matching results representing number of the similar image to a normalized image 145 of a template image 146, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 28.

At step 2901, $AOU_{ij}$ is arranged at the column i and the row j of the matrix. This is desired to decide neighbors of $AOU_{ij}$ either logically and physically.

At step 2902, neighbors of $AOU_{ij}$ are set and its parameters are initialized. In setting the neighbors, the number of neighbors q used in the above functions can be defined individually, or all of them can be defined uniformly. In order to make the matching-result image 147 generated by data processing device 110 of the present invention more exact, the number of neighbors q have to be set a large number for all functions. The pattern matching, however, can cope with limitation of computational time to update the matching results and the size of the input normalized image 145, by varying the number of neighbors suitably.

At step 2903, $AOU_{ij}$ judges whether there is a template image 146 inputed one by one or not. If there is not the template images 146 any more (step 2903: YES), this algorithm goes to step 2905. If there is the template image 146 (step 2903: NO), this algorithm goes to step 2904.

At step 2904, $AOU_{ij}$ inputs the whole pixel on the column i and the row j of the Template Image 146. Therefore, $AOU_{ij}$ needs memory 42 memorizing image data whose number is equal to at least the number of bands by the number of template image 146. This algorithm then returns to step 2903.

At step 2905, $AOU_{ij}$ judges whether there is a normalized image 145 inputed one by one or not. If there is not the normalized images 145 any more (step 2905: YES), this algorithm ends. If there is the normalized image 145 (step 2905: NO), this algorithm goes to step 2906. Note that this algorithm can be an infinite loop when array operation unit 40 is realized for a specific size of the image.

At step 2906, $AOU_{ij}$ inputs the whole pixel on the column i and the row j of the normalized image 145. Therefore, $AOU_{ij}$ needs memory 42 memorizing at least the number of bands of image data.

At step 2907, $AOU_{ij}$ computes the matching result $\delta_{ij1}$ of the matching-result image 147 by the normalized image 145 and the template image 146. The matching result is a band-pixel value representing number of the most similar template image 146 to the normalized image 145.

At step 2908, for each band-pixel value of the matching-result image 147, $AOU_{ij}$ updates the matching result according to the function $\Psi_{ij1}(x)$, by communicating with neighbor array operation units 40. The updated band-pixel value regards as a band-pixel value of a matching-result image again. The function $\Psi_{ij1}(x)$ is repeated by nature until the band-pixel value of the matching-result image 147 stops changing. However, it is better for $AOU_{ij}$ to close this update processing in some specific repeat times, corresponding to limitation of computational time, quality of the input normalized image 145, quality desired for the matching-result image 147.

At step 2909, $AOU_{ij}$ outputs a band-pixel value of the matching-result image 147. This algorithm then returns to step 2905.

The visual device described in claim 11 corresponding to pattern matching in the image recognition means 29 can generate the matching-result image 147 from the normalized image 145, by using the data processing device 110 consisting of array operation units 40.

I have described about methods carrying out image processing which uses only neighbor processing, using a data processing device 110 consisting of array operation units 40. It is explained here about the visual device described in claim 11, which realizes the figure/ground separation means 16 (refer to FIG. 2 and FIG. 7) by only neighbor processing, using a data processing device 110 consisting of array operation units 40.

First, nonlinear oscillators generally presents attraction phenomenon. This attraction phenomenon is the phenomenon limited as some nonlinear oscillators representing different cycles vibrate in cycles, which shows a simple constant ration, by interaction. When oscillation of one nonlinear oscillator is changed, other nonlinear oscillators change their oscillation together. These nonlinear oscillators, therefore, are synchronizing. In addition, the adjusted interaction among the nonlinear oscillators can causes making the difference of phases of any two oscillators as small and big as possible. Controlling the interaction, a group of nonlinear oscillators can be diviced into some groups whose oscillators represent different phases. The figure/ground separation means 16 separates objects and background by using such attraction of oscillators, as edge information of an edge-information image becomes the border, and then generates an object-area image representing an Object Area. A case that a van der Pole oscillator is used for the nonlinear oscillator is described here.

First, in a nonlinear oscillator network consisting of nonlinear oscillators arranged in the shape of a lattice, let a nonlinear oscillator on the column i and the row j be $\omega w_{ij}$. A set $\Omega_{ij}(q)$ of q neighbors of the nonlinear oscillator $\omega_{ij}$ is represented by EQ.40, where q is a progression of 4, 8, 24, 48, 80, 120, $(2r+1)_2-1$, and r is a natural number. When a nonlinear oscillator outside of the network is included in the neighbor set $\Omega_{ij}(q)$, it is superseded by the nonlinear oscillator $\omega_{ij}$. Processing around the border is automatically carried out by this replacement. Then, the number of elements of the neighbor set $\Omega_{ij}(q)$ is always q. As this showing, the nonlinear oscillator network is regarded as a one-band image. In order to describe simply, there are only two indexes of the nonlinear oscillator network, which represent horizontal axis and vertical axis.

$$\Omega_{ij}(q) = \begin{cases} \{w_{i+1,j}, w_{i,j+1}, w_{i-1,j}, w_{i,j-1}\} & \text{if } q = 4, \\ \{w_{l,m} \mid i-r \le l \le i+r, j-r \le m \le j+r, w_{l,m} \ne w_{i,j}\} & \text{if } q = (2r+1)^2 - 1. \end{cases} \quad (40)$$

Next, the nonlinear oscillator is connected by a link value rijkl calcurated by EQ.41 between it and one of nonlinear oscillators in a neighbor set $\Omega_{ij}(q_a)$, which is included within its $q_a$ neighbors. If you do not use table of logarithms, it is also possible to use approximation by EQ.42. Note that $\mu$ and $\nu$ are positive constants.

$$\tau_{ijkl} = \mu \mathrm{sinc}\left(\frac{(i-k)^2 + (j-l)^2}{\nu^2}\right) \text{ for } \forall\, w_{kl} \in \Omega_{ij}(q_a) \quad (41)$$

$$\mathrm{sinc}(x) \approx \begin{cases} 1 - 2|x|^2 + |x|^3 & \text{if } 0 \le |x| < 1, \\ 4 - 8|x| + 5|x|^2 - |x|^3 & \text{if } 1 \le |x| < 2, \\ 0 & \text{otherwise.} \end{cases} \quad (42)$$

In a case that all nonlinear oscillators of a nonlinear oscillator network synchronize with the same phase completely, a nonlinear oscillator $\omega_{ij}$ remains oscillating with the same phase parmanently as long as a processor calcurates the oscillation. This situation can be avoided if an external noise $p_{ij}$ is given to the network. Although a pseudorandom number can be used for the external noise, there is no problem even though the external noise is made from such simple equation as EQ.43. Note that $\zeta_{ij}$ represents whether there is edge information on the column i and the row j of an edge-information image or not. If there is edge information, it is equal to one. Otherwise, it is equal to zero. In addition, $\kappa$ is a positive constant.

$$\rho_{ij} = \kappa \zeta_{ij} \quad (43)$$

In order for a nonlinear oscillator $\omega_{ij}$ to synchronize with a nonlinear oscillator $\omega_{k1}$ of a neighbor set $\Omega_{ij}(q_a)$, a neighbor input summation $\sigma_{ij}$ is calcurated by EQ.44.

$$\sigma_{ij} = \sum_{w_{kl} \in \Omega_{ij}(q_a)} \tau_{ijkl}(1 - \zeta_{kl})\xi_{kl}(\psi_{kl} - \xi_{ij}) \quad (44)$$

Two parameters $\phi_{ij}$ and $\psi_{ij}$ constituting a van der Pole nonlinear oscillator $\omega_{ij}$ are calcurated by EQ.45 and EQ.46. Note that $\gamma$ and $\epsilon$ are positive constants.

$$\frac{d\phi_{ij}}{dt} = \psi_{ij} \quad (45)$$

$$\frac{d\psi_{ij}}{dt} = -\gamma\phi_{ij} - \epsilon(1 - \phi_{ij}^2)\psi_{ij} + \sigma_{ij} + \rho_{ij} \quad (46)$$

The deference of phases between any two of all nonlinear oscillators must be calcurated in order to separate nonlinear oscillators in an object area from nonlinear oscillators in an background area. However, the phase gap is derived from judging whether a parameter $\phi_{ij}$ is more than or equal to threshold value $\theta$, or less than the value, because the present invention only has to separate the object area from the background area. An output $\lambda_{ij}$ representing a result of separation the object area from the background area is derived by EQ.47. Note that $\theta$ is a positive constant.

$$\lambda_{ij} = \begin{cases} 1 & \text{if } \psi_{ij} \ge \theta, \\ 0 & \text{otherwise.} \end{cases} \quad (47)$$

If edge information is not enough to separate an object from background, the edge information must be complemented, it is desired for the complement to count how many nonlinear oscillators shift their phases among a set $\Omega_{ij}(q_b)$ of nonlinear oscillators within $q_b$ neighbors of a nonlinear oscillator $\omega_{ij}$. A contour parameter $\eta_{ij}$ is computed by EQ.48.

$$n_{ij} = \sum_{w_{kl} \in \Omega_{ij}(q_b)} \lambda_{ij}\lambda_{kl} + (\lambda_{ij})^2 \quad (48)$$

Based on this result, a border parameter $\epsilon_{ij}$, which represents a complemental rate for edge information, is computed by EQ.49. Note that $\alpha$, $\beta$, $\eta_{min}$ and $\eta_{max}$, are positive constants.

$$\frac{d\xi_{ij}}{dt} = \begin{cases} -\alpha\xi_{ij} & \text{if } \eta_{min} \le \eta_{ij} \le \eta_{max}, \\ \beta(1 - \xi_{ij}) & \text{otherwise.} \end{cases} \quad (49)$$

Although it has been explained about the case of using van der Pole for a nonlinear oscillator, this separation can be carried out by any nonlinear oscillator presenting attraction phenomenon such as nonlinear oscillators like a blasselator stabilized in a limit cycle, and chaos oscillators generating Lorentz Attractor and attractor of Ressler Equation, and so on. In this case, two parameters $\phi_{ij}$ and $\phi_{ji}$ only have to be superseded by parameters of each nonlinear oscillator, or some parameters are only appended to van der Pole. In addition, we only have to add a neighbor input summation $\sigma_{ij}$ and an external noise $\rho_{ij}$ to a certain parameter. Note that a chaos oscillator does not need the external noise $\rho_{ij}$ especially.

Algorithm of all Array Operations Units 40 in a data processing device 110 which can realize the figure/ground separation means 16 (refer to FIG. 2 and FIG. 7) can be described by EQ.40 to EQ.49. It is explained here about the visual devices described in claim 12, corresponding to the figure/ground separation means 16, by representing the algorithm of any array operation unit 40 in the data processing device 110.

Figure 29:
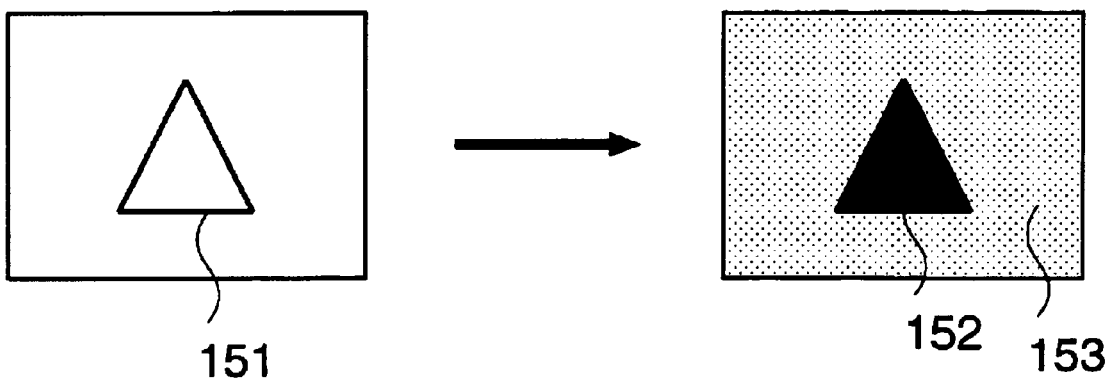
FIG. 29 is an explanation view appearing a state where triangular edge information separates an inside area of triangle and an outside area of triangle.
Figure 30:
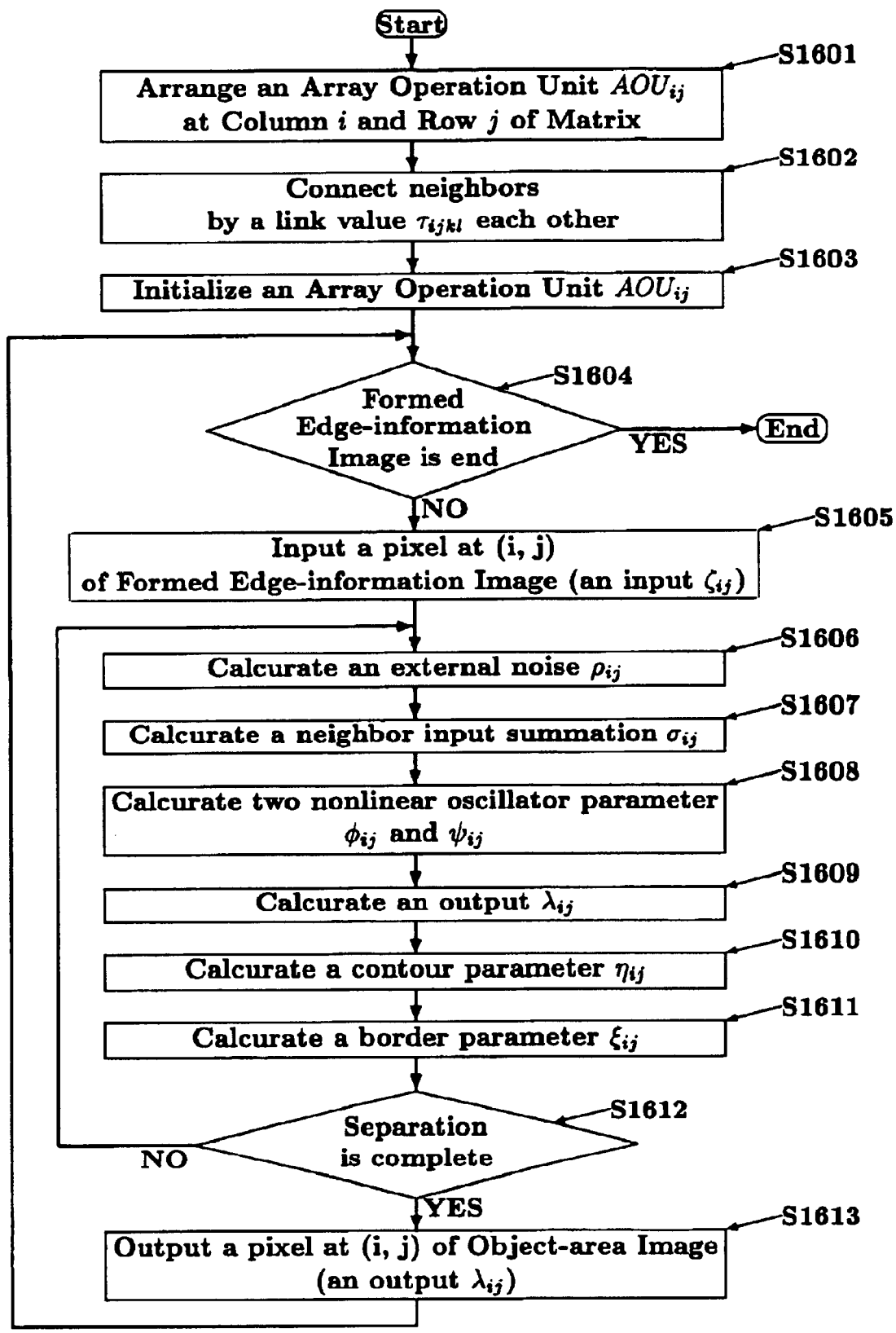
FIG. 30 is a flow chart appearing an algorithm of a figure/ground separation means in this enforcement form.

As shown in FIG. 29, in order for the figure/ground separation means 16 realized by a data processing device 110 to separate a inside area of triangle 152 from an outside area of triangle 153, by using formed triangular edge information 151, array operation units 40 arranged in the shape of a lattice work synchronously in parallel. Let an array operation unit 40 at a column i and a row j of a matrix be $AOU_{ij}$. Algorithm of $AOU_{ij}$ is shown in FIG. 30.

At step 1601, $AOU_{ij}$ is arranged at the column i and the row j of the matrix.

At step 1602, two neighbors $\omega_{ij}$ and $\omega_{kl}$ are connected by a link value $\tau_{ijkl}$ each other, based on EQ.41 and EQ.42.

At step 1603, two parameters of the nonlinear oscillator, $\phi_{ij}$ and $\psi_{ij}$, are initialized by certain values.

At step 1604, $AOU_{ij}$ judges whether there is a formed edge-information image 115 inputed one by one or not. If there is not the formed edge-information image 115 any more (step 1604: YES), this algorithm ends. If there is the formed edge-information image 115 (step 1604: NO), this algorithm goes to step 1605. Note that this algorithm can be an infinite loop when array operation unit 40 is realized for a specific number of bands and a specific size of the image.

At step 1605, $AOU_{ij}$ inputs $\zeta_{ij}$ of formed edge information 114.

At step 1606, $AOU_{ij}$ derives an external noise $\rho_{ij}$ from $\zeta_{ij}$ of the previously input formed edge information 114, according to EQ.43.

At step 1607, $AOU_{ij}$ inputs $\zeta_{kl}$, $\epsilon_{kl}$, $\phi_{kl}$ from an array operation unit 40 $AOU_{kl}$ which has a nonlinear oscillator $\omega_{kl}$ in a neighbor set $\Omega_{ij}(q_a)$, and calcurates a summation $\sigma_{ij}$ according to EQ.44.

At step 1608, two parameters of the nonlinear oscillator, $\phi_{ij}$ and $\psi_{ij}$ are calcurated by EQ.45 and EQ.46. In short, differential equations described by these equations are solved in Ruge-Kutta method.

At step 1609, An output of the nonlinear oscillator $\lambda_{ij}$ is computed according to EQ.47. $\lambda_{ij}=1$ if $\phi_{ij} \geq \theta$. Otherwise, $\lambda_{ij}=0$.

At step 1610, $AOU_{ij}$ inputs $\lambda_{kl}$ from an array operation unit 40 $AOU_{kl}$ which has a nonlinear oscillator $\omega_{kl}$ in a neighbor set $\Omega_{ij}(q_b)$, and calcurates a contour parameter $\eta_{ij}$ according to EQ.48.

At step 1611, a border parameter $\epsilon_{ij}$ are calcurated by EQ.49. In short, a differential equation described by this equation are solved in finite difference method or Ruge-Kutta method.

At step 1612, $AOU_{ij}$ judges whether the separation times representing the repeat times from step 1606 to step 1611 achieve the directed times or not. If the separation times do not achieve the directed times (step 1612: NO), this algorithm returns to step 1606. If the separation times achieve the directed times (step 1614: YES), this algorithm goes to step 1613.

At step 1613, $AOU_{ij}$ outputs the output of the nonlinear oscillator $\lambda_{ij}$, which is a band-pixel value of the object-area image 142. This algorithm then returns to step 1604.

In order to derive the separation time at step 1612, we can use the following method: In the case that almost any formed edge information 114, whose size is constant, is used, the figure/ground separation means 16 finishes the separation within a certain period, in spite of initial state of nonlinear oscillators. Therefore, there is no problem if the repeat times from step 1606 to step 1611 in the period are counted beforehand. Because time which nonlinear oscillators take to synchronize by attraction phenomenon does not almost vary when their initial states are within the fixed limits.

Although only nonlinear oscillators are computed, as described above, the reason why the figure/ground separation means 16 can separate the inside area of triangle 152 from the outside area of triangle 153 by using the formed triangular edge information 151 is to use attraction phenomenon which is character of a nonlinear oscillator. In short, phases of two nonlinear oscillators comes to be as same as possible if the nonlinear oscillators are connected by a positive link value. On the other hand, the difference of their phases comes to be as large as possible if they are connected by a negative link value. In a case of using this character, both of two nonlinear oscillators not connecting directly come to have the same phase, by connecting nonlinear oscillators arranged in the shape of a lattice with neighbors by positive Link Values one another. Suppose, furthermore, that two nonlinear oscillators lying at pixels, between which formed edge information 114 is put, are connected by a negative link value each to each. The oscillators at both sides of the edge information shift their phases as differently as possible each to each. By this, two different phase sets can be present at inside domain and outside domain divided by Edge Information 151 of a triangle. The figure/ground separation means 16, therefore, separates inside area of triangle 152 and outside area of triangle 153 shown in FIG. 29. Note that the difference of phases of an inside area of triangle 152 and an outside area of triangle 153 is as close to 180 degrees as possible beyond 90 degrees, and then a triangle area and a background area can be separated.

It is important here that a link value is changed on appearance in the following way in this enforcement form, once formed edge information 114 is got. As defined in EQ.41 and EQ.42, first, a link value for connecting a nonlinear oscillator wk, to a nonlinear oscillator $\omega_{ij}$ is set to $\tau_{ijkl}$ (refer to step 1602). For both formed edge information $\lambda_{ij}$ and $\lambda_{kl}$, the formed edge information is set to one if there is an edge. Otherwise, it is set to zero. If the formed edge information $\lambda_{ij}$ and $\lambda_{kl}$ is inputed (refer to step 1605), the formed edge information $\lambda_{kl}$ is transmitted from an array operation unit 40 $AOU_{kl}$ to $AOU_{ij}$. Moreover, $AOU_{ij}$ calcurates a link value $\tau_{ijkl}(1-\lambda_{kl})$, and substitutes it for a link value $\tau_{ijkl}$ (refer to step 1607). For this substituted link value $\tau_{ijkl}(1-\lambda_{kl})$, a border parameter $\epsilon_{ij}$ acts as the magnification between zero and one (refer to step 1607).

Figure 31:
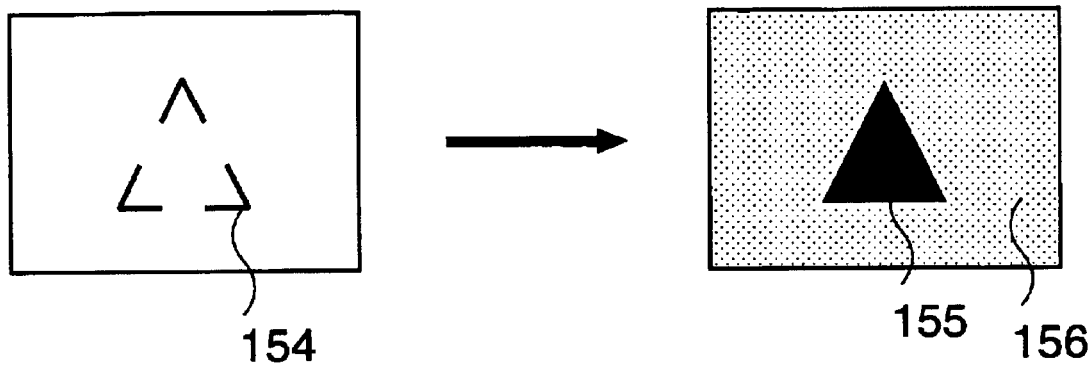
FIG. 31 is an explanation view appearing a state where Dashed triangular edge information separates an inside area of dashed triangle and an outside area of dashed triangle.

As shown in FIG. 31, when formed edge information 114 becomes dashed triangular edge information 154, a dashed line has to be complemented. Suppose first that a system works, using the dashed triangular edge information 154 (refer to step 1605). Although the difference of phases between an inside area and an outside area devided by dashed triangular edge information 154 comes to be beyond about 90 degrees, an domain around the border of the inside and outside areas of the triangle is not clear. Each $AOU_{ij}$ calcurates an output of its nonlinear oscillator $\lambda_{ij}$ (refer to step 1609). Suppose that this output $\lambda_{ij}$ is equal to one. When a nonlinear oscillator whose $\lambda_{kl}$ is equal to one among neighbor nonlinear oscillators is $\omega_{kl}$, both two parameter $\phi_{ij}$ and $\phi_{kl}$ are more than or equal to $\theta$. In short, phases of $\lambda_{ij}$ and $\lambda_{kl}$ are almost same, and the difference of phases is not beyond at most 90 degrees if $\theta$ is positive. The maximum value of this difference of phases is decided by $\theta$. The bigger $\theta$ becomes, within a range where both $\lambda_{ij}$ and $\lambda_{kl}$ are equal to one, the closer to zero degree the difference of phases becomes. By using $\lambda_{ij}$ and $\lambda_{kl}$, then, a contour parameter $\eta_{ij}$ representing the number of neighbor nonlinear oscillators whose phases are almose same are computed by EQ.48 (refer to step 1610). Moreover, a border parameter $\epsilon_{ij}$ which is the magnification of a link value is decreased according to EQ.49 if this contour parameter $\eta_{ij}$ is about half of all neighbors. Otherwise, the border parameter is increased according to EQ.49 (refer to step 1611). For an example of eight neighbors, the border parameter can be decreased according to EQ.49 if the contour parameter lies between three and five. By remaining carrying out this process repeatedly, an inside area of dashed triangle 155 and an outside area of dashed triangle 156 are separated when the dashed triangular edge information 154 shown in FIG. 31 is given.

Figure 32:
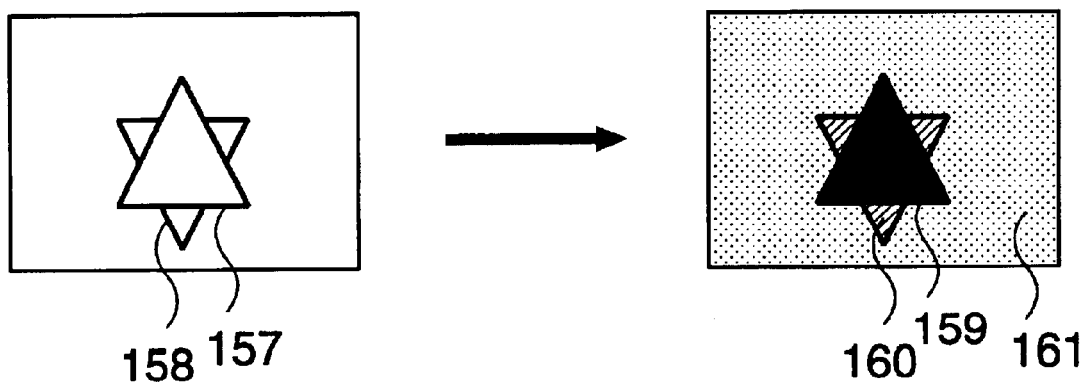
FIG. 32 is an explanation view appearing a state where Edge Information of two stacked triangles separates two triangle areas and a background area.
Figure 33:
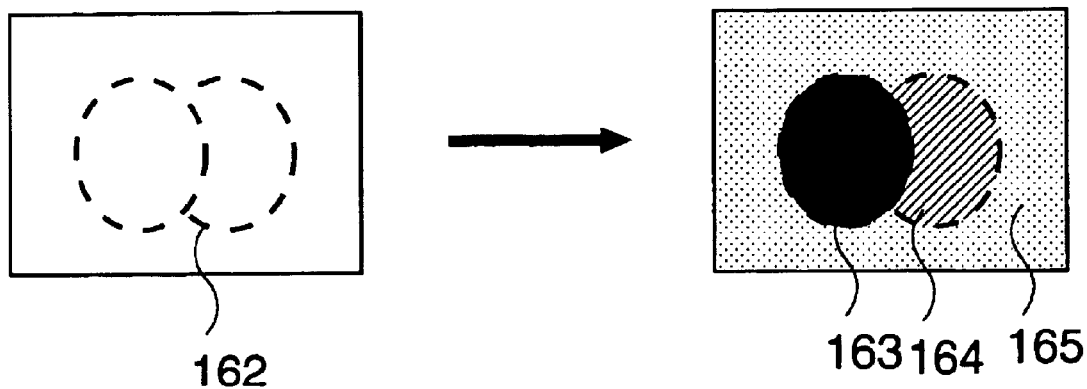
FIG. 33 is an explanation view appearing a state where dashed edge information separates two circular areas and a background area in a case that two circular object areas are overlapping.

As shown in FIG. 32, edge information of front triangle 157 and edge information of rear triangle 158 can be derived when two triangles are stacked. Three areas, an inside area of front triangle 159, an inside area of rear triangle 160 and a ground area of double triangle 161 are separated by shifting phases of nonlinear oscillators in the areas one another. As shown in FIG. 33, in addition, an inside area of front circle 163, an inside area of rear circle 164 and a ground area of overlapping circles 165 are separated even though edge information of overlapping circles 162 makes a dashed lined.

The visual device described in claim 12 corresponding to the figure/ground separation means 16 can separate some object areas 141 from a background area, whose borders are represented by formed edge information 114 of a formed edge-information image 115, by using the data processing device 110 consisting of array operation units 40.

It has been explained above about the visual devices described in claim 6 to claim 12.

Of course, these visual devices can be implemented by general computers. When moving objects 2 must be counted, however, each of the above means has to be carried out quickly, corresponding to velocity of moving objects 2. Especially, when the size of a frame image 1 becomes big or its resolution becomes high, computational complexity increases, being proportional to the size of image or its resolution for each of horizontal axis and vertical axis, in the image memorization means 12 (refer to FIG. 1 and FIG. 6), the image vibration means 13 (refer to FIG. 3, FIG. 4 and FIG. 5), the edge-information generation means 14 (refer to FIG. 1 and FIG. 6), the edge-information formation means 15 (refer to FIG. 1 or FIG. 5, FIG. 7 or FIG. 12), the figure/ground separation means 16 (refer to FIG. 2, FIG. 4, FIG. 5, FIG. 7 or FIG. 12), the position/size detection means 17 (refer to FIG. 1 and FIG. 6), the area normalization means 27 (refer to FIG. 7), the normalized image keeping means 28 (refer to FIG. 7), and the image recognition means 29 (refer to FIG. 8), which must process their images themselves. Therefore, the visual devices described in claim 6 to claim 12 may not be able to achieve desired performance, in a specific use.

In order to realize the image memorization means 12, the image vibration means 13, the edge-information generation means 14, the edge-information formation means 15, the figure/ground separation means 16, the position/size detection means 17, the area normalization means 27 and the normalized image keeping means 28 by using digital technology, some array operation units 40 described in claim 13 are arranged in a data processing device 110 in the shape of a lattice, as shown in FIG. 13, and then the array operation units 40 are wired as they can communicate with some adjoining array operation units 40 in the data processing device 110 one another. In short, any two of four neighbors are wired directly each other. This case uses less electronic parts and wired volumes than a case that any two of eight neighbors are wired. The former also run with the almost same speed as the latter. In addition, the former can have more extentdibility than the latter, even though the number of neighbors will be extended in future.

Figure 34:
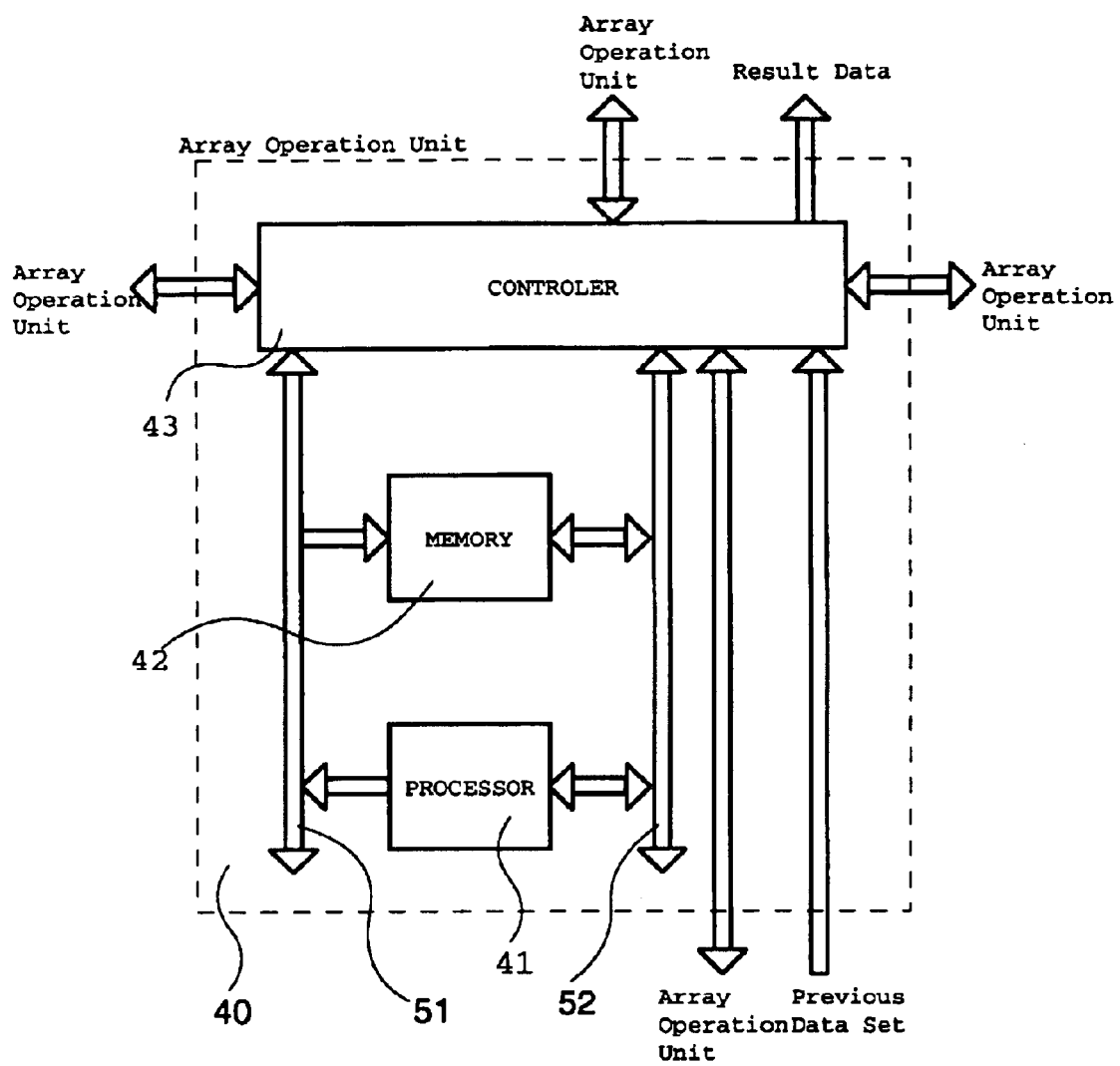
FIG. 34 is a block diagram of internal architecture of an array operation unit.

As shown in FIG. 34, an array operation unit 40 described in claim 14 consists of a processor 41 for computing equations of image processing, a memory 42 for memorizing all parameters, constant values, functions and operators used in the equations, a controler 43 for communicating with neighbor array operation units 40. The processor 41 can select any memory elements and registers in the memory 42 and the controler 43, by an address directed by address bus 51. The processor 41 is also connected bidirectionaly with the memory 42 and the controler 43 via data bus 52, and can access to data in any memory elements and registers directed by address bus 51. Once the array operation unit 40 inputs a front input data set consisting of one and more input pixels, the controler 43 memorizes the front input data set in the memory 42. The controler 43 makes the memory 42 to memorize computational data received from some adjoining array operation units 40, and moreover transmits the data to other adjoining array operation units 40, from which it does not input the data, if neccesary, while the controler 43 sends computational data, which are generated by the functions, in the memory 42 to some adjoining array operation units 40. Finally, the controler 43 outputs image data of output images as result data.

The reasons why each array operation unit 40 has the controler 43 as described above are the followings: First, the processor 41 can compute during waiting communication, that is, it can realize fast processing because the processor 41 can work while the array operation units 40 are communicating with one another. Second, a hardware of the array operation unit 40 does not have to be changed, even though the number of its neighbor array operation units 40 varies. Third, a program of the processor 41 does not have to carry out border processing of image, that is, exception handling for border pixels in the image and then becomes extremely simple, since the controler 43 can carry out border processing automatically.

Figure 35:
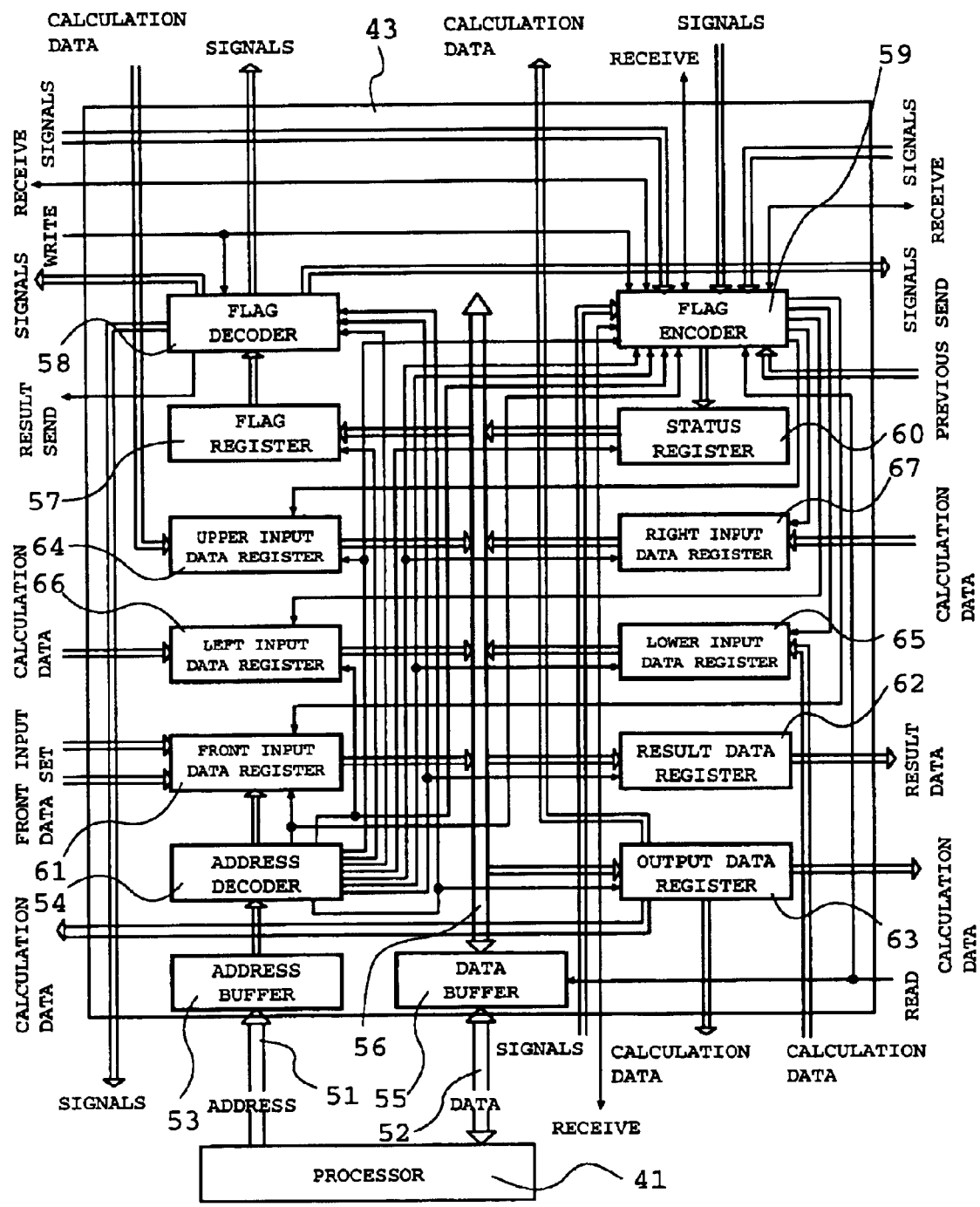
FIG. 35 is a block diagram of a controler.

The processor 41 and the memory 42 can be made by general digital circuits. A circuit diagram of the controler 43 is shown in FIG. 35. After an address buffer 53 receives address from the processor 41 via address bus 51, an address decoder 54 selects one of registers and other functional blocks. After a data buffer 55 receives data from the processor 41 via data bus 52, it exclusively communicates with a regster selected by the address decoder 54 via internal data bus 56, where the direction of communication is directed by READ. When address directs a flag register 57, data are memorized in the flag register 57, is decoded by a flag decoder 58, and then is sent to some adjoining array operation units 40 for SIGNALS. After the SIGNALS are received and analyzed by a flag encoder 59, RECEIVE, which are derived from the SIGNALS, are replied to the array operation units 40 which are senders of the SIGNALS, while they are memorized in a status register 60. The RECEIVE is received by the flag encoder 59, which is a sender of the SIGNALS. As a result, it is checked that transmitting of the SIGNALS has completed. Once the status register 60 is selected by address, contents of the status register 60 are sent to the processor 41 via data bus 52, regarding them as data. After the flag encoder 59 is received one and more FRONT INPUT SENDs, corresponding to one and more input images, respectively, front input data sets made from one and more input images are read to a front input data register 61, which prepares a memory area necessary to-memorize the sets. After the front input data register 61 is selected by address, contents of the front input data register 61 are sent to the processor 41, regarding them as data. Once the processor 41 has computed image data of an output image, a result data register 62 is selected by address, and then reads them from the processor 41, regarding them as result data. At this time, the flag encoder 59 sends RESULT SEND.

If data necessary to compute are desired by a neighbor array operation unit 40, address of an output data register 63 is selected, the output data register 63 reads data to send to the neighbor array operation unit 40, regarding them as calcuration data. The calcuration data are then send to all neighbor array operation units 40. Suppose that SIGNALS are received from an upper array operation unit 40. An upper input data register 64 reads calcuration data. After the upper input data register 64 is selected by address, contents of the upper input data register 64 are sent as calcuration data. Even though SIGNALS are received from either an lower, left or right array operation unit 40, it can work similarly, that is, a lower input data register 65, a left input data register 66, and a right input data register 67 work as well as the upper input data register 64 does.

Figure 36:
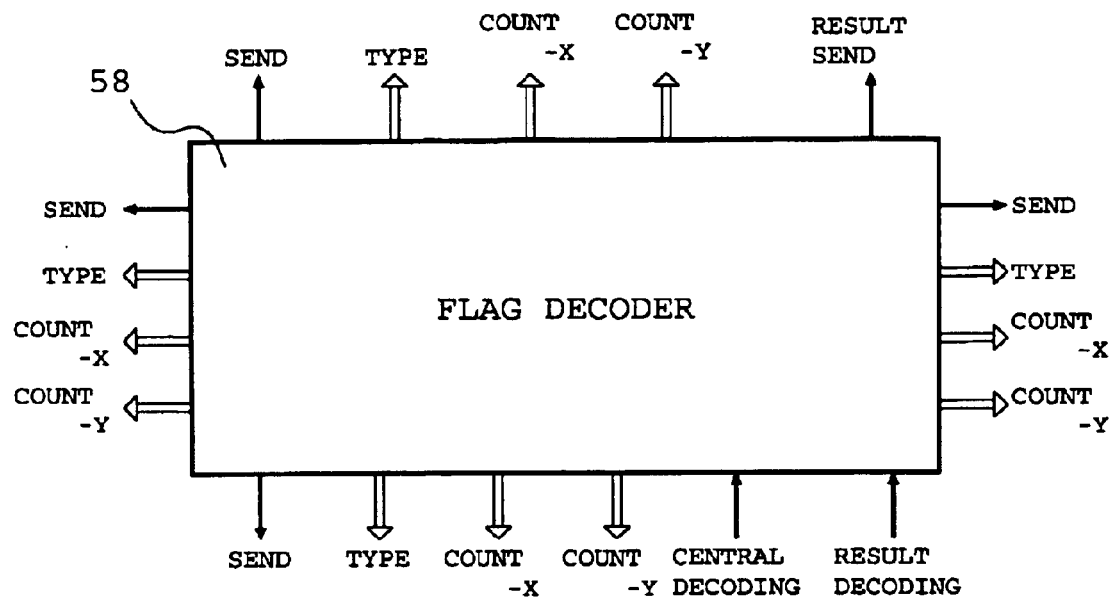
FIG. 36 is an explanation view appearing some input and output signals of a flag decoder.
Figure 37:
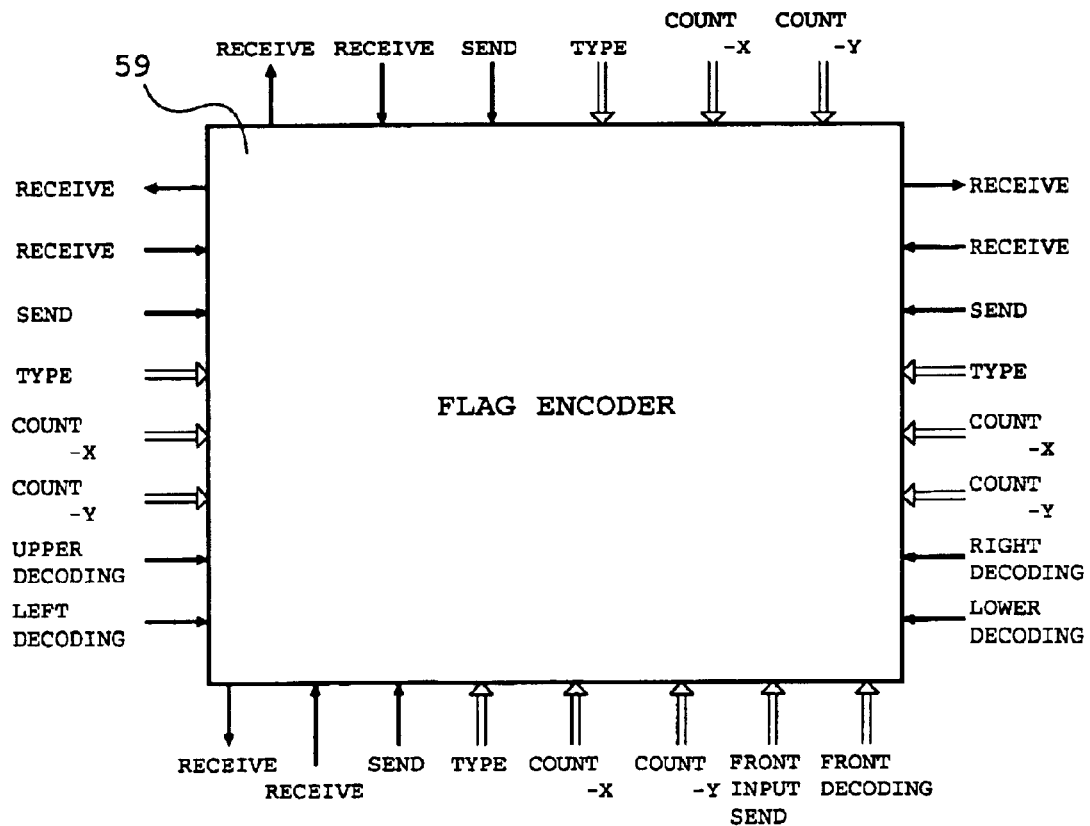
FIG. 37 is an explanation view appearing some input and output signals of a flag encoder.

Each block such as some buffers, some registers and the address decoder 54 is a general digital circuit. The flag decoder 58 and the flag encoder 59 have input and output signals, as shown concretely in FIG. 36 and FIG. 37. TYPE represents some kinds of contents read to the output data register 63 in a five-bit signal. The number of bits of this signal is enough for an array operation unit 40 to distinguish all calcuration data due to send and receive. COUNT-X and COUNT-Y denote four-bit unsigned integer, respectively, and represent transmitting times between array operation units 40. In a case that the array operation unit 40 sends calcuration data, both the COUNT-X and the COUNT-Y are set to zero. In a case that the array operation unit 40 sends again calcuration data sent from either left or right array operation unit 40, the COUNT-X becomes COUNT-X of a flag encoder 59 of the sender plus one. In a case that the array operation unit 40 sends again calcuration data sent from either upper or lower array operation unit 40, the COUNT-Y becomes COUNT-Y of a flag encoder 59 of the sender plus one. Suppose that the flag decoder 58 receives CENTRAL DECODING of the address decoder 54, which specified the output data register 63, after the processor 41 specified SEND FLAG of the flag register 57 some of upper, lower, left and right array operation units 40, to which contents of the output; data register 63 are sent. The flag decoder 58 outputs SEND to the specified directions the SEND FLAG. The SEND FLAG denotes a four-bit signal. When calcuration data of the array operation unit 40 are sent to four neighbor array operation units 40, the processor 41 set the SEND FLAG to 1111. When calcuration data sent from the right array operation unit 40 are sent to the upper, lower and left array operation units 40, the processor 41 set the SEND FLAG to 1110. When calcuration data sent from the left array operation unit 40 are sent to the upper, lower and right array operation units 40, the processor 41 set the SEND FLAG to 1101. When calcuration data sent from the lower array operation unit 40 are sent to the upper array operation unit 40, the processor 41 set the SEND FLAG to 1000. When calcuration data sent from the upper array operation unit 40 are sent to the lower array operation unit 40, the processor 41 set the SEND FLAG to 0100. Since not only there is no redundant transmitting and transmitting is carried out effectively, but also a rule for deciding transmit directions is clear, the flag encoder 59 can judge which TYPE of calcuration data are sent from which array operation unit 40, by combining the TYPE, the COUNT-X and the COUNT-Y. The flag decoder 58 receives RESULT DECODING simultaneously, when calcuration data are read to the result data register 62 as result data. The flag decoder 58 then sends RESULT SEND.

Whenever the flag encoder 59 receives SEND from at least one of four neighbors, it also receives TYPEs, COUNT-Xs and COUNT-Ys from sides receiving SEND, and then a part of contents of status register 60 is updated, corresponding to the received signals. Simultaneously, the flag encoder 59 sends RECEIVE which was set to one to the sides. A flag encoder 59 of an array operation unit 40, which is the sender, receives the RECEIVE at a moment when the RECEIVE changes to one, and then updates RECEIVE STATUS in the status register 60. Each array operation unit 40 can, therefore, judge which input data registers memorize valid calcuration data, only by checking RECEIVE STATUS in its status register 60. For example, suppose that the upper input data register 64 has already stored calcuration data. The processor 41 can read data from the upper input data register 64 by directing address. UPPER DECODING is simultaneously sent from the address decoder 54 to the flag encoder 59. After a part representing a up side in RECEIVE STATUS goes back to zero, RECEIVE toward the up side, which represents zero, is sent. In cases of the lower input data register 65, the left input data register 66 and the right input data register 67, each array operation unit 40 works similarly. Whenever the flag encoder 59 receives one of FRONT INPUT SENDs for some input images, the flag encoder 59 sets FRONT INPUT SEND STATUS in the status register 60 to one, where the FRONT INPUT SEND STATUS is used for an input image corresponding to the received FRONT INPUT SEND. Moreover, when the processor 41 reads data from the front input data register 61 for input images, the address decoder 54 sends FRONT DECODING to the flag encoder 59, and then the flag encoder 59 sets FRONT INPUT SEND STATUS corresponding to the received FRONT INPUT SEND to zero. The processor 41 can judge whether a last input image is memorized in the front input data register 61, by reading contents of the status register 60.

Figure 38:
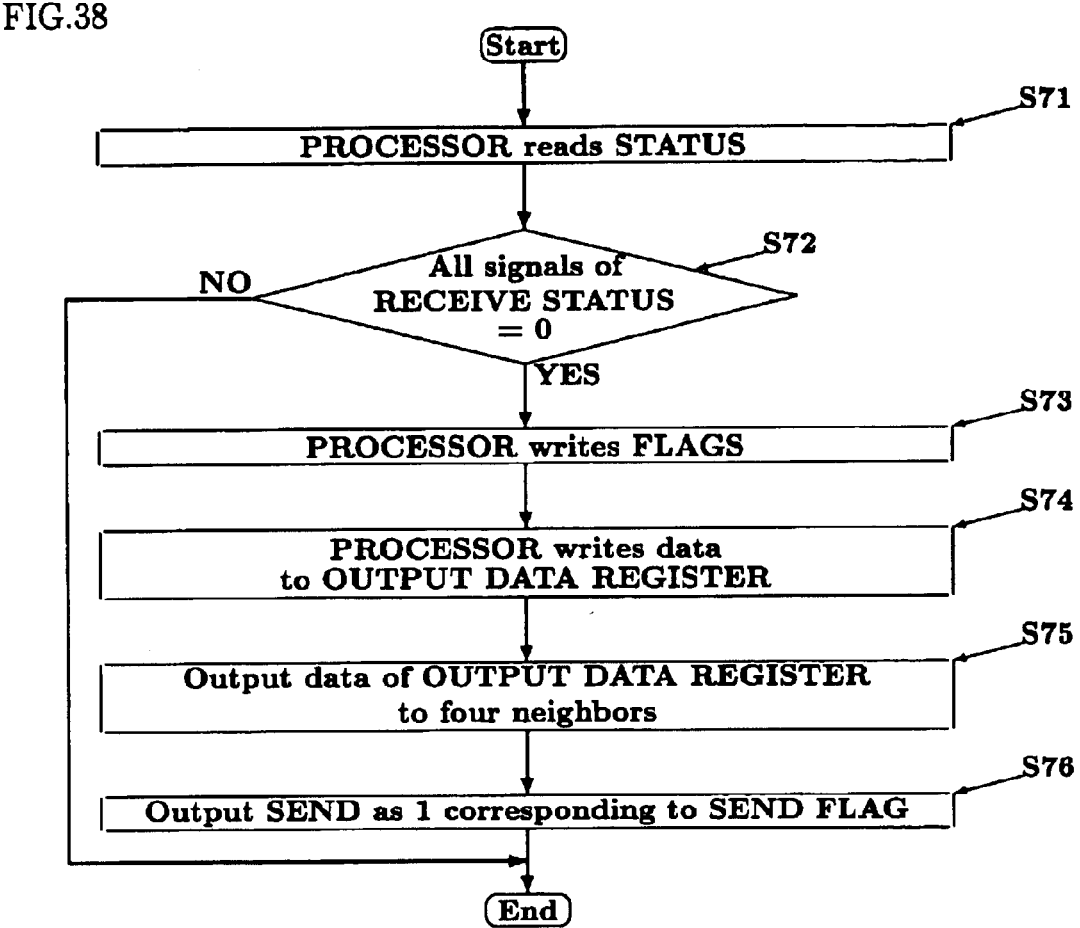
FIG. 38 is a flow chart appearing an algorithm that a processor sends data to some adjoining array operation units via a controler.

FIG. 38 shows algorithm of a case that the processor 41 sends calcuration data to four neighbor array operation units 40 via the controler 43. FIG. 38 is processed by combining program control executed in the processor 41 and hardware logic used in the flag decoder 58 and the flag encoder 59. At step 71 in FIG. 38, the processor 41 reads contents of the status register 60. At step 72, the processor 41 judges whether all signals of RECEIVE STATUS in the read contents are equal to zero or not. If NO, this process ends. If YES, this process goes to step 73. At step 73, the processor 41 decides TYPE of data to send to some adjoining array operation units 40, a value of counter and directions to send, and then writes them to the fag register 57. At step 74, the processor 41 writes data to send to some adjoining array operation units 40. At step 75, the controler 43 sends contents of the output data register 63 to some adjoining array operation units 40, regarding them as calcuration data. At step 78, the controler 43 set SEND to one, and sends the SEND to only directions directed by SEND FLAG in the flag register 57. The algorithm of the processor 41 for sending one time ends. The processor 41 starts this send algorithm once data to send are updated in the memory 42.

Figure 39:
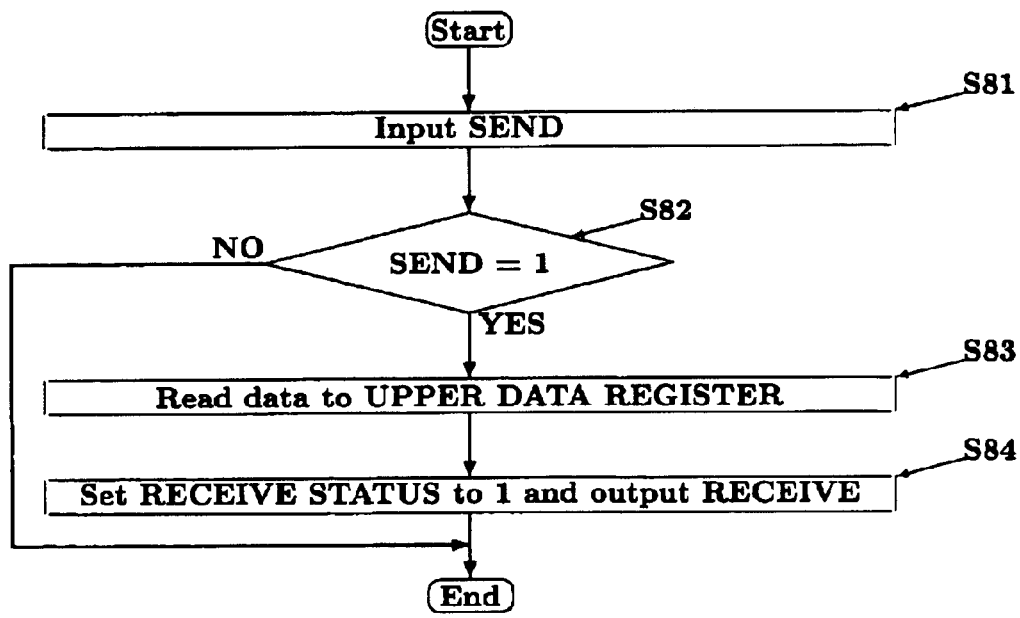
FIG. 39 is a flow chart appearing an algorithm that a controler receives data from some adjoining array operation units.

FIG. 39 shows algorithm of a case that the controler 43 receives calcuration data from the upper array operations unit 40. FIG. 39 is processed by hardware logic used in the flag decoder 58 and the flag encoder 59. At step 81 in FIG. 39, the flag encoder 59 inputs SEND. At step 82, the flag encoder 59 judges whether SEND is equal to one or not. If NO, this process ends. If YES, this process goes to step 83. At step 83, the upper input data register 64 reads calcuration data sent from the upper side. At step 84, the flag encoder 59 sets RECEIVE STATUS for the upper side in the status register 60 to one. Simultaneously, the flag encoder 59 sets to RECEIVE to one, and sends the RECEIVE to the upper array operation unit 40. In cases of the lower, left and right sides, this step is executed similarly. The algorithm of the controler 43 for receiving one time ends. The controler 43 always supervises the SENDs from the upper, lower, left and right array operation units 40. The controler 43 starts this receive algorithm once SENDs are received.

Figure 40:
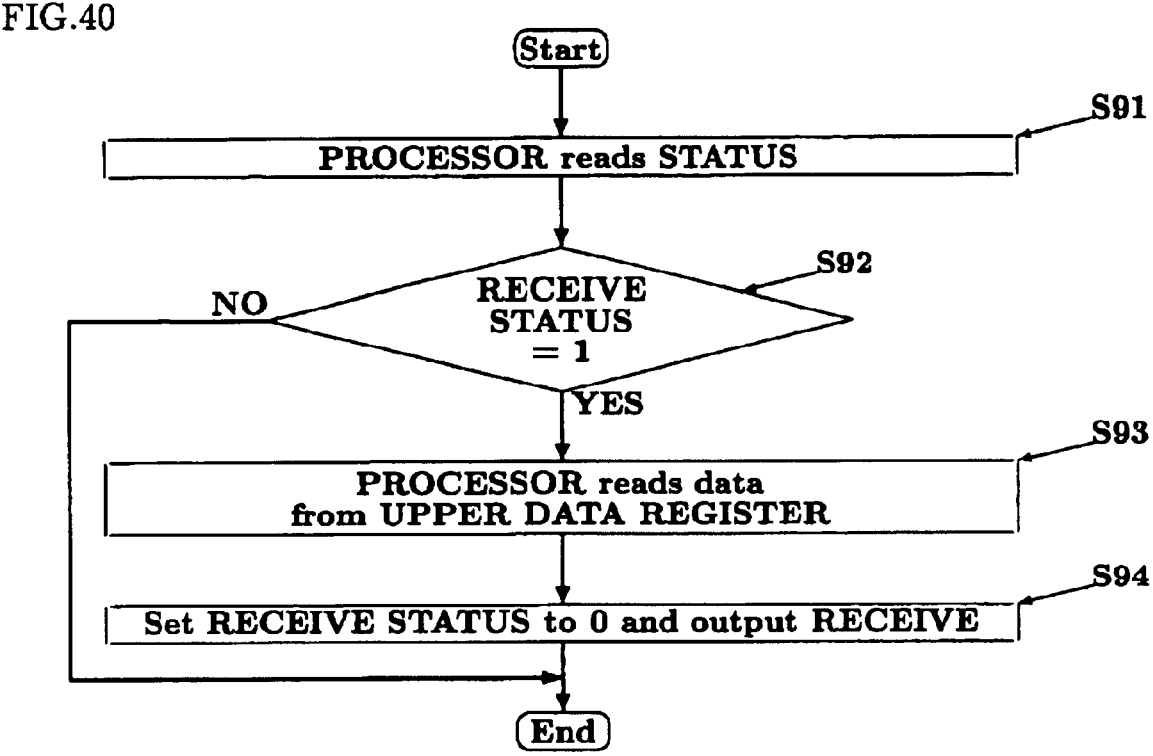
FIG. 40 is a flow chart appearing an algorithm that a processor receives data from an upper input data register.

FIG. 40 shows algorithm of a case that the processor 41 receives data from the upper input data register 64. FIG. 40 is processed by combining program control executed in the processor 41 and hardware logic used in the flag decoder 58 and the flag encoder 59. At step 91 in FIG. 40, the processor 41 reads contents of the status register 60. At step 92, the processor 41 judges whether RECEIVE STATUS for the upper side in the read contents are equal to one or not. If NO, this process ends. If YES, this process goes to step 93.

At step 93, the processor 41 reads data from the upper input data register 64. At step 94, the flag encoder 59 sets RECEIVE STATUS for the upper side in the status register 60 to zero. Simultaneously, the flag encoder 59 sets to RECEIVE to zero, and sends the RECEIVE to the upper array operation unit 40. In cases of the lower, left and right sides, this step is executed similarly. The algorithm of the processor 41 for receiving one time ends. The processor 41 supervises the contents of the status register 60 for a specific period. The processor 41 starts this receive algorithm once either RECEIVE STATUS for the upper, lower, left or right side is equal to one. In addition, this algorithm can be realized by interrupt processing even though the processor 41 does not have to supervise the contents of the status register 60 for the specific period.

Here, although this array operation unit 40 is mainly described on the assumption that it generates one output image from more than or equal to one input image, the array operation unit 40 has to change its circuit as it can output calcuration data in the middle of computation if necessary. In this case, we only have to change the circuit as the number of RESULT SENDs in the flag decoder 58 increases to the number of calcuration data due to output, and the program of the array operation unit 40 as only RESULT SEND corresponding to calcuration data read to the result data register 62 is set to one.

While the invention has been shown by example, it should be understood, however, that the description herein of specific embodiments is not intended to limit the invention to the particular forms disclosed, but on the contrary, the invention is to cover all modifications equivalents, and alternative falling within the spirit and scope of the invention as defined by the appended claims.

INDUSTRIAL APPLICABILITY

As suggested by claim 1 and claim 2, the present invention can count the number of moving objects, in a case that it is difficult for the whole moving object or a set of its parts to be segmented from an animation image as it makes a lump of area even though brightness, saturation and hue are used. In a case of counting alive and transparent amoebas, for example, the whole amoeba is impossible to be colored only for counting. It is also difficult for us to make such images as an image where only amoebas are painted out because the amoebas show the same color as either light source or background even though the color of light source and background is specified, or the center of each amoeba shows different color from the border because of refraction and reflection of light. In almost all of the cases, each contour part of the amoeba represents a unique luminous value because of refraction and reflection of light. The present invention can count the number of the amoebas easily because it can segment the whole amoeba from background by generating edge information from the unique luminous values. The same thing is applied to such microbes like Mijinko, cells like a leukocyte and a sperm. Of course, the present invention is also used for moving objects like a tadpole and a human face, which can be easily distinguished by color information from background. Since the present invention can count the number of the moving objects without operating themselves, light source and background, as shown above, a system for counting the moving objects can be realized cheaply by connecting the present invention to the existing equipment possible to take their image. The present invention can be also used in carrying out pretreatment which judges whether there are some moving objects in an animation image or not. In addition, in a case that some object areas separated from background are got directly from the present invention and are inputed to another equipment, the invention can be used for out pretreatment which recognizes some moving objects. Then, a system for recognizing the objects can be realized cheaply.

As suggested by claim 3, the present invention can count the number of still objects, in a case that it is difficult for the whole still object or a set of its parts to be segmented from a frame image of an animation image as it makes a lump of area even though brightness, saturation and hue are used. In a case of counting transparent beads, for example, the whole beads is impossible to be colored only for counting. It is also difficult for us to make such images as an image where only beads are painted out because the beads show the same color as either light source or background even though the color of light source and background is specified, or the center of each bead shows different color from the border because of refraction and reflection of light. In almost all of the cases, each contour part of the bead represents a unique luminous value because of refraction and reflection of light. The present invention can count the number of the beads easily because it can segment the whole bead from background by generating edge information from the unique luminous values. The same thing is applied to such microbes like Mijinko, cells like a leukocyte and a sperm. Of course, the present invention is also used for objects like a tadpole and a human face, which can be easily distinguished by color information from background. Since the present invention can count the number of the objects without operating themselves, light source and background, as shown above, a system for counting the objects can be realized cheaply by connecting the present invention to the existing equipment possible to take their image. The present invention can be also used in carrying out pretreatment which judges whether there are some objects in an still image or not. In addition, in a case that some object areas separeted from background are got directly from the present invention and are inputed to another equipment, the invention can be used for out pretreatment which recognizes some objects. Then, a system for recognizing the objects can be realized cheaply.

As suggested by claim 1, claim 2 and claim 3, the present invention can count both the number of moving objects and the number of all objects, in a case that it is difficult for the whole moving object, the whole still object or a set of its parts to be segmented from an animation image as it makes a lump of area even though brightness, saturation and hue are used. In a case of counting both above and all of transparent amoebas, for example, suppose that an amoeba moving for a specific period is regarded as an alive one. The present invention can count both the number of moving amoebas and the number of all amoebas, by using two frame images in an animation image whose interval is the specific period, or two still images taken at two times whose interval is the specific period. The same thing is applied to such microbes like Mijinko, cells like a leukocyte and a sperm. Of course, the present invention is also used for objects like a tadpole and a human face, which can be easily distinguished by color information from background. Since the present invention can count both the number of the moving objects and the number of all of the objects by one device, as shown above, a system for counting the moving objects and all of the objects can be realized cheaply. The present invention can be also used in carrying out pretreatment which judges whether there are some moving objects or some still objects in an animation image or not. In addition, in a case that some object areas separeted from background are got directly from the present invention and are inputed to another equipment, the invention can be used for out pretreatment which recognizes some moving objects or some still objects. Then, a system for recognizing the objects can be realized cheaply.

As suggested by claim 1, claim 2 in I claim:, moreover, the present invention can count both the number of moving objects and the number of all objects, and then calcurate the number or the rate of the moving objects and the number or the rate of still objects, in a case that it is difficult for the whole moving object, the whole still object or a set of its parts to be segmented from an animation image as it makes a lump of area even though brightness, saturation and hue are used. In a case of calcurating survival rate of transparent amoebas, for example, suppose that an amoeba moving for a specific period is regarded as an alive one. The present invention can count both the number of moving amoebas and the number of all amoebas, by using two frame images in an animation image whose interval is the specific period, or two still images taken at two times whose interval is the specific period. Therefore, the survival rate of the amoebas is easily calcurated. The same thing is applied to such microbes like Mijinko, cells like a leukocyte and a sperm. Of course, the present invention is also used for objects like a tadpole and a human face, which can be easily distinguished by color information from background. Since the present invention can count both the number of the moving objects and the number of all of the still objects by one device, as shown above, a system for calcurating both the rate of the moving objects and the rate of the still objects can be realized cheaply. The present as invention can be also used in carrying out pretreatment which judges whether there are some moving objects or some still objects in an animation image or not. In addition, in a case that some object areas sepereted from background are got directly from the present invention and are inputed to another equipment, the invention can be used for out pretreatment which recognizes some moving objects or some still objects. Then, a system for recognizing the objects can be realized cheaply.

As suggested by claim 4 and claim 5, the present invention can find out objects whose images can be to taken by a moving camera, by using an animation image consisting of such any bands of wave lengths as three primary colors, visible colors, infrared rays, ultra-violet rays, and so on. When an object is moving, the present invention can change the direction of the moving camera toward the object, and adjust the magnification of the camera as its size in the image is suitable for it, by detecting the position and the size of the object. When an object is still, similarly to the moving object, the present invention can also control the moving camera toward the object, by vibrating the moving camera frequently. In addition, since the present invention can control the moving camera by an external signal, the invention combined with computers and so on is useful. Some applications of the present invention are then described as follow: When such objects as persons, cars and loads must be supervised not only at places like passage where lighting is stable, but also at places like an enterance and the outdoors, where there is much noise, the present invention can control the moving camera as the camera can take suitable magnification of images of these objects. The present invention is useful for prevention of shoplifters, by taking images of customers intensively in places like a convenience store and a super market where objects are seldom moving. Since the present invention can supervise some objects in a wide domain by one device, as shown above, a system for supervising objects can be realized cheaply. The present invention can be also used in carrying out pretreatment which judges whether there are some specific objects in an animation image or not. In addition, in a case that some images generated by normalizing some object areas sepereted from background are got directly from the present invention and are inputed to another equipment, the invention can be used for out pretreatment which recognizes some moving objects or some still objects. Then, a system for recognizing the objects can be realized cheaply.

As suggested by claim 5, the present invention can find out objects whose images can be to taken by a moving camera, by using an animation image consisting of such any bands of wave lengths as three primary colors, visible colors, infrared rays, ultra-violet rays, and so on. After these objects are classified into some types by a specific recognition method, the types are recorded with attributes like a position and time together. The present invention, therefore, can count the number of specific objects and record traces of the objects. For example, the present invention can measure the number of customers and the trafic amount in a KARAOKE box and a shopping center and so on. The present invention can also investigate at places where many customers gather, and record working process of a worker. Furthermore, the present invention can be used for a game finding moving objects like "darumasan ga koronda" and a shooting game. In addition, when the present invention is assembled in a industrial robot, the robot can find out some work peaces on a manufacuturing line and moreover, the robot can stop working by detecting persons which are approching to it. The present invention then can realize visual function of moving robots like a humanoid robot and a seeing-eye dog robot. When the present invention is attached at least at the front, rear, left and right of cars like an automobile, a bus and a dump truck, the invention can find out a object in a blind spot for a driver, and then an alarm is emitted. The prevent invention can also detect such moving objects as a approaching car beforehand, and moreover record a traffic accident in its happening. Since a person in a wheelchar can see a wide area without turning his head, he can perceive beforehand bicycles and cars approaching from back. The present invention then is useful for-prevention of accidents. In addition, when the present invention is installed at a doorway of trains, it can find out some passengers who are inserted into a door or near the door. When the present invention is installed at a platform of a station, it can also find out objects fallen to the track, and warn persons who are in track side of the platform. When the present invention is installed in a rescue robot, the robot can bring a life vest, a rope and so on to a person met with an accident, or can convey him to a safe place, by approaching to him automatically after finding out him at seashore, on the ocean and at the river. This rescue robot is also useful for finding out a person who are the underlays of tiles and pebbles by earthquake. Since the present invention can find and count out objects, and record traces of moving objects by one device, as shown above, a system for finding objects, a system for supervising objects, a system for counting objects and a system for recording objects and so on can be realized cheaply.

As suggested by claim 6, the present invention can output each pixels of a digital image in parallel after inputing each pixel of the digital image in parallel and vibrating the whole digital image or each pixel of the digital image independently. Since the present invention does not use such physical mechanism as a vibration table, it can vibrate the digital image frequently. When edge information of all moving objects in the digital image has to be generated in a real time because the objects move fast, the present invention can achieve the necessary processing power.

As suggested by claim 7, the present invention can output rough edge information of each pixel of the digital image in parallel after inputing each pixel of the digital image in parallel and generating the rough edge information in parallel. Although the generated rough edge information is not always exact because of influence of direction of movement of objects, its velocity, the difference of color between it and background and so on, the present invention can generate the rough edge information of moving objects which have any form without rectifying a digital image even though the objects lay in such environment as outdoors under the sun, where there is much noise. Therefore, the present invention can be used anywhere. The present invention can also deal with infrared rays, ultra-violet rays and radiation, similarly to visible colors, especially three primary colors. In addition, the more bands there are, the less influence of noise the present invention can reduce. In this case, since the present invention does not have to change a circuit of its data processing device except the amount of memory, it can increase the number of bands easily. The present invention, therefore, can serve the contour, the position and the size of moving objects fast and cheaply to a robot which can work not only in a house but also on the outdoors. The present invention, moreover, effectively carries out pretreatment of a visual recognition system which can recognize any object.

As suggested by claim 8, the present invention can output formed edge information in parallel after inputting rough edge information and each pixel of a digital image in parallel and generating the formed edge information from the rough edge information by using the digital image. Since the present invention can form the rough edge information generated by any method to the clearer and exacter edge information, it can easily reduce the load necessary for means which generates the rough edge information. In addition, the present invention can form the rough edge information, which is generated from a specific area of a low-resolution digital image generated by making the resolution of the digital image low, into the clearer and exacter edge information because the present invention is not influenced by quality of the rough edge information very well. The present invention, therefore, can generate high definition of edge information for a object in a low-magnification of digital image without increasing the amount of hardware and computational complexity. Although many systems for recognizing objects have already used a wide-angle camera and a high-definition camera, a system for recognizing objects with one camera can be realized by the present invention.

As suggested by claim 9, the present invention can output position and size of a object represented by edge information, which is regarded as redundant information, in parallel after inputting the edge information in parallel and detecting the position and the size of the object. The present invention can detect the position and the size from edge information of some objects in an image simultaneously, where quality of the position and the size is same with or more than quality of position and size detected by the much amount of hardware and much computational complexity. The present invention is also used for pretreatment for detecting the position and the size of some objects in an image, which is a frame image of an animation image taken by a video camera or a still image taken by a digital camera. The present invention, therefore, can realize an algorithm of pattern recognition for the still image and the animation image fast and cheaply.

As suggested by claim 9, moreover, the present invention can output position and size of a object represented by each pixel of an object-area image, which is regarded as redundant information in parallel after inputting each pixel of the object-area image in parallel and detecting the position and the size of the object. The present invention can detect the position and the size from areas of some objects in an image simultaneously, where quality of the position and the size is same with or more than quality of position and size detected by the much amount of hardware and much computational complexity. Especially, in detecting objects, which have a circular part, like a cell and sperm, and moreover in detecting objects, which are regarded as a circle, like a human face, the present invention does not have to generate edge information from their areas again. The present invention, therefore, can realize an algorithm of pattern recognition for the still image and the animation image fast and cheaply.

As suggested by claim 10, the present invention can output each pixel of a normalized image in parallel, after inputting each pixel of an object-area image and each pixel of a digital image in parallel and normalizing some object areas in the digital image. The present invention can normalize the object areas in the digital image which are masked by some areas except the object areas in the object-area image, filling spaces in the digital image as the size of the object areas fit the size of the digital image, where quality of the normalized image is same with or more than quality of a normalize image, which is weak to a position gap and has many spaces, generated by the much amount of hardware and much computational complexity. The present invention is also used for pretreatment for normalizing a specific object segmented from a frame image in an animation image taken by a video camera or a still image taken by a digital camera. The present invention, therefore, can realize an algorithm of pattern recognition for the still image and the animation image fast and cheaply.

As suggested by claim 11, the present invention can output each pixel of a matching-result image in parallel, after inputting each pixel of some template images followed by inputting each pixel of a normalized image in parallel and carrying out pattern matching the normalized image with the template images. The present invention can select some template images similar to the normalized image by neighbor processing, if the normalized image is often generated by the same objects whose positions and sizes are different, respectively. The present invention, therefore, can realize an algorithm of pattern recognition for the still image and the animation image fast and cheaply because the algorithm can carry out global processing like least square method and neural networks as less as possible.

As suggested by claim 12, the present invention can output each pixel of an object-area image in parallel, after inputting a formed edge information in parallel and separating object areas from background by nonlinear oscillators. The present invention can separate the object areas from the background, without using any pretreatment for a digital image except generating its edge information, depending on the position, the size and the direction of objects in the digital image, concerning that the edge information makes a dashed line and a crossing, or even though the object areas in the digital image are overlapping. In addition, since a hardware of the present invention is realized by digital technology easily, the hardware can carry out real-time image processing fast.

As suggested by claim 13 and claim 14, the present invention can make a visual device fast. Even though the size of images becomes large, especially, processing time of the visual device does not change because of parallelism. The visual device, then, can be used for some applications which must be carried out in real time. Since some means described in claim 6 to claim 12 are installed in one chip, only by changing a program, the present invention can make the visual device cheap. Moreover, since some means described in claim 6 to claim 12 are installed in one chip, the chip can be installed in a moving camera easily. The present invention then can increase convenience. Finally, since the present invention always inputs and outputs signals every one pixel, it can reduce wiring complexity by stacking some chips. Performance of the present invention, then, can increase easily by such technological innovation as three-dimensional VLSI.

What is claimed is:

1. A visual device comprising array operation units arranged in the shape of a lattice in a data processing device that realizes means for detecting position and size of object areas, wherein each of said array operation units comprises:

means for initializing said array operation unit;

means for finishing processing if there is not a rough edge-information image to input any more;

means for inputting a band-pixel value in said rough edge-information image;

means for converting said band-pixel value in said rough edge-information image to a band-pixel value in a redundant-information image;

means for converting a transfer value derived from said redundant-information image to a band-pixel value in a transfer-value image by operating imagery of position;

means for transferring said band-pixel value in said redundant-information image to a transfer position directed by said band-pixel value in said transfer-value image;

means for updating said band-pixel value in said redundant-information image by summation of said band-pixel values transferred from their original positions in said redundant-information image; and means for outputting said band-pixel value in said redundant-information image.

* * * * *